US012650980B1

(12) United States Patent
Das et al.

(10) Patent No.: US 12,650,980 B1
(45) Date of Patent: Jun. 9, 2026

(54) DETERMINING A USER-SPECIFIC APPROACH FOR DISAMBIGUATION BASED ON AN INTERACTION RECOMMENDATION MACHINE LEARNING MODEL

(71) Applicant: SPLUNK INC., San Francisco, CA (US)

(72) Inventors: Dipock Das, Sunnyvale, CA (US); Dayanand Pochugari, Santa Clara, CA (US); Neeraj Verma, Fremont, CA (US); Nikesh Padakanti, Fremont, CA (US); Aungon Nag Radon, Toronto (CA); Anand Srinivasabagavathar, Fremont, CA (US); Adam Oliner, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/441,873

(22) Filed: Feb. 14, 2024

Related U.S. Application Data

(63) Continuation of application No. 17/943,037, filed on Sep. 12, 2022, now Pat. No. 11,914,588, which is a
(Continued)

(51) Int. Cl.
*G06F 16/2453* (2019.01)
*G06F 16/2452* (2019.01)
(Continued)

(52) U.S. Cl.
CPC .. *G06F 16/24534* (2019.01); *G06F 16/24522* (2019.01); *G06F 16/248* (2019.01);
(Continued)

(58) Field of Classification Search
CPC ................................................. G06F 16/24522
(Continued)

(56) References Cited

U.S. PATENT DOCUMENTS 7,702,690 B2    4/2010  Brave et al.
7,809,714 B1    10/2010  Smith
(Continued)

FOREIGN PATENT DOCUMENTS

WO    WO 2017/065887 A1 *  4/2017  ............. G06F 17/30

OTHER PUBLICATIONS

Bhogal et al., "A Review of Ontology based Query Expansion", Information Processing & Management vol. 43, Issue 4, Jul. 2007, pp. 866-886.
(Continued)

*Primary Examiner* — Hung T Vy
(74) *Attorney, Agent, or Firm* — Rutan & Tucker, LLP; Kyle M. St. James

(57)    ABSTRACT

In various embodiments, a natural language (NL) application implements functionality that enables users to more effectively access various data storage systems based on NL requests. As described, the operations of the NL application are guided by, at least in part, on one or more templates and/or machine-learning models. Advantageously, the templates and/or machine-learning models provide a flexible framework that may be readily tailored to reduce the amount of time and user effort associated with processing NL requests and to increase the overall accuracy of NL application implementations.

20 Claims, 23 Drawing Sheets

Related U.S. Application Data continuation of application No. 16/790,554, filed on Feb. 13, 2020, now Pat. No. 11,461,320, which is a continuation of application No. 15/663,726, filed on Jul. 29, 2017, now Pat. No. 10,565,196.

(51) Int. Cl.

| | |
|---|---|
| *G06F 16/248* | (2019.01) |
| *G06N 3/08* | (2023.01) |
| *G06N 5/022* | (2023.01) |
| *G06N 5/046* | (2023.01) |
| *G06N 20/00* | (2019.01) |
| *G06N 20/10* | (2019.01) |

(52) U.S. Cl.
CPC .............. *G06N 3/08* (2013.01); *G06N 5/022* (2013.01); *G06N 5/046* (2013.01); *G06N 20/00* (2019.01); *G06N 20/10* (2019.01)

(58) Field of Classification Search
USPC ................................... 707/759, 765; 706/45
See application file for complete search history.

(56) References Cited

U.S. PATENT DOCUMENTS

| | | | |
|---|---|---|---|
| 7,937,344 B2 | 5/2011 | Baum et al. | |
| 7,984,004 B2 * | 7/2011 | Andrew .............. | G06F 16/3322 |
| | | | 707/706 |
| 7,996,396 B2 | 8/2011 | Leblang et al. | |
| 8,112,425 B2 | 2/2012 | Baum et al. | |
| 8,219,516 B2 | 7/2012 | Foulger et al. | |
| 8,682,925 B1 * | 3/2014 | Marquardt ........... | G06F 16/248 |
| | | | 707/741 |
| 8,751,529 B2 | 6/2014 | Zhang et al. | |
| 8,762,324 B2 | 6/2014 | Thollot et al. | |
| 8,788,525 B2 | 7/2014 | Neels et al. | |
| 8,880,495 B2 | 11/2014 | Andri et al. | |
| 9,215,240 B2 | 12/2015 | Merza et al. | |
| 9,286,413 B1 | 3/2016 | Coates et al. | |
| 9,633,106 B1 | 4/2017 | Saurabh et al. | |
| 9,690,848 B2 | 6/2017 | Thollot et al. | |
| 9,760,627 B1 | 9/2017 | Bradley et al. | |
| 9,870,389 B2 | 1/2018 | Elliot et al. | |
| 10,127,258 B2 | 11/2018 | Lamas et al. | |
| 10,437,933 B1 * | 10/2019 | Clifton .................. | G06F 40/216 |
| 10,565,196 B2 * | 2/2020 | Das ........................ | G06F 16/248 |
| 2003/0033318 A1 | 2/2003 | Carlbom et al. | |
| 2003/0217052 A1 * | 11/2003 | Rubenczyk ........... | G06F 16/951 |
| 2005/0080770 A1 | 4/2005 | Lueder et al. | |
| 2007/0078835 A1 | 4/2007 | Donnelli | |
| 2007/0094183 A1 | 4/2007 | Paek et al. | |
| 2008/0235209 A1 | 9/2008 | Rathod et al. | |
| 2009/0276724 A1 | 11/2009 | Rosenthal et al. | |
| 2010/0017382 A1 | 1/2010 | Katragadda et al. | |
| 2010/0121630 A1 | 5/2010 | Mende et al. | |
| 2011/0125764 A1 | 5/2011 | Carmel et al. | |
| 2011/0125783 A1 | 5/2011 | Whale et al. | |
| 2012/0232919 A1 | 9/2012 | Wilson et al. | |
| 2013/0031529 A1 | 1/2013 | Bernelas et al. | |
| 2013/0346400 A1 * | 12/2013 | Ramsey ................ | G06F 16/951 |
| | | | 707/E17.084 |
| 2014/0108370 A1 | 4/2014 | Andri et al. | |
| 2014/0163959 A1 | 6/2014 | Hebert et al. | |
| 2014/0214399 A1 * | 7/2014 | Gulwani ................ | G06F 40/18 |
| | | | 704/8 |
| 2014/0310001 A1 | 10/2014 | Kalns et al. | |
| 2014/0310002 A1 | 10/2014 | Nitz et al. | |
| 2015/0066479 A1 | 3/2015 | Pasupalak et al. | |
| 2015/0100943 A1 * | 4/2015 | Gabel .................... | G06F 40/20 |
| | | | 717/106 |
| 2015/0213096 A1 | 7/2015 | Montgomery et al. | |
| 2015/0254353 A1 * | 9/2015 | Gulwani ............. | G06F 16/3344 |
| | | | 707/706 |
| 2015/0302850 A1 | 10/2015 | Lebrun | |
| 2015/0363478 A1 | 12/2015 | Haynes | |
| 2016/0078101 A1 | 3/2016 | Somaiya et al. | |
| 2016/0092772 A1 | 3/2016 | Srivastava et al. | |
| 2016/0103559 A1 | 4/2016 | Maheshwari et al. | |
| 2016/0196491 A1 | 7/2016 | Chandrasekaran et al. | |
| 2016/0219078 A1 | 7/2016 | Porras et al. | |
| 2016/0294759 A1 | 10/2016 | Huang et al. | |
| 2016/0306965 A1 | 10/2016 | Iyer et al. | |
| 2017/0147681 A1 | 5/2017 | Tankersley et al. | |
| 2017/0242913 A1 | 8/2017 | Tijssen et al. | |
| 2017/0286525 A1 | 10/2017 | Li et al. | |
| 2017/0330195 A1 | 11/2017 | Lange et al. | |
| 2017/0371861 A1 | 12/2017 | Barborak et al. | |
| 2018/0005293 A1 | 1/2018 | Adams et al. | |
| 2018/0007053 A1 | 1/2018 | Grant et al. | |
| 2018/0032503 A1 | 2/2018 | Swart et al. | |
| 2018/0069899 A1 * | 3/2018 | Lang ........................ | G06F 8/38 |
| 2018/0077088 A1 | 3/2018 | Cabrera-Cordon et al. | |
| 2018/0082032 A1 | 3/2018 | Allen et al. | |
| 2018/0096103 A1 | 4/2018 | Allen et al. | |
| 2018/0122372 A1 * | 5/2018 | Wanderlust ............. | G10L 15/22 |
| 2018/0129648 A1 | 5/2018 | Chakravarthy et al. | |
| 2018/0137419 A1 * | 5/2018 | Byron .................... | G06N 5/022 |
| 2018/0137420 A1 * | 5/2018 | Byron .................... | G06Q 50/12 |
| 2018/0173808 A1 | 6/2018 | Sharma et al. | |
| 2018/0260379 A1 | 9/2018 | Yu et al. | |
| 2018/0329948 A1 | 11/2018 | Nijor et al. | |
| 2018/0329993 A1 | 11/2018 | Badadala et al. | |
| 2019/0034429 A1 | 1/2019 | Das et al. | |
| 2019/0034430 A1 | 1/2019 | Das et al. | |
| 2019/0034484 A1 | 1/2019 | Das et al. | |
| 2019/0034498 A1 | 1/2019 | Das et al. | |
| 2019/0034499 A1 | 1/2019 | Das et al. | |
| 2019/0034813 A1 | 1/2019 | Das et al. | |
| 2019/0095494 A1 | 3/2019 | Bhattacharjee et al. | |
| 2019/0098106 A1 | 3/2019 | Mungel et al. | |
| 2019/0384762 A1 | 12/2019 | Hill et al. | |

OTHER PUBLICATIONS

Ma et al., "Learning Latent Semantic Relations from Click through Data for Query Suggestion", CIKM'08, Oct. 26-30, 2008, pp. 709-718.

Splunk Enterprise 8.0.0 Overview, available online, retrieved on May 20, 2020 from docs.splunk.com, 2020, 17 pages.

Splunk Cloud 8.0.2004 User Manual, available online, retrieved on May 20, 2020 from docs.splunk.com, 2020, 66 pages.

Splunk Quick Reference Guide, updated 2019, available online at https://www.splunk.com/pdfs/solution-guides/splunk-quick-reference-guide.pdf, retrieved on May 20, 2020, 6 pages.

Carraso, David, "Exploring Splunk," published by CITO Research, New York, NY, Apr. 2012, 156 pages.

Bitincka et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010, 9 pages.

Advisory Action for U.S. Appl. No. 15/663,720, dated Aug. 26, 2019, 3 Pages.

Advisory Action for U.S. Appl. No. 15/663,721, dated Jan. 14, 2020, 2 Pages.

Advisory Action for U.S. Appl. No. 15/663,722, dated Jun. 11, 2021, 3 Pages.

Advisory Action for U.S. Appl. No. 15/663,722, dated Jan. 21, 2020, 3 Pages.

Advisory Action for U.S. Appl. No. 15/663,723, dated Apr. 1, 2020, 3 Pages.

Advisory Action for U.S. Appl. No. 15/663,725, dated Mar. 16, 2021, 3 Pages.

Final Office Action for U.S. Appl. No. 15/663,720, dated Jun. 12, 2019, 18 Pages.

Final Office Action for U.S. Appl. No. 15/663,721, dated Oct. 30, 2019, 38 Pages.

(56)          References Cited

OTHER PUBLICATIONS

Final Office Action for U.S. Appl. No. 15/663,722, dated Nov. 5, 2019, 89 Pages.
Final Office Action for U.S. Appl. No. 15/663,722, dated Feb. 22, 2021, 52 Pages.
Final Office Action for U.S. Appl. No. 15/663,723, dated Jan. 27, 2020, 47 Pages.
Final Office Action for U.S. Appl. No. 15/663,725, dated Dec. 31, 2020, 41 Pages.
Non-Final Office Action for U.S. Appl. No. 15/663,720, dated Apr. 2, 2020, 32 Pages.
Non-Final Office Action for U.S. Appl. No. 15/663,720, dated Feb. 19, 2019, 14 Pages.
Non-Final Office Action for U.S. Appl. No. 15/663,721, dated Apr. 4, 2019, 21 Pages.
Non-Final Office Action for U.S. Appl. No. 15/663,722, dated May 3, 2019, 63 Pages.
Non-Final Office Action for U.S. Appl. No. 15/663,722, dated Jul. 30, 2020, 82 Pages.
Non-Final Office Action for U.S. Appl. No. 15/663,723, dated Jan. 7, 2021, 37 Pages.
Non-Final Office Action for U.S. Appl. No. 15/663,723, dated Jun. 27, 2019, 20 Pages.
Non-Final Office Action for U.S. Appl. No. 15/663,725, dated Jun. 19, 2020, 67 Pages.
Non-Final Office Action for U.S. Appl. No. 16/790,554, dated Aug. 10, 2021, 40 Pages.
Notice of Allowance for U.S. Appl. No. 15/663,720, dated Sep. 3, 2020, 26 Pages.
Notice of Allowance for U.S. Appl. No. 15/663,721, dated Mar. 4, 2020, 12 Pages.
Notice of Allowance for U.S. Appl. No. 15/663,723, dated Jul. 2, 2021, 20 Pages.
Notice of Allowance for U.S. Appl. No. 15/663,725, dated May 12, 2021, 17 Pages.
Notice of Allowance for U.S. Appl. No. 15/663,726, dated May 20, 2019, 8 Pages.
Notice of Allowance for U.S. Appl. No. 15/663,726, dated Oct. 21, 2019, 14 Pages.
Notice of Allowance for U.S. Appl. No. 16/790,554, dated May 11, 2022, 13 Pages.
Notice of Allowance for U.S. Appl. No. 16/790,554, dated Jan. 26, 2022, 7 Pages.

* cited by examiner

5502 — RECEIVE DATA

5504 — ANNOTATE DATA WITH METADATA FIELDS

5506 — PARSE DATA INTO EVENTS

5508 — DETERMINE TIMESTAMPS FOR EVENTS

5510 — ASSOCIATE TIMESTAMPS AND OTHER METADATA FIELDS WITH EVENTS

5512 — TRANSFORM EVENTS

5514 — IDENTIFY KEYWORDS IN EVENTS

5516 — UPDATE KEYWORD INDEX

5518 — STORE EVENTS IN DATA STORE

Figure 5C:
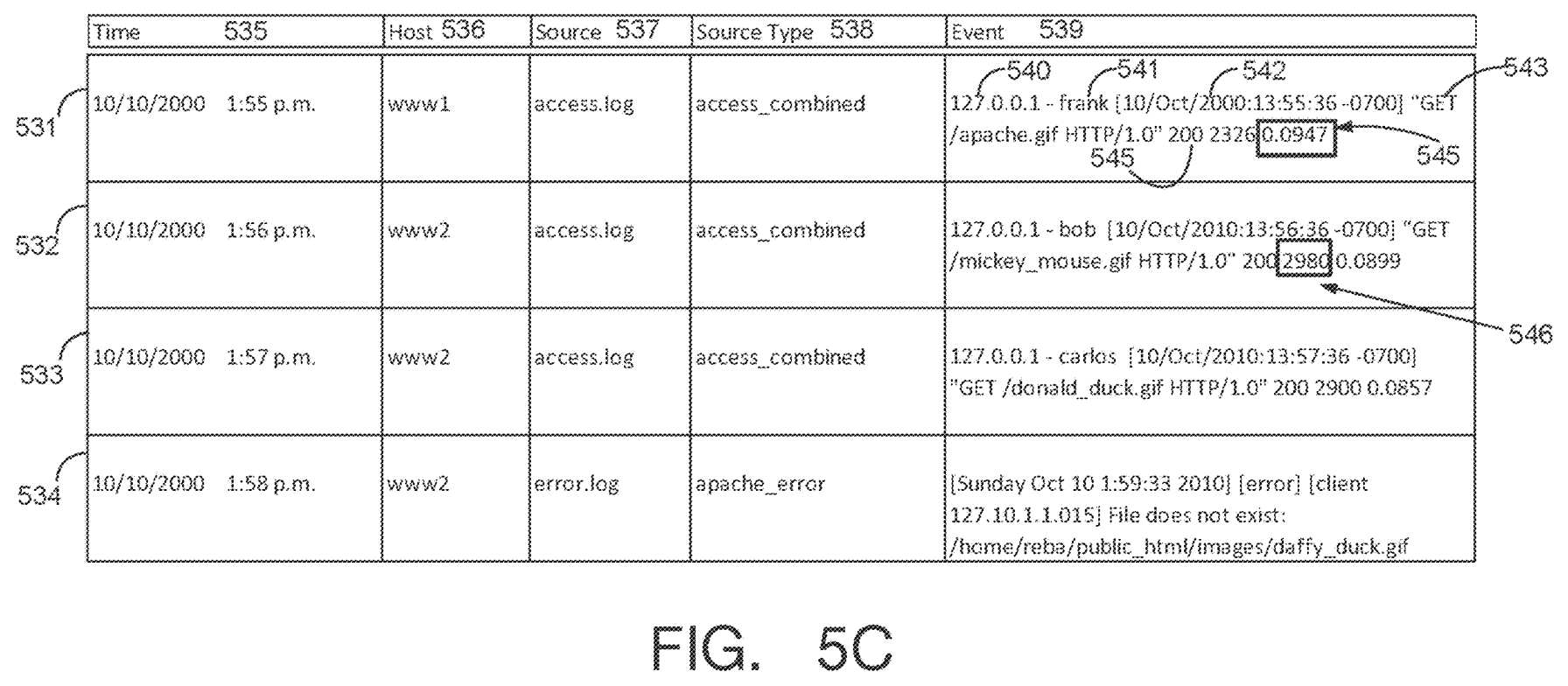

| Time 535 | | Host 536 | Source 537 | Source Type 538 | Event 539 |
|---|---|---|---|---|---|
| 531 | 10/10/2000  1:55 p.m. | www1 | access.log | access_combined | 127.0.0.1 - frank [10/Oct/2000:13:55:36 -0700] "GET /apache.gif HTTP/1.0" 200 2326 0.0947 |
| 532 | 10/10/2000  1:56 p.m. | www2 | access.log | access_combined | 127.0.0.1 - bob [10/Oct/2000:13:56:36 -0700] "GET /mickey_mouse.gif HTTP/1.0" 200 2980 0.0899 |
| 533 | 10/10/2000  1:57 p.m. | www2 | access.log | access_combined | 127.0.0.1 - carlos  [10/Oct/2000:13:57:36 -0700] "GET /donald_duck.gif HTTP/1.0" 200 2900 0.0857 |
| 534 | 10/10/2000  1:58 p.m. | www2 | error.log | apache_error | [Sunday Oct 10 1:59:33 2010] [error] [client 127.10.1.1.015] File does not exist: /home/reba/public_html/images/daffy_duck.gif |

602 — SEARCH HEAD RECEIVES QUERY FROM CLIENT

604 — SEARCH HEAD DETERMINES WHAT PORTIONS OF THE QUERY CAN BE DISTRIBUTED TO INDEXERS

606 — SEARCH HEAD DISTRIBUTES PORTIONS OF QUERY TO INDEXERS

608 — INDEXERS SEARCH DATA STORE FOR QUERY-RESPONSIVE EVENTS

610 — SEARCH HEAD COMBINES ANY PARTIAL RESULTS OR EVENTS TO PRODUCE FINAL RESULT

Figure 10:
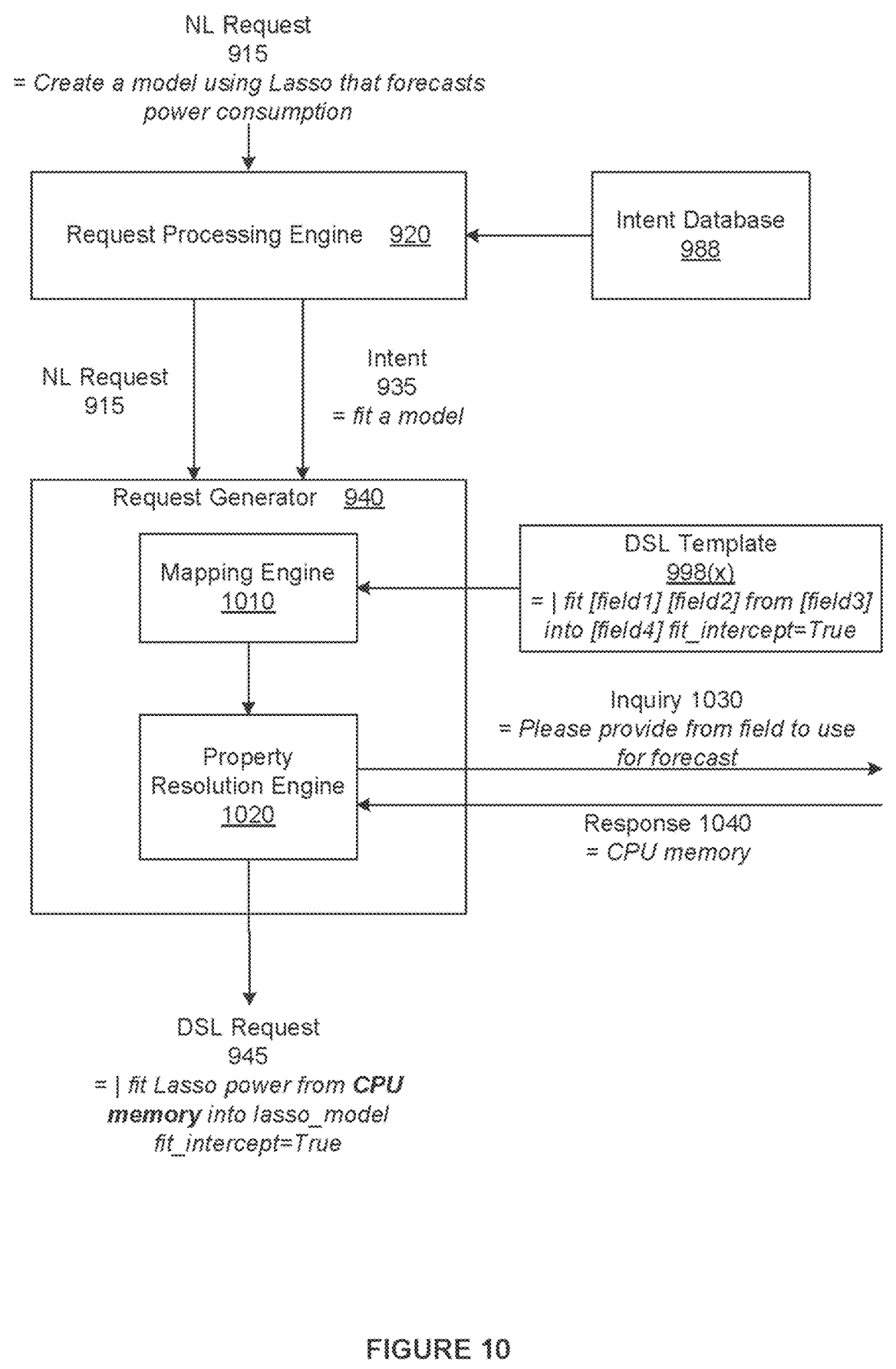

NL Request
915
= *Create a model using Lasso that forecasts*
*power consumption*

Request Processing Engine     920

Intent Database
988

NL Request
915

Intent
935
= *fit a model*

Request Generator     940

Mapping Engine
1010

DSL Template
998(x)
= | *fit [field1] [field2] from [field3]*
*into [field4] fit_intercept=True*

Inquiry 1030
= *Please provide from field to use*
*for forecast*

Property
Resolution Engine
1020

Response 1040
= *CPU memory*

DSL Request
945
= | *fit Lasso power from* CPU
memory *into lasso_model*
*fit_intercept=True*

1300

Receive an ambiguous NL request
1302

Obtain most recent disambiguation model
1304

Generate a disambiguation recommendation based on the NL request and the disambiguation model
1306

Provide the disambiguation recommendation to the user
1308

Interact with the user to determine disambiguated NL request
1310

Apply disambiguated NL request to domain-specific data source
1312

Provide user interaction data for training of new disambiguation model
1314

End

FIGURE 13

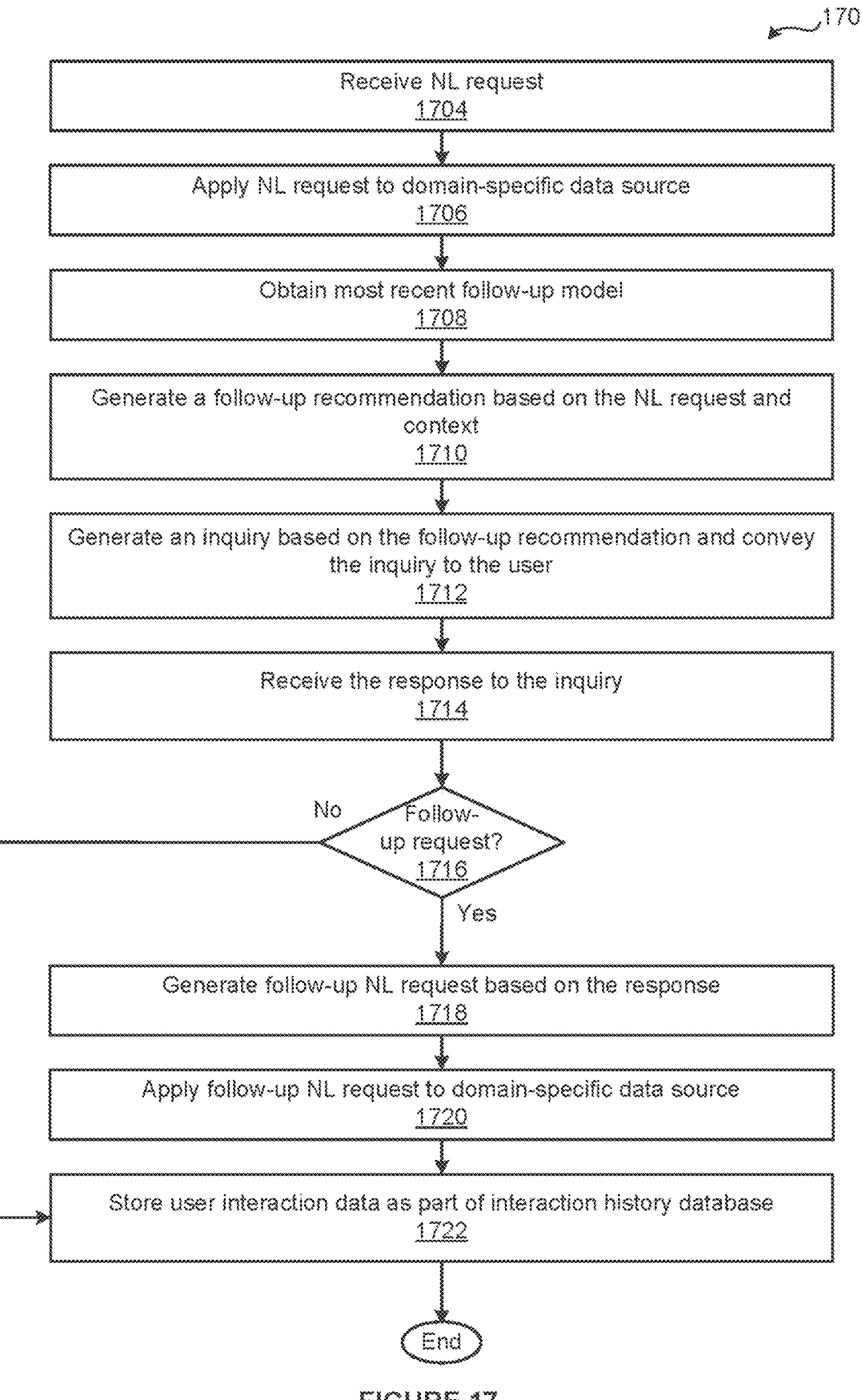

1700

Receive NL request
1704

Apply NL request to domain-specific data source
1706

Obtain most recent follow-up model
1708

Generate a follow-up recommendation based on the NL request and context
1710

Generate an inquiry based on the follow-up recommendation and convey the inquiry to the user
1712

Receive the response to the inquiry
1714

No ← Follow-up request? 1716 → Yes

Generate follow-up NL request based on the response
1718

Apply follow-up NL request to domain-specific data source
1720

Store user interaction data as part of interaction history database
1722

End

FIGURE 17

1900

```
┌─────────────────────────────────────────────────────────┐
│      Receive NL request and corresponding search results │
│                         1902                             │
└─────────────────────────────────────────────────────────┘
                            │
                            ▼
┌─────────────────────────────────────────────────────────┐
│          Obtain most recent presentation model           │
│                         1904                             │
└─────────────────────────────────────────────────────────┘
                            │
                            ▼
┌─────────────────────────────────────────────────────────┐
│  Generate a presentation recommendation based on the NL  │
│     request, the search results, and the presentation    │
│                         model                            │
│                         1906                             │
└─────────────────────────────────────────────────────────┘
                            │
                            ▼
┌─────────────────────────────────────────────────────────┐
│   Generate an inquiry based on the presentation          │
│   recommendation and present the inquiry to the user     │
│                         1908                             │
└─────────────────────────────────────────────────────────┘
                            │
                            ▼
┌─────────────────────────────────────────────────────────┐
│            Receive a response to the inquiry             │
│                         1910                             │
└─────────────────────────────────────────────────────────┘
                            │
                            ▼
┌─────────────────────────────────────────────────────────┐
│       Set the presentation format based on the response  │
│                         1912                             │
└─────────────────────────────────────────────────────────┘
                            │
                            ▼
┌─────────────────────────────────────────────────────────┐
│        Present search results in presentation format     │
│                         1914                             │
└─────────────────────────────────────────────────────────┘
                            │
                            ▼
┌─────────────────────────────────────────────────────────┐
│      Store user interaction data in knowledge database   │
│                         1916                             │
└─────────────────────────────────────────────────────────┘
                            │
                            ▼
                        ( End )
```

FIGURE 19

2100

```
┌─────────────────────────────────────────────────────────────┐
│              Receive hierarchical component selection        │
│                          2102                                │
└─────────────────────────────────────────────────────────────┘
                              │
                              ▼
┌─────────────────────────────────────────────────────────────┐
│                Obtain most recent expansion model            │
│                          2104                                │
└─────────────────────────────────────────────────────────────┘
                              │
                              ▼
┌─────────────────────────────────────────────────────────────┐
│   Generate an expansion recommendation based on the NL       │
│   request, the hierarchical component selection, and the     │
│                   expansion model                            │
│                          2106                                │
└─────────────────────────────────────────────────────────────┘
                              │
                              ▼
┌─────────────────────────────────────────────────────────────┐
│  Generate an inquiry based on the expansion recommendation   │
│             and present the inquiry to the user              │
│                          2108                                │
└─────────────────────────────────────────────────────────────┘
                              │
                              ▼
┌─────────────────────────────────────────────────────────────┐
│                  Receive a response to the inquiry           │
│                          2110                                │
└─────────────────────────────────────────────────────────────┘
                              │
                              ▼
┌─────────────────────────────────────────────────────────────┐
│            Set the expansion method based on the response    │
│                          2112                                │
└─────────────────────────────────────────────────────────────┘
                              │
                              ▼
┌─────────────────────────────────────────────────────────────┐
│       Expand selected search results based on expansion      │
│                         method                               │
│                          2114                                │
└─────────────────────────────────────────────────────────────┘
                              │
                              ▼
┌─────────────────────────────────────────────────────────────┐
│         Store user interaction data in knowledge database    │
│                          2116                                │
└─────────────────────────────────────────────────────────────┘
                              │
                              ▼
                          ( End )
```

FIGURE 21

DETERMINING A USER-SPECIFIC APPROACH FOR DISAMBIGUATION BASED ON AN INTERACTION RECOMMENDATION MACHINE LEARNING MODEL

CROSS-REFERENCE TO RELATED APPLICATIONS

This application is a continuation of the co-pending U.S. patent application titled, "DETERMINING A USER-SPE-CIFIC APPROACH FOR DISAMBIGUATION BASED ON AN INTERACTION RECOMMENDATION MACHINE LEARNING MODEL," filed on Sep. 12, 2022 and having Ser. No. 17/943,037, which is a continuation of the co-pending U.S. patent application titled, "DETERMIN-ING A USER-SPECIFIC APPROACH FOR DISAMBIGU-ATION BASED ON AN INTERACTION RECOMMEN-DATION MACHINE LEARNING MODEL," filed on Feb. 13, 2020 and having Ser. No. 16/790,554, issued as U.S. Pat. No. 11,461,320, which is a continuation of the co-pending U.S. patent application titled, "DETERMINING A USER-SPECIFIC APPROACH FOR DISAMBIGUATION BASED ON AN INTERACTION RECOMMENDATION MACHINE LEARNING MODEL," filed on Jul. 29, 2017 and having Ser. No. 15/663,726, issued as U.S. Pat. No. 10,565,196. The subject matter of these related applications is hereby incorporated herein by reference.

BACKGROUND OF THE INVENTION

Field of the Invention

Embodiments of the present invention relate generally to computer and data science and, more specifically, to adapt-able techniques for interfacing with data sources via natural language.

Description of the Related Art

Many information technology (IT) environments enable the access of massive quantities of diverse data stored across multiple data sources. For example, an IT environment could enable users to access text documents, user-generated data stored in a variety of relational database management systems, and machine-generated data stored in systems, such as SPLUNK® ENTERPRISE systems. While the availabil-ity of massive quantities of diverse data provides opportu-nities to derive new insights that increase the usefulness and value of IT systems, a common problem associated with IT environments is that curating, searching, and analyzing the data is quite technically challenging.

In particular, different data sources may be associated with different domain-specific languages (DSLs), and a user that is unfamiliar with a given DSL may have difficulty retrieving and analyzing some of the available data. For example, suppose that a user is proficient in SQL (Structured Query Language), but is unfamiliar with SPL (SPLUNK® search processing language). The user could retrieve and analyze data from a MySQL (My Structured Query Lan-guage) database using SQL, but the user would have diffi-culty retrieving and analyzing data from a Splunk data source.

In an effort to enable users to access and analyze data from a wide variety of data sources without expertise in the associated DSL(s), natural language (NL) data applications have been developed. In operation, a NL data application extracts and curates metadata associated with the different data sources, translates a given NL request to an appropriate DSL request, applies the DSL request to the corresponding domain-specific data source to retrieve the data relevant to the original NL request, performs various operations on the retrieved data, and displays the results. One limitation of NL data applications is that oftentimes an NL request is ambigu-ous, and determining the intent of the user usually involves subjecting the user to a time-consuming, interactive, and oftentimes repetitive interrogation process. These interroga-tion processes are inefficient and can be annoying to users.

For example, suppose that a user requests "sales by price" to obtain unit sales by price in Colorado for the previous week. A typical NL data application would request a variety of disambiguating information from the user, such as type of sales, geographical region, and time period. And suppose that each subsequent week, the user issues a request to obtain unit sales in Colorado for the previous week. If the user were to accidentally request "sales by price" instead of "unit sales by price in Colorado for the previous week," the NL data application would repeat the requests for disam-biguating information noted above.

As the foregoing illustrates, what is needed in the art are more effective techniques for interfacing with various under-lying data sources via natural language applications.

SUMMARY OF THE INVENTION

One embodiment of the present invention sets forth a method for disambiguating and executing a natural language (NL) query. The method includes generating an inquiry based on a first ambiguous natural language (NL) query received from a user and a first interaction model that associates the first ambiguous NL query and the user with the inquiry, where the first interaction model is generated via a machine learning algorithm; causing the inquiry to be provided to the user; generating a clarification based on a second ambiguous NL query received from the user and a second interaction model that associates the second ambigu-ous NL query with the clarification, wherein the second interaction model is generated via the machine learning algorithm trained on data produced in conjunction with one or more user responses to the inquiry; causing the clarifi-cation to be provided to the user; generating a disambiguated query based on the second ambiguous NL query and the clarification, where the disambiguated query is written in a domain-specific language (DSL) associated with a data storage system; and causing the disambiguated query to be applied to the data storage system.

Further embodiments provide, among other things, a computer-readable medium and a system configured to implement the method set forth above.

One advantage of the disclosed techniques is that the template facilitates a flexible framework that may be readily tailored to reduce the amount of time and user effort asso-ciated with processing NL requests and to increase the overall accuracy of NL application implementations. Nota-bly, the effectiveness and/or functionality of an NL appli-cation that implements the disclosed techniques may be increased based on updates to templates, without changes to the NL application software.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5C provides a visual representation of the manner in which a pipelined search language or query operates, in accordance with example embodiments;

FIG. 10 illustrates how the request processing engine and the request generator of FIG. 9 translate an NL request to a domain-specific language (DSL) request and execute the DSL request, in accordance with example embodiments;

FIG. 13 is a flow diagram of method steps for disambiguating and executing an NL request, in accordance with example embodiments;

FIG. 17 is a flow diagram of method steps for generating and executing a follow-up NL request based on an initial NL request, in accordance with example embodiments;

FIG. 19 is a flow diagram of method steps for presenting search results, in accordance with example embodiments;

FIG. 21 is a flow diagram of method steps for expanding a set of search results, in accordance with example embodiments.

DETAILED DESCRIPTION

Figure 1:
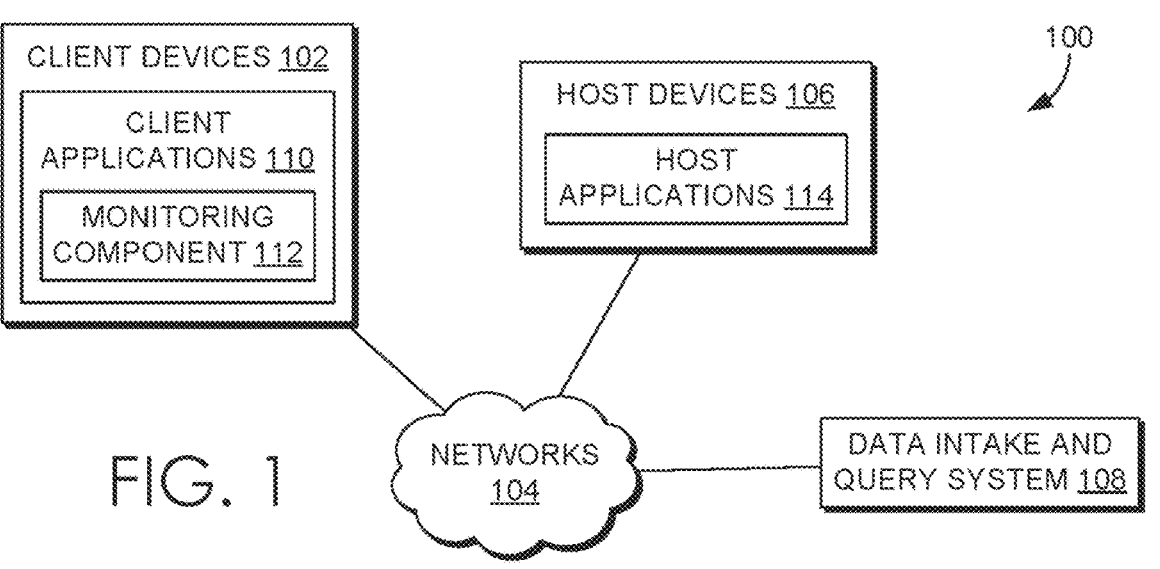
FIG. 1 is a block diagram of an example networked computer environment, in accordance with example embodiments.

In the following description, numerous specific details are set forth to provide a more thorough understanding of the present invention. However, it will be apparent to one of skilled in the art that the present invention may be practiced without one or more of these specific details.

General Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, California. The SPLUNK® ENTERPRISE system is the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the data intake and query system, machine data are collected and stored as "events". An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp that is derived from the portion of machine data in the event. A timestamp of an event may be determined through interpolation between temporally proximate events having known timestamps or may be determined based on other configurable rules for associating timestamps with events.

In some instances, machine data can have a predefined format, where data items with specific data formats are stored at predefined locations in the data. For example, the machine data may include data associated with fields in a database table. In other instances, machine data may not have a predefined format (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system uses a flexible schema to specify how to extract information from events. A flexible schema may be developed and redefined as needed. Note that a flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp. The system stores the events in a data store. The system enables users to run queries against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file includes one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source type. When events are to be searched based on a particular field name specified in a search, the system uses one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system utilizes a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from events. In some cases, an extraction rule comprises a regular expression, where a sequence of characters form a search pattern. An extraction rule comprising a regular expression is referred to herein as a regex rule. The system applies a regex rule to an event to extract values for a field associated with the regex rule, where the values are extracted by searching the event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

Operating Environment

FIG. 1 is a block diagram of an example networked computer environment 100, in accordance with example embodiments. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and a data intake and query system 108 via one or more networks 104.

Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

Client Devices

Client devices 102 of FIG. 1 represent any computing device capable of interacting with one or more host devices 106 via a network 104. For example, the client devices 102 could include internet addressable computing devices. Examples of client devices 102 may include, without limitation, smart phones, tablet computers, handheld computers, wearable devices, laptop computers, desktop computers, servers, portable media players, gaming devices, machines, equipment, robots, and so forth. In general, a client device 102 can provide access to different content, for instance, content provided by one or more host devices 106, etc. Each client device 102 may comprise one or more client applications 110, described in more detail in a separate section hereinafter.

Client Device Applications

In some embodiments, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In some embodiments, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In some embodiments, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some embodiments, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In some embodiments, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In some embodiments, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In some embodiments, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In some embodiments, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In some embodiments, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

Data Server System

Figure 2:
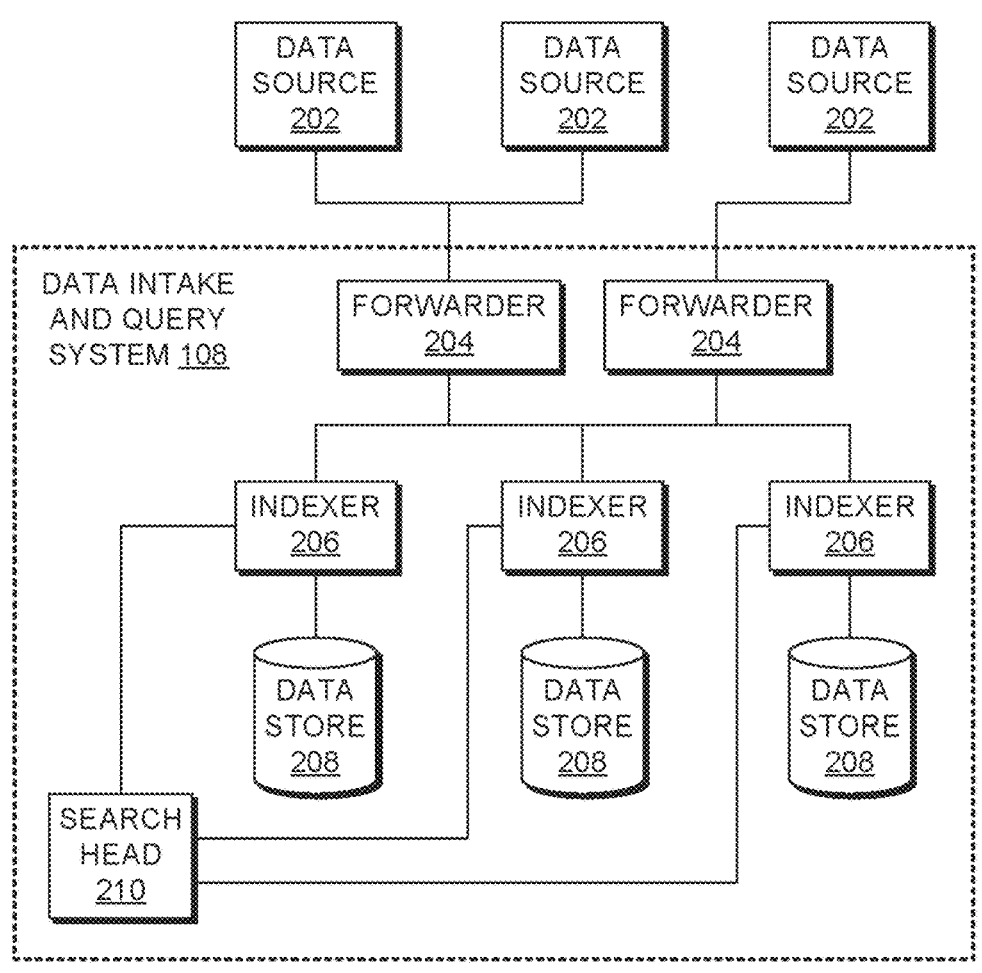
FIG. 2 is a block diagram of an example data intake and query system, in accordance with example embodiments.

FIG. 2 is a block diagram of an example data intake and query system 108, in accordance with example embodiments. System 108 includes one or more forwarders 204 that receive data from a variety of input data sources 202, and one or more indexers 206 that process and store the data in one or more data stores 208. These forwarders 204 and indexers 208 can comprise separate computer systems, or may alternatively comprise separate processes executing on one or more computer systems.

Each data source 202 broadly represents a distinct source of data that can be consumed by system 108. Examples of a data sources 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In some embodiments, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers 206. Data store 208 may contain events derived from machine data from a variety of sources all pertaining to the same component in an IT environment, and this data may be produced by the machine in question or by other components in the IT environment.

Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 3:
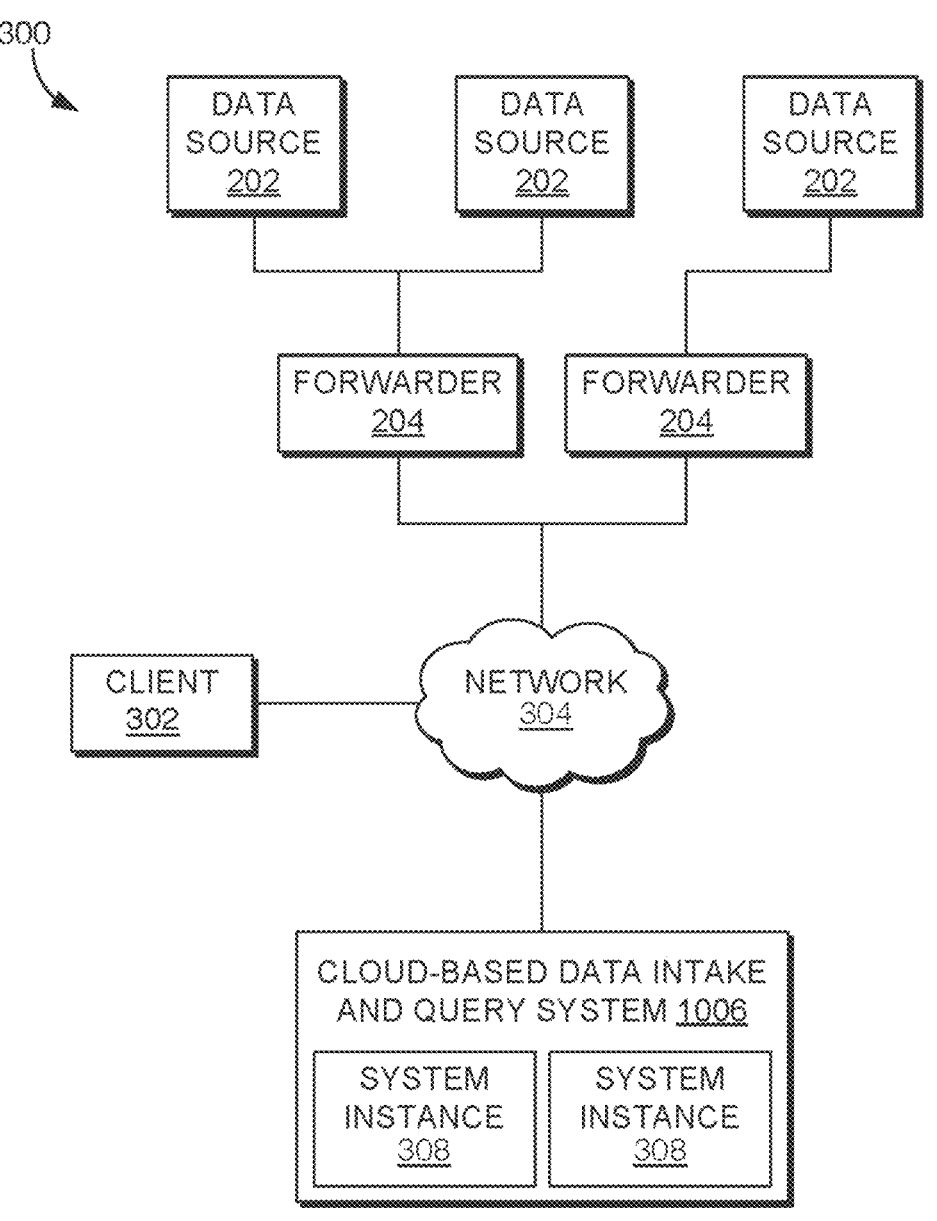
FIG. 3 is a block diagram of an example cloud-based data intake and query system, in accordance with example embodiments.

FIG. 3 illustrates a block diagram of an example cloud-based data intake and query system. Similar to the system of FIG. 2, the networked computer system 300 includes input data sources 202 and forwarders 204. These input data sources and forwarders may be in a subscriber's private computing environment. Alternatively, they might be directly managed by the service provider as part of the cloud service. In the example system 300, one or more forwarders 204 and client devices 302 are coupled to a cloud-based data intake and query system 306 via one or more networks 304. Network 304 broadly represents one or more LANs, WANs, cellular networks, intranetworks, internetworks, etc., using any of wired, wireless, terrestrial microwave, satellite links, etc., and may include the public Internet, and is used by client devices 302 and forwarders 204 to access the system 306. Similar to the system of 38, each of the forwarders 204 may be configured to receive data from an input source and to forward the data to other components of the system 306 for further processing.

In some embodiments, a cloud-based data intake and query system 306 may comprise a plurality of system instances 308. In general, each system instance 308 may include one or more computing resources managed by a provider of the cloud-based system 306 made available to a particular subscriber. The computing resources comprising a system instance 308 may, for example, include one or more servers or other devices configured to implement one or more forwarders, indexers, search heads, and other components of a data intake and query system, similar to system 108. As indicated above, a subscriber may use a web browser or other application of a client device 302 to access a web portal or other interface that enables the subscriber to configure an instance 308.

Providing a data intake and query system as described in reference to system 108 as a cloud-based service presents a number of challenges. Each of the components of a system 108 (e.g., forwarders, indexers, and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 308) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment, such as SPLUNK® ENTERPRISE, and a cloud-based environment, such as SPLUNK CLOUD™, are centrally visible).

Searching Externally-Archived Data

Figure 4:
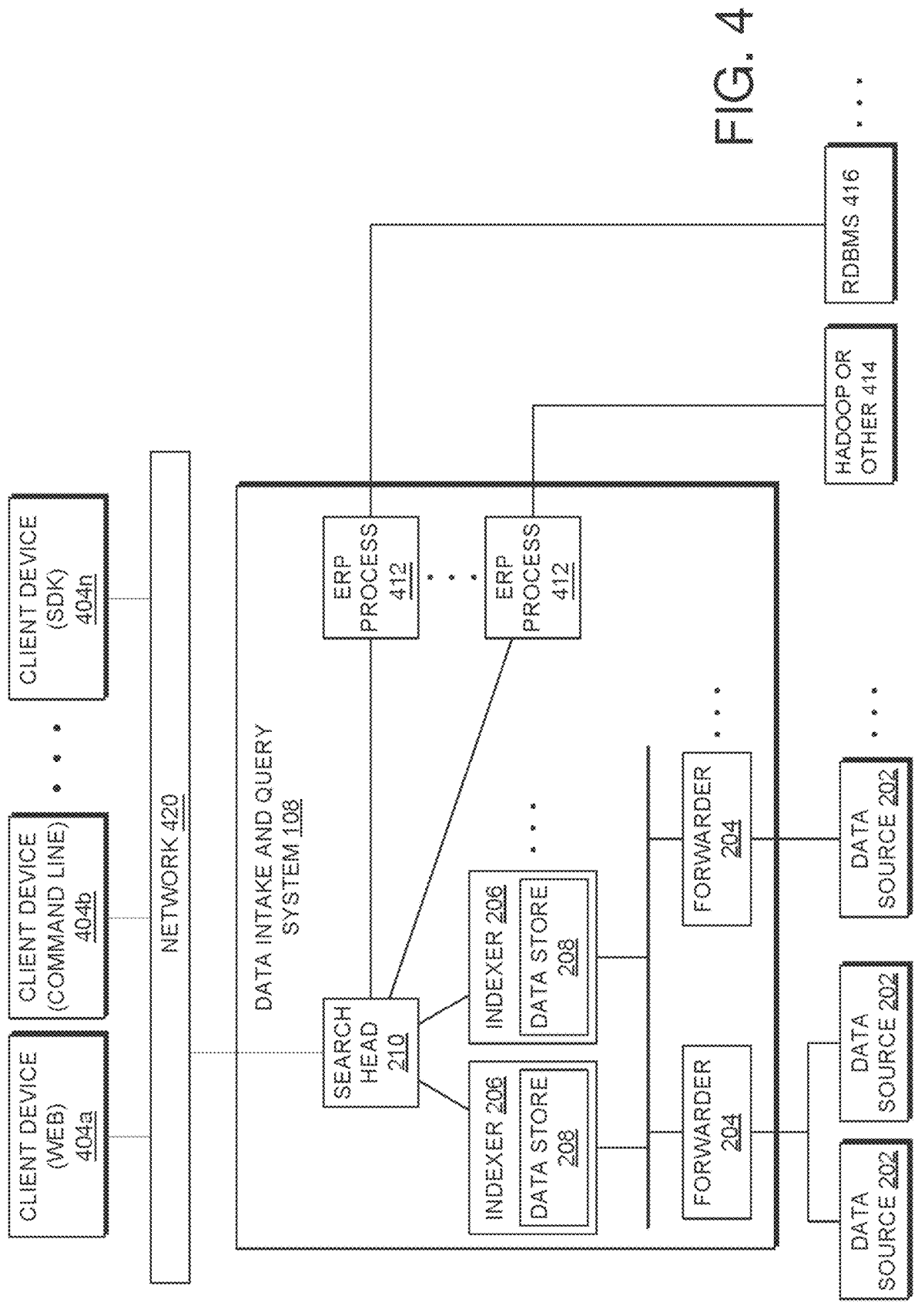
FIG. 4 is a block diagram of an example data intake and query system that performs searches across external data systems, in accordance with example embodiments.

FIG. 4 shows a block diagram of an example of a data intake and query system 108 that provides transparent search facilities for data systems that are external to the data intake and query system. Such facilities are available in the Splunk® Analytics for Hadoop® system provided by Splunk Inc. of San Francisco, California. Splunk® Analytics for Hadoop® represents an analytics platform that enables business and IT teams to rapidly explore, analyze, and visualize data in Hadoop® and NoSQL data stores.

The search head 210 of the data intake and query system receives search requests from one or more client devices 404 over network connections 420. As discussed above, the data intake and query system 108 may reside in an enterprise location, in the cloud, etc. FIG. 4 illustrates that multiple client devices 404a, 404b, . . . , 404n may communicate with the data intake and query system 108. The client devices 404 may communicate with the data intake and query system using a variety of connections. For example, one client device in FIG. 4 is illustrated as communicating over an Internet (Web) protocol, another client device is illustrated as communicating via a command line interface, and another client device is illustrated as communicating via a software developer kit (SDK).

The search head 210 analyzes the received search request to identify request parameters. If a search request received from one of the client devices 404 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 410. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 410, 412. FIG. 4 shows two ERP processes 410, 412 that connect to respective remote (external) virtual indices, which are indicated as a Hadoop or another system 414 (e.g., Amazon S3, Amazon EMR, other Hadoop® Compatible File Systems (HCFS), etc.) and a relational database management system (RDBMS) 416. Other virtual indices may include other file organizations and protocols, such as Structured Query Language (SQL) and the like. The ellipses between the ERP processes 410, 412 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to a SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 410, 412 receive a search request from the search head 210. The search head may optimize the received search request for execution at the respective external virtual index. Alternatively, the ERP process may receive a search request as a result of analysis performed by the search head or by a different system process. The ERP processes 410, 412 can communicate with the search head 210 via conventional input/output routines (e.g., standard in/standard out, etc.). In this way, the ERP process receives the search request from a client device such that the search request may be efficiently executed at the corresponding external virtual index.

The ERP processes 410, 412 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 410, 412 generate appropriate search requests in the protocol and syntax of the respective virtual indices 414, 416, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 404 may communicate with the data intake and query system 108 through a network interface 420, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "External Result Provided Process For RetriEving Data Stored Using A Different Configuration Or Protocol", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. Pat. No. 9,514,189, entitled "PROCESSING A SYSTEM SEARCH REQUEST INCLUDING EXTERNAL DATA SOURCES", issued on 6 Dec. 2016, each of which is hereby incorporated by reference in its entirety for all purposes.

ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the machine data obtained from the external data source) are provided to the search head, which can then process the results data (e.g., break the machine data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the machined data or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of machine data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the machine data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One examplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTER-PRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return machine data to the search head. As noted, the ERP process could be configured to operate in streaming mode alone and return just the machine data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all machine data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

Data Ingestion

Figure 5A:
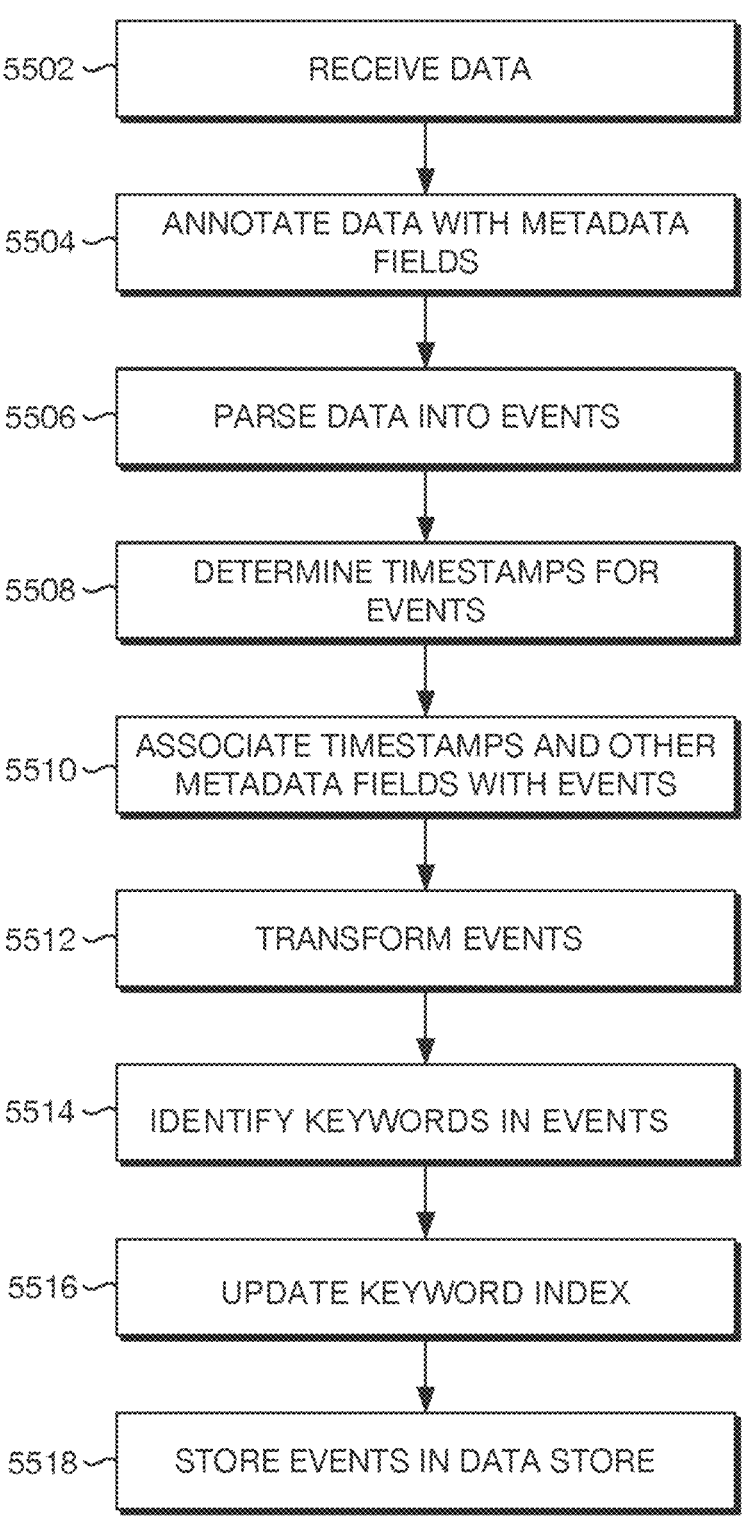
FIG. 5A is a flowchart of an example method that illustrates how indexers process, index, and store data received from forwarders, in accordance with example embodiments.

FIG. 5A is a flow chart of an example method that illustrates how indexers process, index, and store data received from forwarders, in accordance with example embodiments. The data flow illustrated in FIG. 5A is provided for illustrative purposes only; those skilled in the art would understand that one or more of the steps of the processes illustrated in FIG. 5A may be removed or that the ordering of the steps may be changed. Furthermore, for the purposes of illustrating a clear example, one or more particular system components are described in the context of performing various operations during each of the data flow stages. For example, a forwarder is described as receiving and processing machine data during an input phase; an indexer is described as parsing and indexing machine data during parsing and indexing phases; and a search head is described as performing a search query during a search phase. However, other system arrangements and distributions of the processing steps across system components may be used.

Input

At block 502, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In some embodiments, a forwarder receives the raw data and may segment the data stream into "blocks", possibly of a uniform data size, to facilitate subsequent processing steps.

At block 504, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In some embodiments, a forwarder forwards the annotated data blocks to another system component (typically an indexer) for further processing.

The data intake and query system allows forwarding of data from one data intake and query instance to another, or even to a third-party system. The data intake and query system can employ different types of forwarders in a configuration.

In some embodiments, a forwarder may contain the essential components needed to forward data. A forwarder can gather data from a variety of inputs and forward the data to an indexer for indexing and searching. A forwarder can also tag metadata (e.g., source, source type, host, etc.).

In some embodiments, a forwarder has the capabilities of the aforementioned forwarder as well as additional capabilities. The forwarder can parse data before forwarding the data (e.g., can associate a time stamp with a portion of data and create an event, etc.) and can route data based on criteria such as source or type of event. The forwarder can also index data locally while forwarding the data to another indexer.

Parsing

At block 506, an indexer receives data blocks from a forwarder and parses the data to organize the data into events. In some embodiments, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, the indexer can apply an inferred source type definition to the data to create the events.

At block 508, the indexer determines a timestamp for each event. Similar to the process for parsing machine data, an indexer may again refer to a source type definition associated with the data to locate one or more properties that indicate instructions for determining a timestamp for each event. The properties may, for example, instruct an indexer to extract a time value from a portion of data for the event, to interpolate time values based on timestamps associated with temporally proximate events, to create a timestamp based on a time the portion of machine data was received or generated, to use the timestamp of a previous event, or use any other rules for determining timestamps.

At block 510, the indexer associates with each event one or more metadata fields including a field containing the timestamp determined for the event. In some embodiments, a timestamp may be included in the metadata fields. These metadata fields may include any number of "default fields" that are associated with all events, and may also include one more custom fields as defined by a user. Similar to the metadata fields associated with the data blocks at block 504, the default metadata fields associated with each event may include a host, source, and source type field including or in addition to a field storing the timestamp.

At block 512, an indexer may optionally apply one or more transformations to data included in the events created at block 506. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to events may, for example, be specified in one or more configuration files and referenced by one or more source type definitions.

FIG. 5C illustrates an illustrative example of machine data can be stored in a data store in accordance with various disclosed embodiments. In other embodiments, machine data can be stored in a flat file in a corresponding bucket with an associated index file, such as a time series index or "TSIDX." As such, the depiction of machine data and associated metadata as rows and columns in the table of FIG. 5C is merely illustrative and is not intended to limit the data format in which the machine data and metadata is stored in various embodiments described herein. In one particular embodiment, machine data can be stored in a compressed or encrypted formatted. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

As mentioned above, certain metadata, e.g., host 536, source 537, source type 538 and timestamps 535 can be generated for each event, and associated with a corresponding portion of machine data 539 when storing the event data in a data store, e.g., data store 208. Any of the metadata can be extracted from the corresponding machine data, or supplied or defined by an entity, such as a user or computer system. The metadata fields can become part of or stored with the event. Note that while the time-stamp metadata field can be extracted from the raw data of each event, the values for the other metadata fields may be determined by the indexer based on information it receives pertaining to the source of the data separate from the machine data.

While certain default or user-defined metadata fields can be extracted from the machine data for indexing purposes, all the machine data within an event can be maintained in its original condition. As such, in embodiments in which the portion of machine data included in an event is unprocessed or otherwise unaltered, it is referred to herein as a portion of raw machine data. In other embodiments, the port of machine data in an event can be processed or otherwise altered. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various default fields.

In FIG. 5C, the first three rows of the table represent events 531, 532, and 533 and are related to a server access log that records requests from multiple clients processed by a server, as indicated by entry of "access.log" in the source column 536.

In the example shown in FIG. 5C, each of the events 531-534 is associated with a discrete request made from a client device. The raw machine data generated by the server and extracted from a server access log can include the IP address of the client 540, the user id of the person requesting the document 541, the time the server finished processing the request 542, the request line from the client 543, the status code returned by the server to the client 545, the size of the object returned to the client (in this case, the gif file requested by the client) 546 and the time spent to serve the request in microseconds 544. As seen in FIG. 5C, all the raw machine data retrieved from the server access log is retained and stored as part of the corresponding events, 1221, 1222, and 1223 in the data store.

Event 534 is associated with an entry in a server error log, as indicated by "error.log" in the source column 537, that records errors that the server encountered when processing a client request. Similar to the events related to the server access log, all the raw machine data in the error log file pertaining to event 534 can be preserved and stored as part of the event 534.

Saving minimally processed or unprocessed machine data in a data store associated with metadata fields in the manner similar to that shown in FIG. 5C is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

Indexing

At blocks 514 and 516, an indexer can optionally generate a keyword index to facilitate fast keyword searching for events. To build a keyword index, at block 514, the indexer identifies a set of keywords in each event. At block 516, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for field name-value pairs found in events, where a field name-value pair can include a pair of keywords connected by a symbol, such as an equals sign or colon. This way, events containing these field name-value pairs can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2".

At block 518, the indexer stores the events with an associated timestamp in a data store 208. Timestamps enable a user to search for events based on a time range. In some embodiments, the stored events are organized into "buckets," where each bucket stores events associated with a specific time range based on the timestamps associated with each event. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize the data retrieval process by searching buckets corresponding to time ranges that are relevant to a query.

In some embodiments, each indexer has a home directory and a cold directory. The home directory of an indexer stores hot buckets and warm buckets, and the cold directory of an indexer stores cold buckets. A hot bucket is a bucket that is capable of receiving and storing events. A warm bucket is a bucket that can no longer receive events for storage but has not yet been moved to the cold directory. A cold bucket is a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, an indexer may also have a quarantine bucket that contains events having potentially inaccurate information, such as an incorrect time stamp associated with the event or a time stamp that appears to be an unreasonable time stamp for the corresponding event. The quarantine bucket may have events from any time range; as such, the quarantine bucket may always be searched at search time. Additionally, an indexer may store old, archived data in a frozen bucket that is not capable of being searched at search time. In some embodiments, a frozen bucket may be stored in slower and/or larger memory, such as a hard disk, and may be stored in offline and/or remote storage.

Moreover, events and buckets can also be replicated across different indexers and data stores to facilitate high availability and disaster recovery as described in U.S. Pat. No. 9,130,971, entitled "Site-Based Search Affinity", issued on 8 Sep. 2015, and in U.S. patent Ser. No. 14/266,817, entitled "Multi-Site Clustering", issued on 1 Sep. 2015, each of which is hereby incorporated by reference in its entirety for all purposes.

Figure 5B:
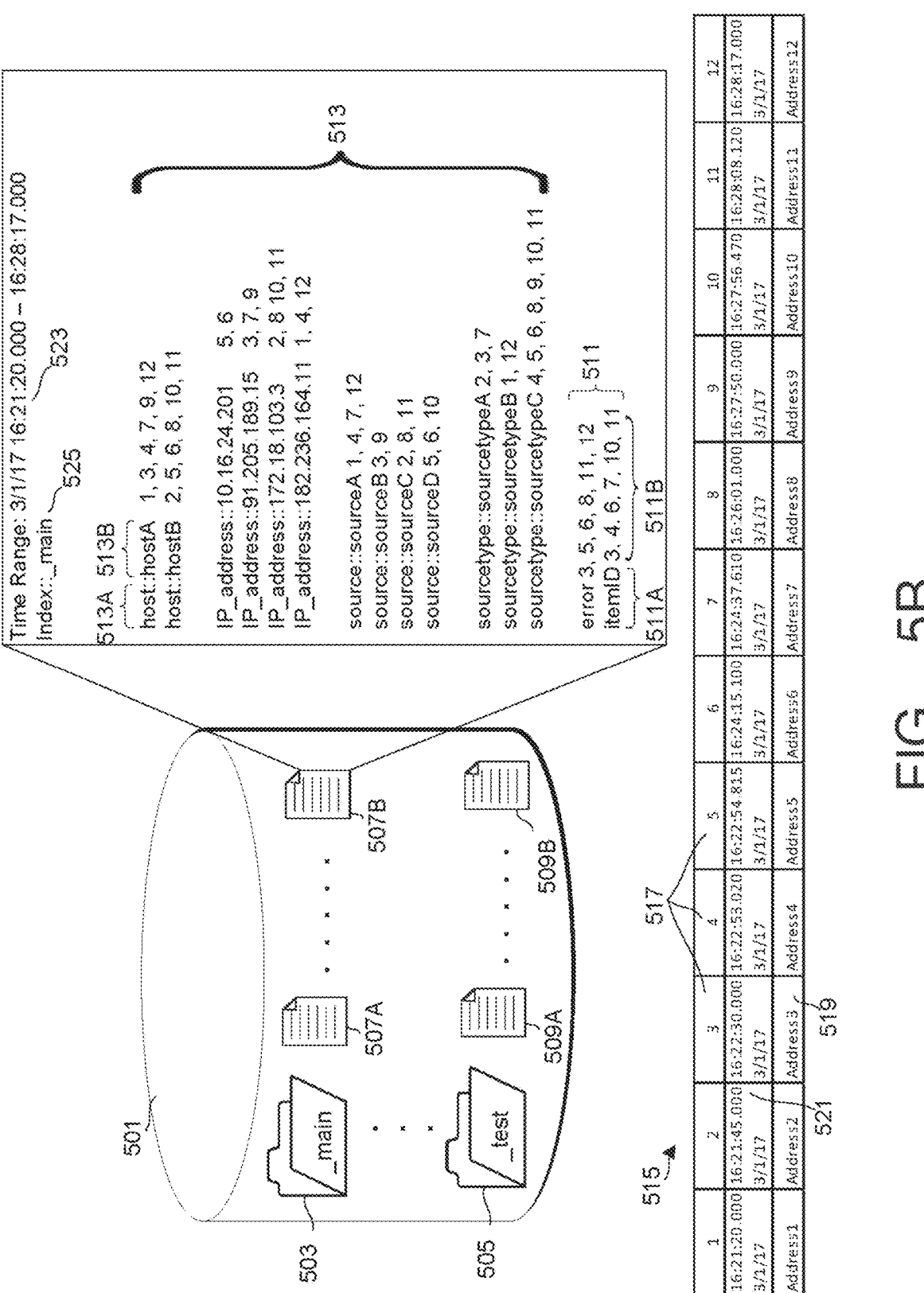
FIG. 5B is a block diagram of a data structure in which time-stamped event data can be stored in a data store, in accordance with example embodiments.

FIG. 5B is a block diagram of an example data store 501 that includes a directory for each index (or partition) that contains a portion of data managed by an indexer. FIG. 5B further illustrates details of an embodiment of an inverted index 507B and an event reference array 515 associated with inverted index 507B.

The data store 501 can correspond to a data store 208 that stores events managed by an indexer 206 or can correspond to a different data store associated with an indexer 206. In the illustrated embodiment, the data store 501 includes a _main directory 503 associated with a main index and a _test directory 505 associated with a _test index. However, the data store 501 can include fewer or more directories. In some embodiments, multiple indexes can share a single directory or all indexes can share a common directory. Additionally, although illustrated as a single data store 501, it will be understood that the data store 501 can be implemented as multiple data stores storing different portions of the information shown in FIG. 5B. For example, a single index or partition can span multiple directories or multiple data stores, and can be indexed or searched by multiple corresponding indexers.

In the illustrated embodiment of FIG. 5B, the index-specific directories 503 and 505 include inverted indexes 507A, 507B and 509A, 509B, respectively. The inverted indexes 507A . . . 507B, and 509A . . . 509B can be keyword indexes or field-value pair indexes described herein and can include less or more information that depicted in FIG. 5B.

In some embodiments, the inverted index 507A . . . 507B, and 509A . . . 509B can correspond to a distinct time-series bucket that is managed by the indexer 206 and that contains events corresponding to the relevant index (e.g., _main index, _test index). As such, each inverted index can correspond to a particular range of time for an index. Additional files, such as high performance indexes for each time-series bucket of an index, can also be stored in the same directory as the inverted indexes 507A . . . 507B, and 509A . . . 509B. In some embodiments inverted index 507A . . . 507B, and 509A . . . 509B can correspond to multiple time-series buckets or inverted indexes 507A . . . 507B, and 509A . . . 509B can correspond to a single time-series bucket.

Each inverted index 507A . . . 507B, and 509A . . . 509B can include one or more entries, such as keyword (or token) entries or field-value pair entries. Furthermore, in certain embodiments, the inverted indexes 507A . . . 507B, and 509A . . . 509B can include additional information, such as a time range 523 associated with the inverted index or an index identifier 525 identifying the index associated with the inverted index 507A . . . 507B, and 509A . . . 509B. However, each inverted index 507A . . . 507B, and 509A . . . 509B can include less or more information than depicted.

Token entries, such as token entries 511 illustrated in inverted index 507B, can include a token 511A (e.g., "error," "itemID," etc.) and event references 511B indicative of events that include the token. For example, for the token "error," the corresponding token entry includes the token "error" and an event reference, or unique identifier, for each event stored in the corresponding time-series bucket that includes the token "error." In the illustrated embodiment of FIG. 5B, the error token entry includes the identifiers 3, 5, 6, 8, 11, and 12 corresponding to events managed by the indexer 206 and associated with the index_main 503 that are located in the time-series bucket associated with the inverted index 507B.

In some cases, some token entries can be default entries, automatically determined entries, or user specified entries. In some embodiments, the indexer 206 can identify each word or string in an event as a distinct token and generate a token entry for it. In some cases, the indexer 206 can identify the beginning and ending of tokens based on punctuation, spaces, as described in greater detail herein. In certain cases, the indexer 206 can rely on user input or a configuration file to identify tokens for token entries 511, etc. It will be understood that any combination of token entries can be included as a default, automatically determined, a or included based on user-specified criteria.

Similarly, field-value pair entries, such as field-value pair entries 513 shown in inverted index 507B, can include a field-value pair 513A and event references 513B indicative of events that include a field value that corresponds to the field-value pair. For example, for a field-value pair source-type::sendmail, a field-value pair entry would include the field-value pair sourcetype::sendmail and a unique identifier, or event reference, for each event stored in the corresponding time-series bucket that includes a sendmail sourcetype.

In some cases, the field-value pair entries 513 can be default entries, automatically determined entries, or user specified entries. As a non-limiting example, the field-value pair entries for the fields host, source, sourcetype can be included in the inverted indexes 507A . . . 507B, and 509A . . . 509B as a default. As such, all of the inverted indexes 507A . . . 507B, and 509A . . . 509B can include field-value pair entries for the fields host, source, source-type. As yet another non-limiting example, the field-value pair entries for the IP_address field can be user specified and may only appear in the inverted index 507B based on user-specified criteria. As another non-limiting example, as the indexer indexes the events, it can automatically identify field-value pairs and create field-value pair entries. For example, based on the indexers review of events, it can identify IP_address as a field in each event and add the IP_address field-value pair entries to the inverted index 507B. It will be understood that any combination of field-value pair entries can be included as a default, automatically determined, or included based on user-specified criteria.

Each unique identifier 517, or event reference, can correspond to a unique event located in the time series bucket. However, the same event reference can be located in multiple entries. For example if an event has a sourcetype splunkd, host www1 and token "warning," then the unique identifier for the event will appear in the field-value pair entries sourcetype::splunkd and host::www1, as well as the token entry "warning." With reference to the illustrated embodiment of FIG. 5B and the event that corresponds to the event reference 3, the event reference 3 is found in the field-value pair entries 513 host::hostA, source::sourceB, sourcetype::sourcetypeA, and IP_address::91.205.189.15 indicating that the event corresponding to the event references is from hostA, sourceB, of sourcetypeA, and includes 91.205.189.15 in the event data.

For some fields, the unique identifier is located in only one field-value pair entry for a particular field. For example, the inverted index may include four sourcetype field-value pair entries corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 5B, since the event reference 7 appears in the field-value pair entry sourcetype::sourcetypeA, then it does not appear in the other field-value pair entries for the sourcetype field, including sourcetype::sourcetypeB, sourcetype::sourcetypeC, and sourcetype::sourcetypeD.

The event references 517 can be used to locate the events in the corresponding bucket. For example, the inverted index can include, or be associated with, an event reference array 515. The event reference array 515 can include an array entry 517 for each event reference in the inverted index 507B. Each array entry 517 can include location information 519 of the event corresponding to the unique identifier (non-limiting example: seek address of the event), a time-stamp 521 associated with the event, or additional information regarding the event associated with the event reference, etc.

For each token entry 511 or field-value pair entry 513, the event reference 501B or unique identifiers can be listed in chronological order or the value of the event reference can be assigned based on chronological data, such as a time-stamp associated with the event referenced by the event reference. For example, the event reference 1 in the illustrated embodiment of FIG. 5B can correspond to the firstin-time event for the bucket, and the event reference 12 can correspond to the last-in-time event for the bucket. However, the event references can be listed in any order, such as reverse chronological order, ascending order, descending order, or some other order, etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 5B, the entries are sorted first by entry type and then alphabetically.

As a non-limiting example of how the inverted indexes 507A . . . 507B, and 509A . . . 509B can be used during a data categorization request command, the indexers can receive filter criteria indicating data that is to be categorized and categorization criteria indicating how the data is to be categorized. Example filter criteria can include, but is not limited to, indexes (or partitions), hosts, sources, source-types, time ranges, field identifier, keywords, etc.

Using the filter criteria, the indexer identifies relevant inverted indexes to be searched. For example, if the filter criteria includes a set of partitions, the indexer can identify the inverted indexes stored in the directory corresponding to the particular partition as relevant inverted indexes. Other means can be used to identify inverted indexes associated with a partition of interest. For example, in some embodiments, the indexer can review an entry in the inverted indexes, such as an index-value pair entry 513 to determine if a particular inverted index is relevant. If the filter criteria does not identify any partition, then the indexer can identify all inverted indexes managed by the indexer as relevant inverted indexes.

Similarly, if the filter criteria includes a time range, the indexer can identify inverted indexes corresponding to buckets that satisfy at least a portion of the time range as relevant inverted indexes. For example, if the time range is last hour then the indexer can identify all inverted indexes that correspond to buckets storing events associated with timestamps within the last hour as relevant inverted indexes.

When used in combination, an index filter criterion specifying one or more partitions and a time range filter criterion specifying a particular time range can be used to identify a subset of inverted indexes within a particular directory (or otherwise associated with a particular partition) as relevant inverted indexes. As such, the indexer can focus the processing to only a subset of the total number of inverted indexes that the indexer manages.

Once the relevant inverted indexes are identified, the indexer can review them using any additional filter criteria to identify events that satisfy the filter criteria. In some cases, using the known location of the directory in which the relevant inverted indexes are located, the indexer can determine that any events identified using the relevant inverted indexes satisfy an index filter criterion. For example, if the filter criteria includes a partition main, then the indexer can determine that any events identified using inverted indexes within the partition main directory (or otherwise associated with the partition main) satisfy the index filter criterion.

Furthermore, based on the time range associated with each inverted index, the indexer can determine that that any events identified using a particular inverted index satisfies a time range filter criterion. For example, if a time range filter criterion is for the last hour and a particular inverted index corresponds to events within a time range of 50 minutes ago to 35 minutes ago, the indexer can determine that any events identified using the particular inverted index satisfy the time range filter criterion. Conversely, if the particular inverted index corresponds to events within a time range of 59 minutes ago to 62 minutes ago, the indexer can determine that some events identified using the particular inverted index may not satisfy the time range filter criterion.

Using the inverted indexes, the indexer can identify event references (and therefore events) that satisfy the filter criteria. For example, if the token "error" is a filter criterion, the indexer can track all event references within the token entry "error." Similarly, the indexer can identify other event references located in other token entries or field-value pair entries that match the filter criteria. The system can identify event references located in all of the entries identified by the filter criteria. For example, if the filter criteria include the token "error" and field-value pair sourcetype::web_ui, the indexer can track the event references found in both the token entry "error" and the field-value pair entry sourcetype::web_ui. As mentioned previously, in some cases, such as when multiple values are identified for a particular filter criterion (e.g., multiple sources for a source filter criterion), the system can identify event references located in at least one of the entries corresponding to the multiple values and in all other entries identified by the filter criteria. The indexer can determine that the events associated with the identified event references satisfy the filter criteria.

In some cases, the indexer can further consult a timestamp associated with the event reference to determine whether an event satisfies the filter criteria. For example, if an inverted index corresponds to a time range that is partially outside of a time range filter criterion, then the indexer can consult a timestamp associated with the event reference to determine whether the corresponding event satisfies the time range criterion. In some embodiments, to identify events that satisfy a time range, the indexer can review an array, such as the event reference array 1614 that identifies the time associated with the events. Furthermore, as mentioned above using the known location of the directory in which the relevant inverted indexes are located (or other index identifier), the indexer can determine that any events identified using the relevant inverted indexes satisfy the index filter criterion.

In some cases, based on the filter criteria, the indexer reviews an extraction rule. In certain embodiments, if the filter criteria includes a field name that does not correspond to a field-value pair entry in an inverted index, the indexer can review an extraction rule, which may be located in a configuration file, to identify a field that corresponds to a field-value pair entry in the inverted index.

For example, the filter criteria includes a field name "sessionID" and the indexer determines that at least one relevant inverted index does not include a field-value pair entry corresponding to the field name sessionID, the indexer can review an extraction rule that identifies how the sessionID field is to be extracted from a particular host, source, or sourcetype (implicitly identifying the particular host, source, or sourcetype that includes a sessionID field). The indexer can replace the field name "sessionID" in the filter criteria with the identified host, source, or sourcetype. In some cases, the field name "sessionID" may be associated with multiples hosts, sources, or sourcetypes, in which case, all identified hosts, sources, and sourcetypes can be added as filter criteria. In some cases, the identified host, source, or sourcetype can replace or be appended to a filter criterion, or be excluded. For example, if the filter criteria includes a criterion for source S1 and the "sessionID" field is found in source S2, the source S2 can replace S1 in the filter criteria, be appended such that the filter criteria includes source S1 and source S2, or be excluded based on the presence of the filter criterion source S1. If the identified host, source, or sourcetype is included in the filter criteria, the indexer can then identify a field-value pair entry in the inverted index that includes a field value corresponding to the identity of the particular host, source, or sourcetype identified using the extraction rule.

Once the events that satisfy the filter criteria are identified, the system, such as the indexer 206 can categorize the results based on the categorization criteria. The categorization criteria can include categories for grouping the results, such as any combination of partition, source, sourcetype, or host, or other categories or fields as desired.

The indexer can use the categorization criteria to identify categorization criteria-value pairs or categorization criteria values by which to categorize or group the results. The categorization criteria-value pairs can correspond to one or more field-value pair entries stored in a relevant inverted index, one or more index-value pairs based on a directory in which the inverted index is located or an entry in the inverted index (or other means by which an inverted index can be associated with a partition), or other criteria-value pair that identifies a general category and a particular value for that category. The categorization criteria values can correspond to the value portion of the categorization criteria-value pair.

As mentioned, in some cases, the categorization criteria-value pairs can correspond to one or more field-value pair entries stored in the relevant inverted indexes. For example, the categorization criteria-value pairs can correspond to field-value pair entries of host, source, and sourcetype (or other field-value pair entry as desired). For instance, if there are ten different hosts, four different sources, and five different sourcetypes for an inverted index, then the inverted index can include ten host field-value pair entries, four source field-value pair entries, and five sourcetype field-value pair entries. The indexer can use the nineteen distinct field-value pair entries as categorization criteria-value pairs to group the results.

Specifically, the indexer can identify the location of the event references associated with the events that satisfy the filter criteria within the field-value pairs, and group the event references based on their location. As such, the indexer can identify the particular field value associated with the event corresponding to the event reference. For example, if the categorization criteria include host and sourcetype, the host field-value pair entries and sourcetype field-value pair entries can be used as categorization criteria-value pairs to identify the specific host and sourcetype associated with the events that satisfy the filter criteria.

In addition, as mentioned, categorization criteria-value pairs can correspond to data other than the field-value pair entries in the relevant inverted indexes. For example, if partition or index is used as a categorization criterion, the inverted indexes may not include partition field-value pair entries. Rather, the indexer can identify the categorization criteria-value pair associated with the partition based on the directory in which an inverted index is located, information in the inverted index, or other information that associates the inverted index with the partition, etc. As such a variety of methods can be used to identify the categorization criteria-value pairs from the categorization criteria.

Accordingly based on the categorization criteria (and categorization criteria-value pairs), the indexer can generate groupings based on the events that satisfy the filter criteria. As a non-limiting example, if the categorization criteria includes a partition and sourcetype, then the groupings can correspond to events that are associated with each unique combination of partition and sourcetype. For instance, if there are three different partitions and two different source-types associated with the identified events, then the six different groups can be formed, each with a unique partition value-sourcetype value combination. Similarly, if the cat-egorization criteria includes partition, sourcetype, and host and there are two different partitions, three sourcetypes, and five hosts associated with the identified events, then the indexer can generate up to thirty groups for the results that satisfy the filter criteria. Each group can be associated with a unique combination of categorization criteria-value pairs (e.g., unique combinations of partition value sourcetype value, and host value).

In addition, the indexer can count the number of events associated with each group based on the number of events that meet the unique combination of categorization criteria for a particular group (or match the categorization criteria-value pairs for the particular group). With continued reference to the example above, the indexer can count the number of events that meet the unique combination of partition, sourcetype, and host for a particular group.

Each indexer communicates the groupings to the search head. The search head can aggregate the groupings from the indexers and provide the groupings for display. In some cases, the groups are displayed based on at least one of the host, source, sourcetype, or partition associated with the groupings. In some embodiments, the search head can further display the groups based on display criteria, such as a display order or a sort order as described in greater detail above.

As a non-limiting example and with reference to FIG. 5B, consider a request received by an indexer 206 that includes the following filter criteria: keyword=error, partition=_main, time range=3/1/17 16:22.00.000-16:28.00.000, sourcetype=sourcetypeC, host=hostB, and the following categorization criteria: source.

Based on the above criteria, the indexer 206 identifies_ main directory 503 and can ignore_test directory 505 and any other partition-specific directories. The indexer deter-mines that inverted partition 507B is a relevant partition based on its location within the _main directory 503 and the time range associated with it. For sake of simplicity in this example, the indexer 206 determines that no other inverted indexes in the _main directory 503, such as inverted index 507A satisfy the time range criterion.

Having identified the relevant inverted index 507B, the indexer reviews the token entries 511 and the field-value pair entries 513 to identify event references, or events, that satisfy all of the filter criteria.

With respect to the token entries 511, the indexer can review the error token entry and identify event references 3, 5, 6, 8, 11, 12, indicating that the term "error" is found in the corresponding events. Similarly, the indexer can identify event references 4, 5, 6, 8, 9, 10, 11 in the field-value pair entry sourcetype::sourcetypeC and event references 2, 5, 6, 8, 10, 11 in the field-value pair entry host::hostB. As the filter criteria did not include a source or an IP_address field-value pair, the indexer can ignore those field-value pair entries.

In addition to identifying event references found in at least one token entry or field-value pair entry (e.g., event references 3, 4, 5, 6, 8, 9, 10, 11, 12), the indexer can identify events (and corresponding event references) that satisfy the time range criterion using the event reference array 1614 (e.g., event references 2, 3, 4, 5, 6, 7, 8, 9, 10). Using the information obtained from the inverted index 507B (including the event reference array 515), the indexer 206 can identify the event references that satisfy all of the filter criteria (e.g., event references 5, 6, 8).

Having identified the events (and event references) that satisfy all of the filter criteria, the indexer 206 can group the event references using the received categorization criteria (source). In doing so, the indexer can determine that event references 5 and 6 are located in the field-value pair entry source::sourceD (or have matching categorization criteria-value pairs) and event reference 8 is located in the field-value pair entry source::sourceC. Accordingly, the indexer can generate a sourceC group having a count of one corresponding to reference 8 and a sourceD group having a count of two corresponding to references 5 and 6. This information can be communicated to the search head. In turn the search head can aggregate the results from the various indexers and display the groupings. As mentioned above, in some embodiments, the groupings can be displayed based at least in part on the categorization criteria, including at least one of host, source, sourcetype, or partition.

It will be understood that a change to any of the filter criteria or categorization criteria can result in different groupings. As a one non-limiting example, a request received by an indexer 206 that includes the following filter criteria: partition=_main, time range=3/1/2017 3/1/17 16:21:20.000-16:28:17.000, and the following categorization criteria: host, source, sourcetype would result in the indexer identifying event references 1-12 as satisfying the filter criteria. The indexer would then generate up to 24 groupings corresponding to the 24 different combinations of the categorization criteria-value pairs, including host (hostA, hostB), source (sourceA, sourceB, sourceC, sourceD), and sourcetype (sourcetypeA, sourcetypeB, sourcetypeC). However, as there are only twelve events identifiers in the illustrated embodiment and some fall into the same grouping, the indexer generates eight groups and counts as follows:

Group 1 (hostA, sourceA, sourcetypeA): 1 (event reference 7)

Group 2 (hostA, sourceA, sourcetypeB): 2 (event references 1, 12)

Group 3 (hostA, sourceA, sourcetypeC): 1 (event reference 4)

Group 4 (hostA, sourceB, sourcetypeA): 1 (event reference 3)

Group 5 (hostA, sourceB, sourcetypeC): 1 (event reference 9)

Group 6 (hostB, sourceC, sourcetypeA): 1 (event reference 2)

Group 7 (hostB, sourceC, sourcetypeC): 2 (event references 8, 11)

Group 8 (hostB, sourceD, sourcetypeC): 3 (event references 5, 6, 10)

As noted, each group has a unique combination of categorization criteria-value pairs or categorization criteria values. The indexer communicates the groups to the search head for aggregation with results received from other indexers. In communicating the groups to the search head, the indexer can include the categorization criteria-value pairs for each group and the count. In some embodiments, the indexer can include more or less information. For example, the indexer can include the event references associated with each group and other identifying information, such as the indexer or inverted index used to identify the groups.

As another non-limiting examples, a request received by an indexer 206 that includes the following filter criteria: partition=_main, time range=3/1/17 3/1/17 16:21:20.000-

16:28:17.000, source=sourceA, sourceD, and keyword=itemID and the following categorization criteria: host, source, sourcetype would result in the indexer identifying event references 4, 7, and 10 as satisfying the filter criteria, and generate the following groups:

Group 1 (hostA, sourceA, sourcetypeC): 1 (event reference 4)

Group 2 (hostA, sourceA, sourcetypeA): 1 (event reference 7)

Group 3 (hostB, sourceD, sourcetypeC): 1 (event references 10)

The indexer communicates the groups to the search head for aggregation with results received from other indexers. As will be understand there are myriad ways for filtering and categorizing the events and event references. For example, the indexer can review multiple inverted indexes associated with an partition or review the inverted indexes of multiple partitions, and categorize the data using any one or any combination of partition, host, source, sourcetype, or other category, as desired.

Further, if a user interacts with a particular group, the indexer can provide additional information regarding the group. For example, the indexer can perform a targeted search or sampling of the events that satisfy the filter criteria and the categorization criteria for the selected group, also referred to as the filter criteria corresponding to the group or filter criteria associated with the group.

In some cases, to provide the additional information, the indexer relies on the inverted index. For example, the indexer can identify the event references associated with the events that satisfy the filter criteria and the categorization criteria for the selected group and then use the event reference array 515 to access some or all of the identified events. In some cases, the categorization criteria values or categorization criteria-value pairs associated with the group become part of the filter criteria for the review.

With reference to FIG. 5B for instance, suppose a group is displayed with a count of six corresponding to event references 4, 5, 6, 8, 10, 11 (i.e., event references 4, 5, 6, 8, 10, 11 satisfy the filter criteria and are associated with matching categorization criteria values or categorization criteria-value pairs) and a user interacts with the group (e.g., selecting the group, clicking on the group, etc.). In response, the search head communicates with the indexer to provide additional information regarding the group.

In some embodiments, the indexer identifies the event references associated with the group using the filter criteria and the categorization criteria for the group (e.g., categorization criteria values or categorization criteria-value pairs unique to the group). Together, the filter criteria and the categorization criteria for the group can be referred to as the filter criteria associated with the group. Using the filter criteria associated with the group, the indexer identifies event references 4, 5, 6, 8, 10, 11.

Based on a sampling criteria, discussed in greater detail above, the indexer can determine that it will analyze a sample of the events associated with the event references 4, 5, 6, 8, 10, 11. For example, the sample can include analyzing event data associated with the event references 5, 8, 10. In some embodiments, the indexer can use the event reference array 1616 to access the event data associated with the event references 5, 8, 10. Once accessed, the indexer can compile the relevant information and provide it to the search head for aggregation with results from other indexers. By identifying events and sampling event data using the inverted indexes, the indexer can reduce the amount of actual data this is analyzed and the number of events that are accessed in order to generate the summary of the group and provide a response in less time.

Query Processing

Figure 6A:
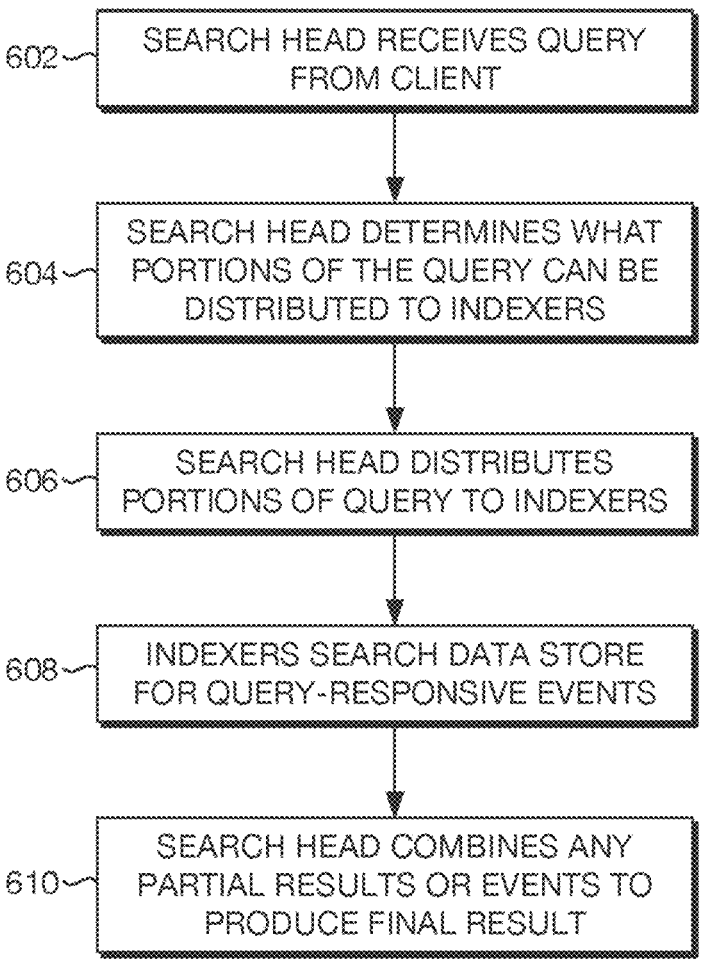
FIG. 6A is a flow diagram of an example method that illustrates how a search head and indexers perform a search query, in accordance with example embodiments.

FIG. 6A is a flow diagram of an example method that illustrates how a search head and indexers perform a search query, in accordance with example embodiments. At block 602, a search head receives a search query from a client. At block 604, the search head analyzes the search query to determine what portion(s) of the query can be delegated to indexers and what portions of the query can be executed locally by the search head. At block 606, the search head distributes the determined portions of the query to the appropriate indexers. In some embodiments, a search head cluster may take the place of an independent search head where each search head in the search head cluster coordinates with peer search heads in the search head cluster to schedule jobs, replicate search results, update configurations, fulfill search requests, etc. In some embodiments, the search head (or each search head) communicates with a master node (also known as a cluster master, not shown in FIG. 2) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 608, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 608 may use the late-binding schema to extract values for specified fields from events at the time the query is processed. In some embodiments, one or more rules for extracting field values may be specified as part of a source type definition in a configuration file. The indexers may then either send the relevant events back to the search head, or use the events to determine a partial result, and send the partial result back to the search head.

At block 610, the search head combines the partial results and/or events received from the indexers to produce a final result for the query. In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries, which may be particularly helpful for queries that are performed on a periodic basis.

Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can operate to search or filter for specific data in particular set of data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|". In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms at the beginning of the pipeline. Such search terms can include any combination of keywords, phrases, times, dates, Boolean expressions, fieldname-field value pairs, etc. that specify which results should be obtained from an index. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field value criteria. For example, a search command can filter out all events containing the word "warning" or filter out all events where a field value associated with a field "clientip" is "10.0.1.2."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns contain basic information about the data and also may contain data that has been dynamically extracted at search time.

Figure 6B:
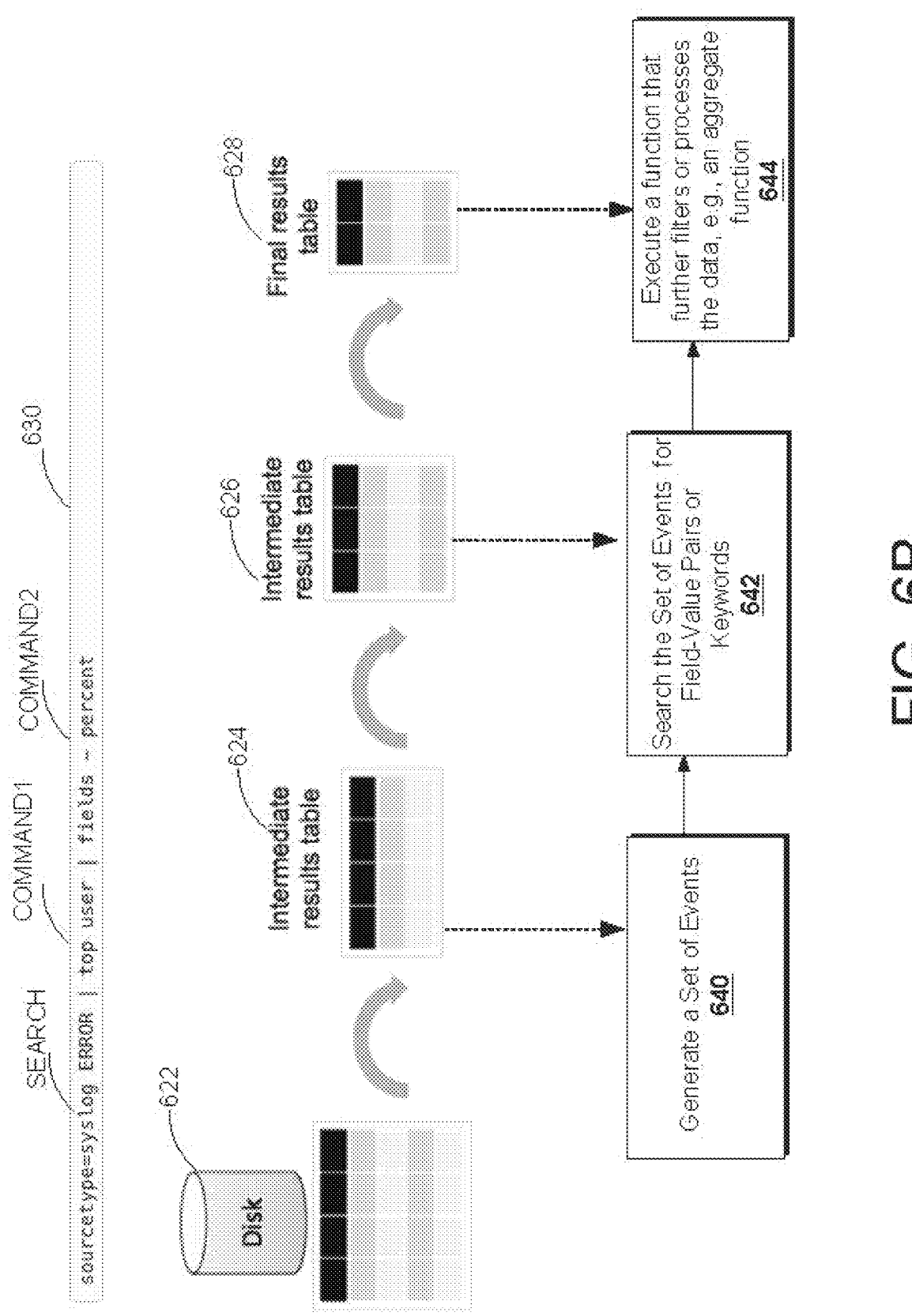
FIG. 6B provides a visual representation of an example manner in which a pipelined command language or query operates, in accordance with example embodiments.

FIG. 6B provides a visual representation of the manner in which a pipelined command language or query operates in accordance with the disclosed embodiments. The query 630 can be inputted by the user into a search. The query comprises a search, the results of which are piped to two commands (namely, command 1 and command 2) that follow the search step. Disk 622 represents the event data in the raw record data store.

When a user query is processed, a search step will precede other queries in the pipeline in order to generate a set of events at block 640. For example, the query can comprise search terms "sourcetype=syslog ERROR" at the front of the pipeline as shown in FIG. 6B. Intermediate results table 624 shows fewer rows because it represents the subset of events retrieved from the index that matched the search terms "sourcetype=syslog ERROR" from search command 630. By way of further example, instead of a search step, the set of events at the head of the pipeline may be generating by a call to a pre-existing inverted index (as will be explained later).

At block 642, the set of events generated in the first part of the query may be piped to a query that searches the set of events for field-value pairs or for keywords. For example, the second intermediate results table 626 shows fewer columns, representing the result of the top command, "top user" which summarizes the events into a list of the top 10 users and displays the user, count, and percentage.

Finally, at block 644, the results of the prior stage can be pipelined to another stage where further filtering or processing of the data can be performed, e.g., preparing the data for display purposes, filtering the data based on a condition, performing a mathematical calculation with the data, etc. As shown in FIG. 6B, the "fields-percent" part of command 630 removes the column that shows the percentage, thereby, leaving a final results table 628 without a percentage column. In different embodiments, other query languages, such as the Structured Query Language ("SQL"), can be used to create a query.

Dashboard

Figure 7:
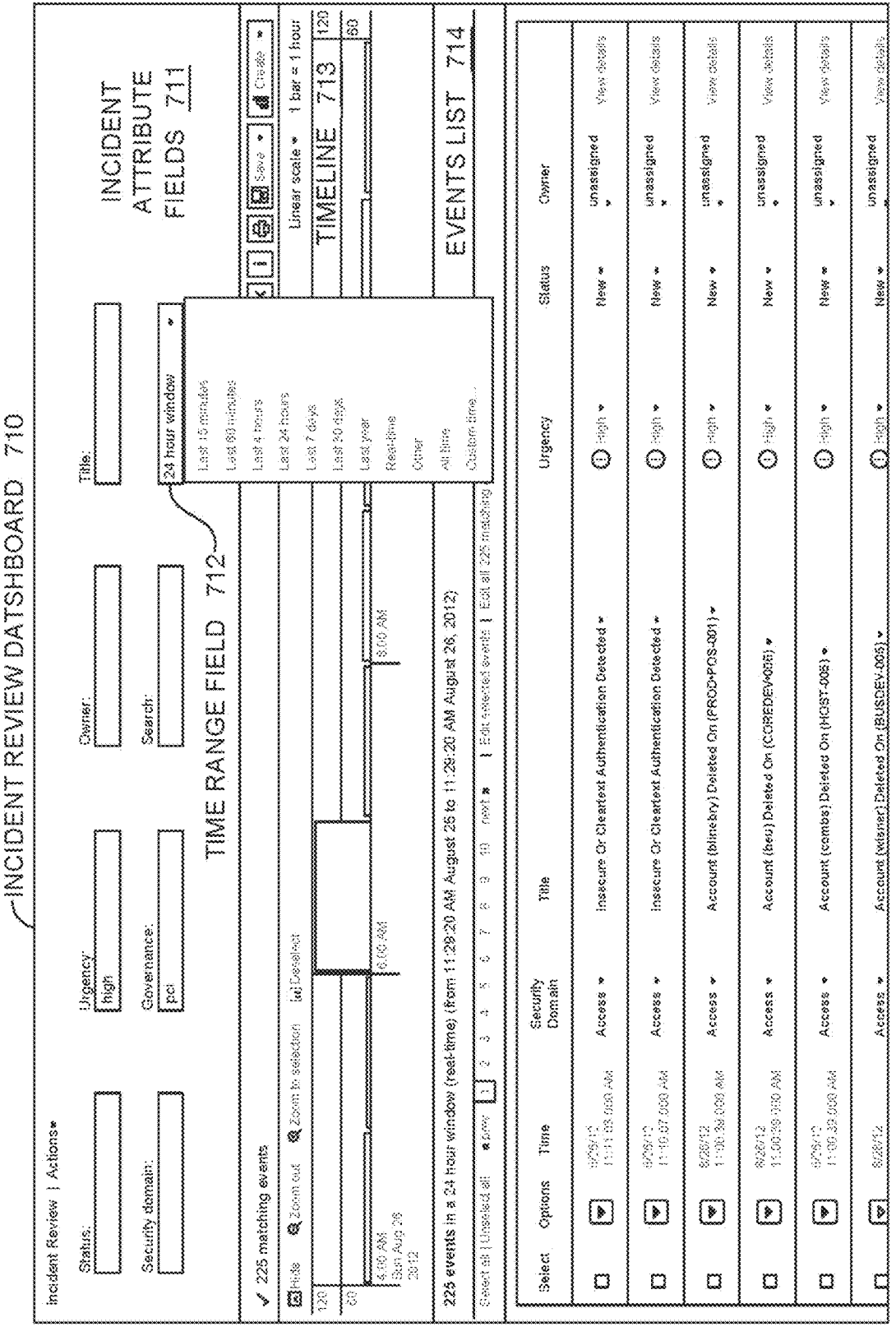
FIG. 7 is an interface diagram of an example user interface of an incident review dashboard, in accordance with example embodiments.

FIG. 7 illustrates an example incident review dashboard 710 that includes a set of incident attribute fields 711 that, for example, enables a user to specify a time range field 712 for the displayed events. It also includes a timeline 713 that graphically illustrates the number of incidents that occurred in time intervals over the selected time range. It additionally displays an events list 714 that enables a user to view a list of all of the notable events that match the criteria in the incident attributes fields 711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

Natural Language (NL) System Overview

Figure 8:
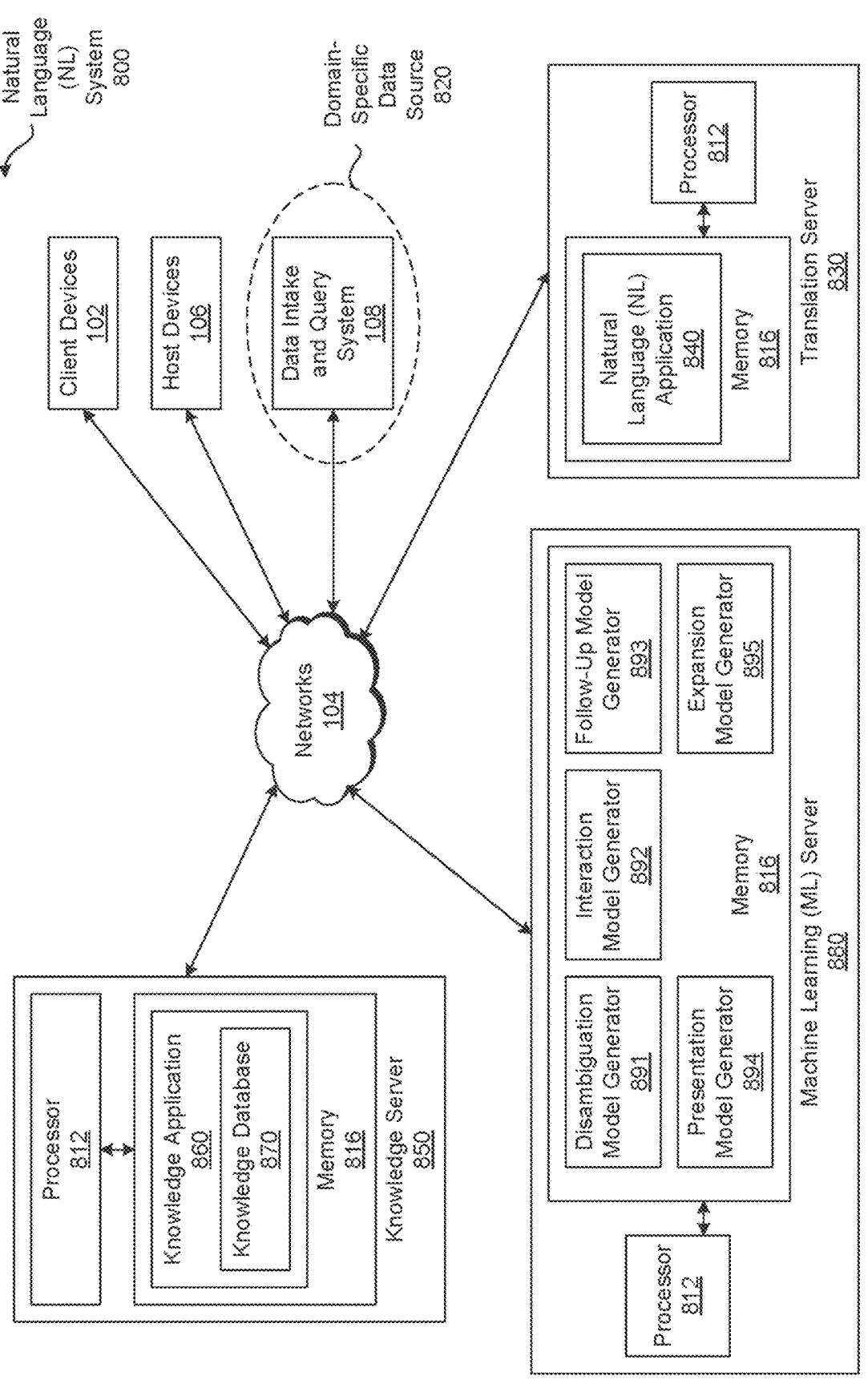
FIG. 8 illustrates a natural language (NL) system, in accordance with example embodiments.

FIG. 8 illustrates a natural language (NL) system 800, in accordance with example embodiments. As shown, the NL system 800 includes, without limitation, the data intake and query system 108, any number of the client devices 102, any number of the host devices 106, a translation server 830, a knowledge server 850, and a machine-learning (ML) server 880. For explanatory purposes, multiple instances of like objects are denoted with reference numbers identifying the object and parenthetical numbers identifying the instance, where needed.

The data intake and query system 108 is associated with the client devices 102 and the host devices 105 and comprises a domain-specific data source 820 through which users can retrieve and analyze data collected from the data sources 202 as described above. In alternate embodiments, the NL system 100 may includes any number of domain-specific data sources 820. For example, the NL system 100 could include any number of relational database management systems, such as MySQL (My Structured Query Language) systems, and any number of NoSQ (non SQL) systems, such as MongoDB. Domain-specific data sources 820 are also referred to herein as data storage systems.

Each of the domain-specific data sources 820 is associated with a different domain-specific language (DSL) that enables users that are proficient in the DSL to perform operations on entities (i.e., logical groupings of data) associated with the domain-specific data source 820. For instance, entities associated with the data intake and query system 108 can be accessed using requests written in SPL (SPLUNK® search processing language). As referred to herein, a request may comprise any command involving the entities. For example, a request could include any number of search commands, alert commands, and presentation (e.g., display, verbalization, etc.) commands, to name a few.

As shown, each of the translation server 830, the knowledge server 850, and the machine-learning (ML) server 880 includes, without limitation, a memory 816 and a processor 812. The servers, the memory 816, and the processor 812 may be implemented in any technically feasible fashion based on any number and type of resources included in the NL system 800. For example, the translation server 830 could be implemented in a cloud computing environment, a distributed computing environment, an on-premises server, a laptop, and so forth.

The processor 812 may be any instruction execution system, apparatus, or device capable of executing instructions. For example, the processor 812 could comprise a central processing unit (CPU), a graphics processing unit (GPU), a controller, a microcontroller, a state machine, or any combination thereof. The memory 816 stores content, such as software applications and data, for use by the processor 812. The memory 812 may be one or more of a readily available memory, such as random access memory (RAM), read only memory (ROM), hard disk, or any other form of digital storage, local or remote.

In some embodiments, a storage (not shown) may supplement or replace the memory 816. The storage may include any number and type of external memories that are accessible to the processor 812. For example, and without limitation, the storage may include a Secure Digital Card, an external Flash memory, a portable compact disc read-only memory (CD-ROM), an optical storage device, a magnetic storage device, cloud storage, other tangible storage media, or any suitable combination of the foregoing. Any number of software applications may be provided as an application program (or programs) stored on computer readable media such as a CD-ROM, DVD-ROM, flash memory module, or other tangible storage media.

In an effort to enable users to access and analyze data from a wide variety of data sources without expertise in the associated DSL(s), conventional natural language (NL) data applications have been developed. In operation, a conventional NL data application extracts and curates metadata associated with the different data sources, translates a given NL request to an appropriate DSL request, applies the DSL request to the corresponding domain-specific data source to retrieve the data relevant to the original NL request, performs various operations on the retrieved data, and displays the results. Applying a request to an associated domain-specific data source is also referred to herein as "executing the request." One limitation of conventional NL data applications is that oftentimes an NL request is ambiguous, and determining the intent of the user usually involves subjecting the user to a time-consuming, interactive, and oftentimes repetitive interrogation process. These interrogation processes are inefficient and can be annoying to users.

For example, suppose that a user requests "sales by price" to obtain unit sales by price in Colorado for the previous week. A conventional NL data application would typically request a variety of disambiguating information from the user, such as type of sales, geographical region, and time period. And suppose that each subsequent week, the user issues a request to obtain unit sales in Colorado for the previous week. If the user were to accidentally request "sales by price" instead of "unit sales by price in Colorado for the previous week," the NL data application would repeat the requests for disambiguating information noted above.

Efficiently Interacting with Data Sources Using NL Requests

To reduce the amount time and user effort associated with processing NL requests and to increase the overall accuracy of NL application implementations, the translation server 830, the knowledge server 860, and the ML server 880 work together to provide readily adaptable data interfacing services. Examples of data interfacing services include translation, analysis, and presentation operations, to name a few. To use the data interfacing services, users interact with the domain-specific data sources 820 using a natural language (NL) application 840.

The NL application 840 executes on the processor 812 of the translation server 830 and is stored in the memory 186 of the translation server 830. The NL application 840 performs data interfacing operations based on information stored in a knowledge database 870. The knowledge database 870 is included in the knowledge server 850 and managed by a knowledge application 860. Examples of information stored in the knowledge database 870 include DSL-specific templates, an interaction history database, and a variety of machine-learning (ML) models, to name a few.

In general, each of the ML models evolve and improve over time based on interactions with users. More specifically, as users interact with the domain-specific data sources 820 through the NL application 840, the NL application 840 stores relevant information in the knowledge database 870. Relevant information may include NL requests, DSL requests, clickstreams, and the like. Periodically, any number of ML model generators train corresponding ML learning models based on the knowledge database 870 and then store the trained ML learning models in the knowledge database 870.

In this fashion, the behavior of each of the ML learning models adapts over time to reflect the preferences of the users. For instance, in some embodiments, if the knowledge database 970 indicates that a John has repeatedly clarified that "sales by price" means "unit sales by price in Colorado," then an interaction ML model (not shown in FIG. 1) may automatically disambiguate "sales by price" for John without performing an interrogation. Further, as the behavior of the ML learning models improve, so does the uptake and use of the ML learning models, thereby creating a virtuous circle of learning.

Each of the ML model generators is stored in the memory 816 of the ML server 880 and executes on the processor 812 of the ML server 880. As shown, the ML model generators include, without limitation, a disambiguation model generator 891, an interaction model generator 892, a follow-up model generator 893, a presentation model generator 894, and an expansion model generator 895. In alternate embodiments, the NL system 800 may include any number and type of ML model generators, and the ML model generators may be included in any number and type of compute devices. Further, in some embodiments, the machine learning may be distributed throughout any number of compute devices included in the NL system 800—such that the natural language processing can be determined at the edge-rather than a central server.

In alternate embodiments, the memories 816 may not include any number of the NL application 830, the ML models, the knowledge application 860, and the knowledge database 870. Instead, any number and portions of the NL application 830, the ML models, the knowledge application 860, and the knowledge database 870 may be stored on and/or executed from computer readable media such as a flash drive, CD-ROM, DVD-ROM, flash memory module, or other tangible storage media.

It will be appreciated that the NL system 800 shown herein is illustrative and that variations and modifications are possible. The number of domain-specific data sources 820, the number of servers, the number of model generators, the number and locations of applications, and the connection topology between the various units in the NL system 800 may be modified as desired. Further, the functionality included in any of the applications may be divided across any number of applications that are stored and execute via any number of devices that are located in any number of physical locations.

Figure 9:
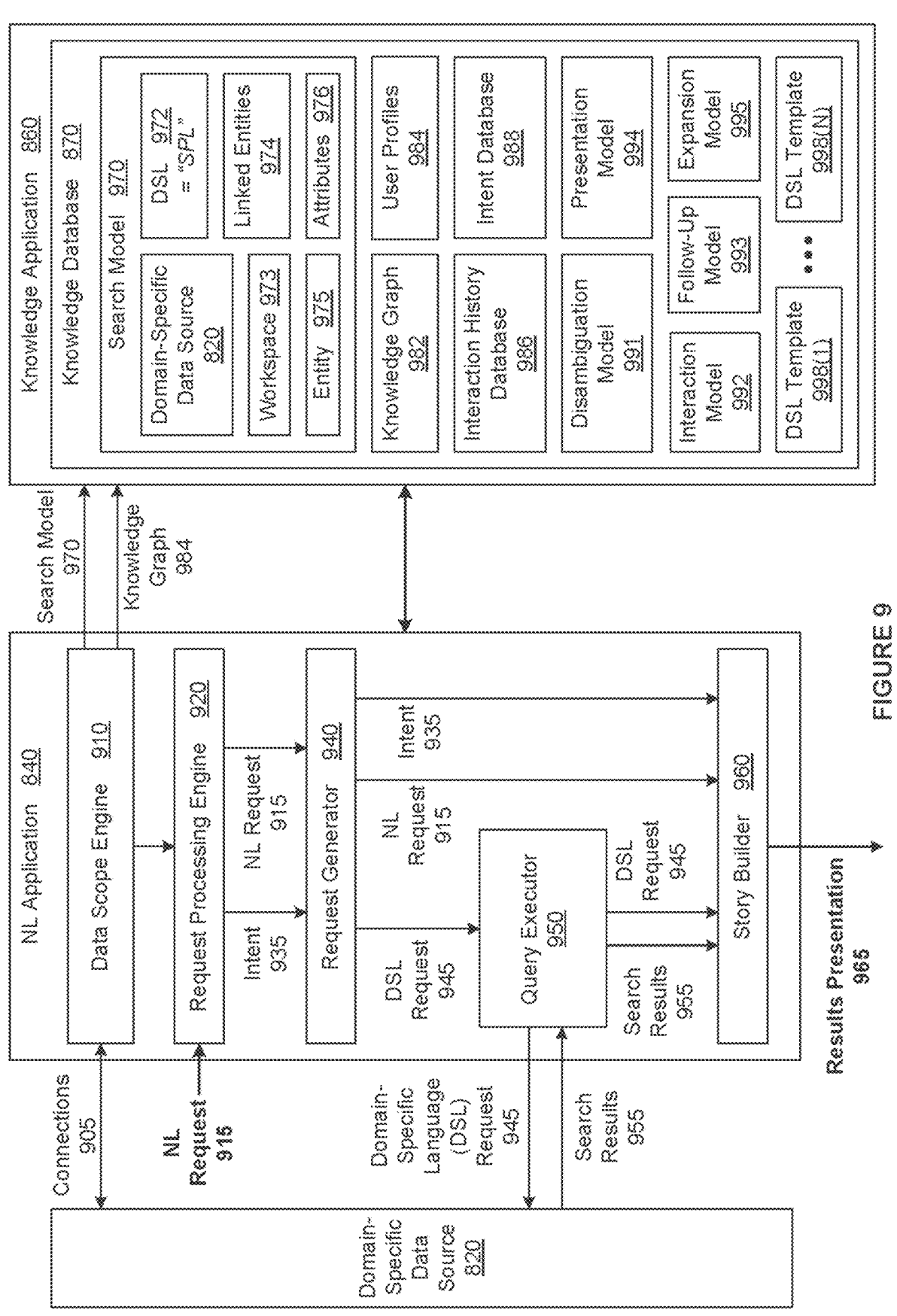
FIG. 9 is a more detailed illustration of the knowledge database and the NL application of FIG. 8, in accordance with example embodiments.

FIG. 9 is a more detailed illustration of the knowledge database 870 and the NL application 840 of FIG. 8, in accordance with example embodiments. As shown, the knowledge database 870 includes, without limitation, a search model 970, a knowledge graph 982, any number of user profiles 984, an interaction history database 986, an intent database 988, any number of DSL templates 988, a disambiguation model 991, an interaction model 992, a follow-up model 993, an expansion model 995, and a presentation model 994. In alternate embodiments, the knowledge database 870 may include any number of search models 970, any number of knowledge graphs 892, and any number and type of ML models.

The search model 970 specifies, without limitation, the domain-specific data source 820, the DSL 972, a workspace 973, entities 975, attributes 976, and linked entities 974. The search model 970 governs the way in which the NL application 840 performs a variety of processing operations involving NL requests 915. Among other things, the search model 970 facilities the validation of the NL requests 915, the analysis of each word included in the NL requests 915, and the mapping of each word to the corresponding domain-specific data source 820 to obtain accurate search results.

The domain-specific data source 820 represents the database for which the search model 970 is created. Examples of domain-specific data sources 820 include the data intake and query system 108, "Oracle/sales" which refers to an Oracle database table name "sales," and a REST (Representational State Transfer) endpoint "salesforce/sales" which refers to a Salesforce object named "sales." The workspace 973 is a collection of multiple domain-specific data sources 820. The entity 975 represents a logical collection of data that is associated with a domain-specific data source 820. For example, the entity 975 could be "sales representatives," "sales," or "store."

The attributes 976 are defined with respect to the entities 975. For example, if the entity 975 is "sales representatives," then the attributes 976 could include, without limitation, full name, phone number, commission rate, and city. The linked entities 974 specify relationships or links between multiple entities 975 across the domain-specific data sources 820 or the workspaces 973. For example, the entity 975(1) "sales representative" can be linked to the entity 975(2) "product" to establish a relationship between the sales representatives and the products that the sales representatives handle.

In general, the knowledge database 870 includes a separate search model 970 for each of the domain-specific data sources 820 and each of the workspaces 973. The entities 975 and the attributes 976 associated with a particular domain-specific data source 820 and within the scope of a DSL request operation, are included in the search model 970. For each of the entities 975, the attributes 976 related to the entity 975 are specified. Each of the attributes 976 is defined based on different parameters such as data type (e.g., string, number, or text), variety (e.g., finite, infinite, or random), roles allowed, and whether the data is searchable or aggregatable. The possible synonyms of the attributes 976 are also included in the search model 970. For example, the attribute 976 "product" may have synonyms such as "commodity", "merchandise", "goods", or "cargo." Including the synonyms in the search model 970 facilitates comprehensive analysis of the domain-specific data source 820.

The knowledge graph 982 specifies semantics of the data as well as the concepts used to resolve ambiguities to improve comprehension. In various embodiments, the knowledge database 870 may not include the knowledge graph 982. The user profiles 984 specify any number of characteristics associated with the users of the NL system 800. The interaction history database 986 includes any amount and type of information associated with the interactions of the users with the components of the NL system 800. For example, for each user, the interaction history database 986 could include information extracted from clickstreams, NL requests 915 issued by the user, and DSL requests 945 associated with the user.

The intent database 988 includes any number of predefined intents 935, where each intent 935 is semantically similar to any number of NL requests 915 and, consequently, correlates to the meanings of the NL requests 915. Importantly, the predefined intents 935 are agnostic with respect to the DSLs 972. Each of the DSL templates 988 is associated with one or more intents 935 and a particular DSL 972. Although not shown in FIG. 9, in some embodiments and for each supported DSL, the knowledge database 870 may include an intent mapping list that maps each of the predefined intents 935 to a corresponding DSL template 988 written in the DSL. The intent database 988 and the DSL templates 998 are described in greater detail in conjunction with FIGS. 10 and 11.

The disambiguation model 991, the interaction model 992, the follow-up model 993, the presentation model 994, and the expansion model 995 are machine-learning models that increase the efficiency of the NL application 840. The disambiguation model 991 is described greater detail in conjunction with FIGS. 12 and 13. The interaction model 992 is described greater detail in conjunction with FIGS. 14 and 15. The follow-up model 993 is described greater detail in conjunction with FIGS. 16 and 17. The presentation model 994 is described greater detail in conjunction with FIGS. 18 and 19. The expansion model 995 is described greater detail in conjunction with FIGS. 20 and 21.

As shown, the NL application 840 includes, without limitation, a data scope engine 910, a request processing engine 920, a request generator 940, a query executor 950, and a story builder 950. The data scope engine 910 connects to the domain-specific data sources 820 via connections 905, determines the associated DSLs, 972, and generates the search models 970 that expedite crawling of data included in the domain-specific data sources 820. In some embodiments, the data scope engine 910 also generates the knowledge graphs 984.

The request processing engine 920 receives the NL request 915 and performs intent inference operations to map the NL request 915 to one of the predefined intents 935 stored in the intent database 988. As part of mapping the NL request 915, if the request processing engine 920 determines that the NL request 915 is ambiguous, then the request processing engine 920 may generate an disambiguated NL request 915 based on the disambiguation model 991 and/or the interaction model 992. Both the disambiguation model 991 and the interaction model 992 facilitate disambiguation operations.

The disambiguation model 991 facilitates disambiguation based on a disambiguation recommendation associated with the NL request 915. By contrast, the interaction model 992 facilitates disambiguation based on an interaction recommendation associated with both the NL request 915 and the user that issued the NL request 915. In some embodiments, the request processing engine 920 may perform disambiguation operations based on both the disambiguation model 991 and the interaction model 992.

The request generator 940 selects one of the DSL templates 998 based on the intent 935 and the DSL 972. The request generator 940 then generates a DSL request 945 based on the intent 935, the DSL 972, the knowledge database 970, and any number of interactions (including zero) with the user. The query executor 950 applies the DSL request 954 to the associated domain-specific data source 820 to generate search results 955. In alternate embodiments, the functionality associated with translating the NL request 915 to the DSL request 945 may be distributed in any fashion across any applications. For example, in some embodiments, the request processing engine 920 could directly generate the DSL request 945.

Subsequently, the story builder 960 processes the search results 955. More specifically, the story builder 960 presents the search results 955 as a results presentation 965 based on a presentation format (e.g., a bar chart, a total number, a pie chart, etc.). The story builder 960 determines the presentation format based on the NL request 915, the search results 955, the presentation model 994, and any amount (including none) of user input. The results presentation 965 may be expressed via any medium. For example, the results presentation 965 could be expressed textually, graphically, or verbally.

Further, the story builder 960 may facilitate any number of user interactions with the results presentation 965. In particular, in response to a selection of a hierarchical component displayed via the results presentation 965 for a "drill down" operation, the story builder 960 determines an expansion method based on the NL request 915, the selected hierarchical component, the expansion model 995, and any amount (including none) of user input. For example, if a user selects a sector of a pie chart associated with "sales," then the story builder 960 could determine an expansion method of "product." The story builder 960 would then expand the data includes in the selected sector based on products.

Note that the techniques described herein are illustrative rather than restrictive, and may be altered without departing from the broader spirit and scope of the invention. Many modifications and variations on the functionality provided by the NL application 840, the ML model generators, the knowledge application 860, and the data intake and query system 108 will be apparent to those of ordinary skill in the art without departing from the scope and spirit of the described embodiments. For instance, in some embodiments, the story builder 960 could perform one or more operations based on the interaction model 992.

For explanatory purposes only, the NL application 840 is described herein in terms of operating on a single NL request 915 to generate a single intent 935 and a single DSL request 945. However, one or more of the techniques described herein may be used to operate on a single NL request 915 to generate multiple intents 935 and/or multiple DSL requests 945. Examples of situations in which one or more of the techniques could operate on a single NL request 915 to generate multiple DSL requests 945 include when the intent 935 is not expressible as a single DSL request 945, such as if the NL request 915 involves displaying two bar charts side-by-side. Other examples of situations in which one or more of the techniques could operate on a single NL request 915 to generate multiple DSL requests 945 include when the intent 935 involves executing multiple requests to compare properties of the executions, such as runtime. Yes other examples of situations in which one or more of the techniques could operate on a single NL request 915 to generate multiple DSL requests 945 include when the intent 935 may be optimally served by showing the results of executing multiple DSL requests 945 that show data from multiple angles. For example, in some embodiments, if the NL request 915 is "how are sales doing this quarter, then the NL application 840 may display a time-chart of sales across the entire organization over time and a multi-bar chart of the sales of each department within the organization for the current and previous quarters.

In general, any number of the techniques may be implemented while other techniques may be omitted in any technically feasible fashion that enables the NL application 840 to provide readily adaptable data interfacing services. For example, in some embodiments, the NL system 800 does not include the follow-up model generator 893 or the knowledge application 860. Further, in some embodiments, the NL application 840 may implement additional functionality. For example, in some embodiments, the NL application 840 may include data intake and query functionality, and may operate independently of the data intake and query system 108.

In alternate embodiments, any number of the components included in the system 800 may interact with any number of the other components included in the system 800 in any technically feasible fashion. For example, in some embodiments, the data intake and query system 108 may optimize presentation operations based on the presentation model 994 and/or the knowledge database 870.

As a general matter, any of the units included in the system 800 may receive input in any technically feasible fashion via any type of device. For instance, in some embodiments, the request processing engine 920 may receive an audible NL request 915 via an audio device. Similarly, any of the units included in the system 800 may transmit output in any technically feasible fashion via any type of device.

Translating NL Requests to DSL Requests

FIG. 10 illustrates how the request processing engine 920 and the request generator 940 of FIG. 9 translate the NL request 915 to the domain-specific language (DSL) request 945 and execute the DSL request 945, in accordance with example embodiments. More precisely, and for explanatory purposes only, FIG. 10 depicts how the request processing engine 920 and the request generator 940 translate the NL request 915 "create a model using Lasso that forecasts power consumption" to an disambiguated DSL request 945 written in SPL.

Upon receiving the NL request 915, the request processing engine 920 performs an intent inference process to map the NL request 915 to one of any number of predefined intents 935 included in the intent database 988. Importantly, the predefined intents 935 are agnostic with respect to DSL. As shown for explanatory purposes, the request processing engine 920 translates the NL request 915 "create a model using Lasso that forecasts power consumption" to the intent 935 "fit a model."

In general, the request processing engine 930 may perform any number and type of intent inference operations as part of the intent inference process. For instance, in some embodiments, the request processing engine 915 may perform semantic similarity operations as part of the intent inference process. In addition to intent inference operations, in some embodiments, the request processing engine 915 may perform any number and type of disambiguation operations on the NL request 915 prior to mapping the NL request 915 to the intent 935.

The request generator 940 includes, without limitation, a mapping engine 1010 and a property resolution engine 1020. In operation, the mapping engine 1010 selects one of the DSL templates 998 included in the knowledge database 870 based on the intent 935 and the DSL 972. In general, the mapping engine 1010 may select the DSL template 998 in any technically feasible fashion. For instance, in some embodiments, for each supported DSL, the knowledge database 870 includes an intent mapping list (not shown). For each of the predefined intents 935 included in the intent database 988, the intent mapping list for the DSL 972 specifies a corresponding DSL template 998 written in the DSL 972. As shown for explanatory purposes, the mapping engine 1010 selects the DSL template 988 "I fit [field1] [field2] from [field3] into [field4] fit_intercept=True" that is written in the DSL 972 "SPL."

Each of the DSL templates 998 may include any number of property fields that require values. Upon receiving the DSL template 998, the property resolution engine 1020 identifies any "unknown" property fields for which the property resolution engine 1020 is unable to determine values based on available data. Available data includes, without limitation, the NL request 915 and data included in the knowledge database 870. Subsequently, the property resolution engine 1020 interacts with the user to determine the desired values for the unknown properties fields.

For explanatory purposes, the property resolution engine 1020 identifies the property field "field 3" following "for," as an unknown property field. Accordingly, the property resolution engine 1020 generates an inquiry 1030 "please provide from field to use for forecast," and presents the inquiry 1030 to the user. The property resolution engine 1020 may present the inquiry 1030 to the user in any technically feasible fashion that is consistent with the communication techniques associated with the user. For example, if the request processing engine 920 received the NL request 915 verbally, then the property resolution engine 1020 could verbalize the inquiry 1030. As shown, the property resolution engine 1020 receives a response 1040 from the user. The response 1040 specifies the value "CPU memory."

The property resolution engine 1020 then generates the DSL request 945 based on the DSL template 988, the response 1040, and any other available data. As shown for explanatory purposes, the property resolution engine 1020 generate the DSL request 945 "=I fit Lasso power from CPU memory into lasso_model fit_intercept=True." Subsequently, the NL application 840 applies the DSL request 945 to the associated domain-specific data source 820.

In this fashion, the request processing engine 920 and the request generator 940 establish a flexible framework that maps the NL requests 915 to the user intents 935 and, subsequently, to the DSL requests 945 for any number of the DSLs 972. Advantageously, the flexible framework enables administrators to improve the effectiveness of the NL application 940 and/or extend the functionality of the NL application 940 without releasing a new version of the NL application 940. For example, administrators could modify any number and combination of the template database 988, the DSL templates 998, and the template intent mapping lists included in the knowledge database 870 asynchronously to a release cycle associated with the NL application 940.

Figure 11:
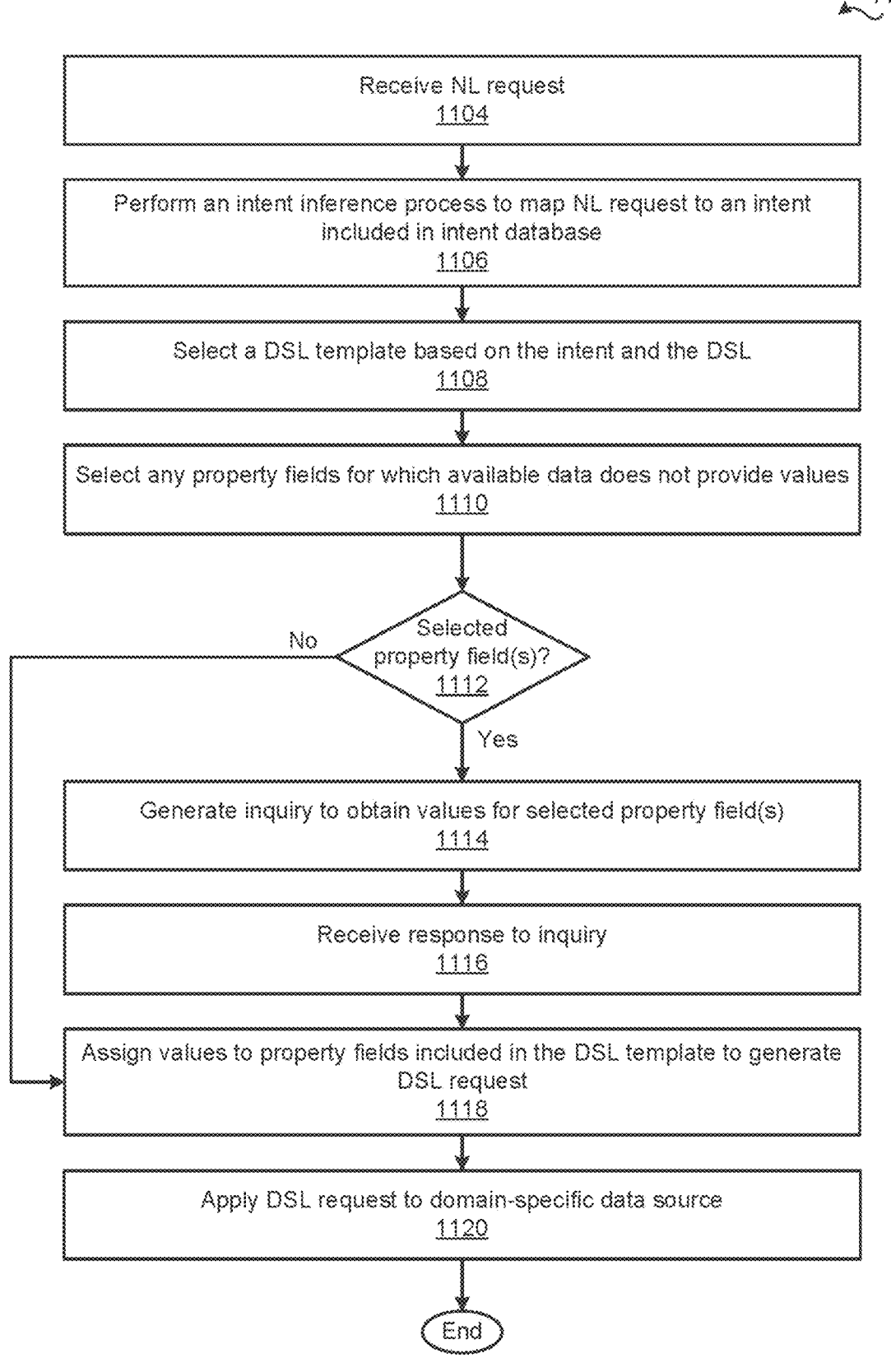
FIG. 11 is a flow diagram of method steps for applying an NL request to a domain-specific data source, in accordance with example embodiments.

FIG. 11 is a flow diagram of method steps for applying a NL request to a domain-specific data source, in accordance with example embodiments. Although the method steps are described with reference to the systems of FIGS. 8-10, persons skilled in the art will understand that any system configured to implement the method steps, in any order, falls within the scope of the present invention.

As shown, a method 1100 begins at step 1104, where the request processing engine 920 receives the NL request 915 from a user. At step 1106, the mapping engine 1010 performs an intent inference process to map the NL request 915 to one of the predefined intents 935 included in the intent database 988. At step 1108, the property resolution engine 1020 selects one of the DSL templates 998 included in the knowledge database 870 based on the intent 935 and the DSL 972.

At step 1110, the property resolution engine 1020 selects any property fields for which the property resolution engine 1202 is unable to determine values based on available data. Available data includes, without limitation, the NL request 915 and data included in the knowledge database 870. At step 1112, the property resolution engine 1020 determines whether there are any selected property fields. If, at step 1112, the property resolution engine 1020 determines that there are one or more selected property fields, then the method 1100 proceeds to step 1114.

At step 1114, the property resolution engine 1020 generate the inquiry 1030 that requests value(s) for the selected field(s) and presents the inquiry 1030 to the user. The property resolution engine 1020 may present the inquiry 1030 to the user in any technically feasible fashion that is consistent with the communication techniques associated with the user. For example, if the request processing engine 920 received the NL request 915 verbally, then the property resolution engine 1020 could verbalize the inquiry 1030. At step 1116, the property resolution engine 1020 receives the response 1040 from the user. The response 1040 specifies the values for the selected property fields.

If, however, at step 1112, the property resolution engine 1020 determines that are no selected properties fields, then the method 1100 proceeds directly to step 1118. At step 1118, the property resolution engine 1020 generates the DSL request 945 based on the DSL template 988 and any amount and type of available data and/or the response 1040. At step 1120, the NL application 840 applies the DSL request 945 to the associated domain-specific data source 820. More specifically, the request generator 940 causes other components in the NL application 840 to apply the DSL request 945 to the associated domain-specific data source 820.

Disambiguating NL Requests

Figures 12A, 12B:
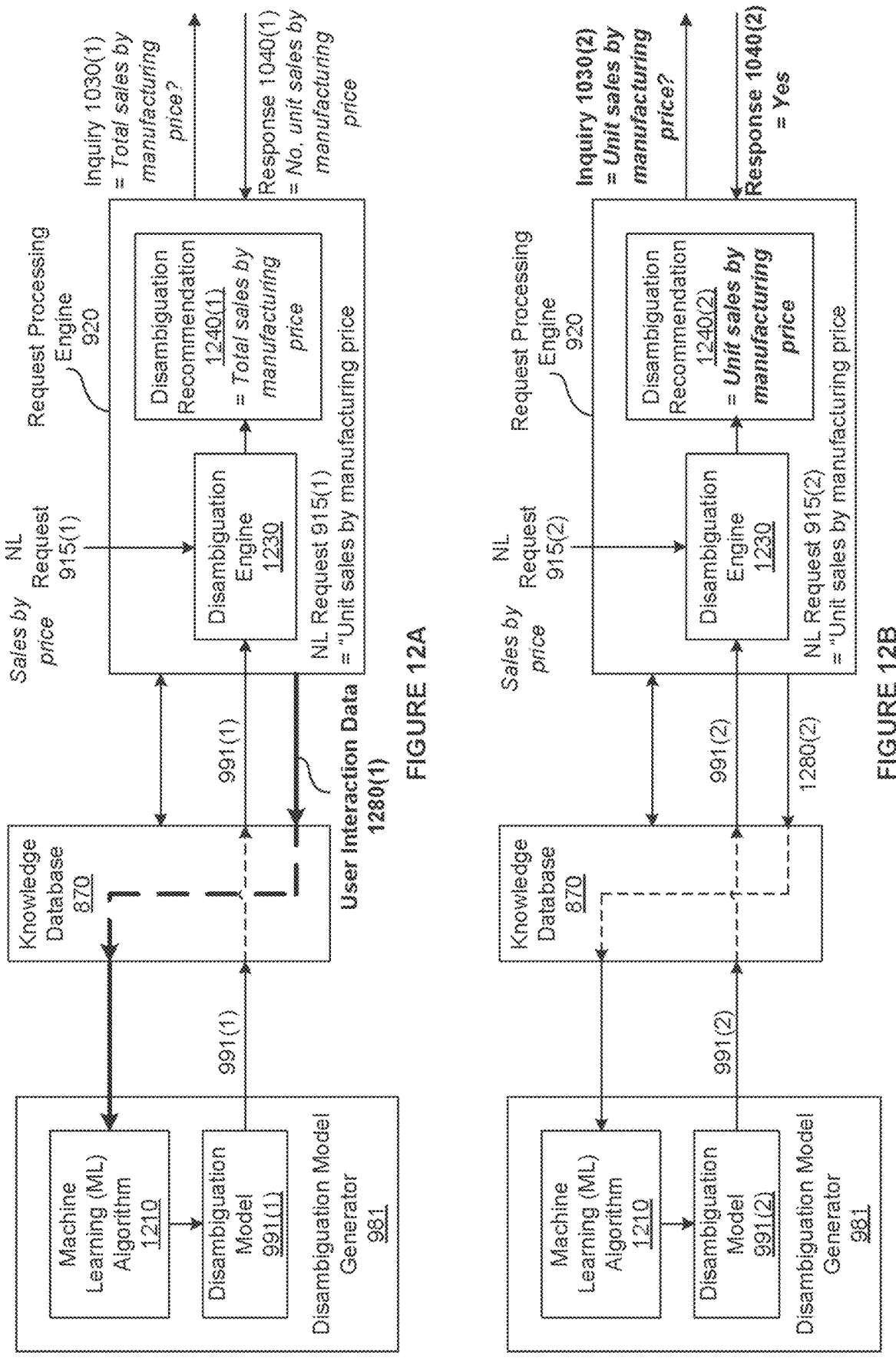
FIGS. 12A and 12B illustrate examples of how the request processing engine of FIG. 9 disambiguates and executes an NL request at two different points in time, in accordance with example embodiments.

FIGS. 12A and 12B illustrate examples of how the request processing engine 920 of FIG. 9 disambiguates and executes the NL request 915 at two different points in times, in accordance with example embodiments. As shown in both FIGS. 12A and 12B, the request processing engine 920 includes, without limitation a disambiguation engine 1230.

To disambiguate the NL request 915, the disambiguation engine 1230 retrieves a most recent version of the disambiguation model 991 from the knowledge database 870. The disambiguation engine 1230 then generates a disambiguation recommendation 1240 based on the NL request 915 and the disambiguation model 991. The disambiguation engine 1230 generates the inquiry 1030 that presents the disambiguation recommendation 1240 to the user and requests feedback. Upon receiving the response 1040 to the inquiry 1030, the disambiguation engine 1230 disambiguates the NL request 915 based on the response 1040. The NL application 840 then applies the disambiguated NL request 915 to the associated domain-specific data source 820

Finally, the request processing engine 920 transmits user interaction data 1280 to the knowledge application 860 for storage as part of the interaction history database 986. The user interaction data 1280 may include any amount of information associated with presenting and/or receiving data from the user. For example, the user interaction data 1280 could include the NL request 915, the disambiguation recommendation 1240, and a clickstream. In this fashion, the information in the interaction history database 986 reflects the effectiveness of the disambiguation recommendation 1240.

In general, the disambiguation model 991 associates the NL request 915 with the disambiguation recommendation 1240. In alternate embodiments, the disambiguation model 991 may associate the NL request 915 and any number of additional parameters with the disambiguation recommendation 1240. For instance, in some embodiments, the disambiguation model 991 may associate the NL request 915 and a geographical location of the user with the disambiguation recommendation 1240.

The disambiguation recommendation 1240 may include any amount and type of information that provides suggestions relevant to disambiguating an ambiguous NL request 915. For instance, in some embodiments, the disambiguation recommendation 1240 may be a list of phrases that is ordered based on estimated probabilities of accurately disambiguating the actual meaning of the NL request 915. In other embodiments, the disambiguation recommendation 1240 may be a single disambiguating phrase. In some embodiments, the disambiguation recommendation 1240 may includes a sequence of phrases, where each phrase disambiguates a different aspect of the NL request 915. For example, the disambiguation recommendation 1240 could include disambiguation for time and geographical regions.

The disambiguation engine 1230 may include any portion (including all) of the disambiguation recommendation 1240 in the inquiry 1030. Further, the disambiguation engine 1230 may present the inquiry 1030 to the user in any technically feasible fashion that is consistent with the communication techniques associated with the user. For example, if the disambiguation engine 1230 receives the NL request 915 verbally, then the disambiguation engine 1230 could verbalize the disambiguation recommendation 1240. The disambiguation engine 1230 may cause the user interaction data 1280 to be incorporated into the interaction history database 986 in any technically feasible fashion. For example, the request processing engine 920 could transmit the NL request 915, the disambiguation recommendation 1240, and a clickstream to the knowledge application 860.

As shown in both FIGS. 12A and 12B, the disambiguation model generator 981 generates the disambiguation model 991 and stores the disambiguation model 991 in the knowledge database 870. The disambiguation model generator 981, includes, without limitation, a machine learning (ML) algorithm 1210. The ML algorithm 1210 trains the disambiguation model 991 to associate the NL request 915 with the disambiguation recommendation 1240 based on information included in the knowledge database 870.

The ML algorithm 1210 may include any number and type of technically feasible ML operations, and the disambiguation model 991 may comprise any type of machine learning model. For instance, in some embodiments, the ML algorithm 1210 includes multidimensional scaling (MS) operations. In the same or other embodiments, the ML algorithm 1210 includes support vector machine (SVM) training operations. In various embodiments, the disambiguation model 991 comprises a neural network model. In some embodiments, the disambiguation model 991 comprises a deep learning model. Further the ML algorithm 1210 may train the disambiguation model 991 based on any amount and type of information included in the knowledge database 870. In particular, the ML algorithm 1210 trains the disambiguation model 991 based on the interaction history database 986 that reflects the effectiveness of any previous disambiguation recommendations 1240.

Because the knowledge database 870 evolves over time, the disambiguation model generator 981 periodically generates a new version of the disambiguation model 991 and stores the new version of the disambiguation model 991 in the knowledge database 870. In this fashion, the effectiveness of the disambiguation recommendations 1240 generated by the disambiguation model 991 increase over time.

To illustrate the evolution of the disambiguation recommendations 1240 over time, and for explanatory purposes only, FIG. 12A and FIG. 12B depict how the request processing engine 920 disambiguates the NL request 915 "sales by price" at two different times. FIG. 12A depicts how the request processing engine 920 disambiguates the NL request 915(1) "sales by price" at a time when the interaction history database 986 includes a relatively small amount of information relevant to disambiguating the NL request 915.

Upon receiving the NL request 915(1) "sales by price," the disambiguation engine 1230 retrieves a most recent version of the disambiguation model 991(1) from the knowledge database 870. The disambiguation engine 1230 then generates the disambiguation recommendation 1240(1) "total sales by manufacturing prices" based on the NL request 915(1) and the disambiguation model 991(1). Accordingly, the disambiguation engine 1230 generates the inquiry 1030(1) "total sales by manufacturing price?" and presents the inquiry 1030(1) to the user.

Upon receiving the response 1040(1) "no, unit sales by manufacturing price," the disambiguation engine 1230 modifies the NL request 915(1) to "unit sales by manufacturing price." The NL application 840 then applies the NL request 915(1) to the associated domain-specific data source 820. Finally, the disambiguation engine 1230 transmits the user interaction data 1280(1) to the knowledge application 860 for storage as part of the interaction history database 986. As a result, the information in the interaction history database 986 is updated to reflect the rejection of the disambiguation recommendation 1240(1) in favor of the disambiguation "unit sales by manufacturing price."

By contrast, FIG. 12B depicts how the request processing engine 920 disambiguates the NL request 915(2) "sales by price" at a subsequent time when the interaction history database 986 includes a relatively large amount of information relevant to disambiguating the NL request 915(2). Notably, the interaction history database 986 includes information indicating that the user rejected the disambiguation recommendation 1240(1) of "total sales by manufacturing prices," and provided the disambiguation "unit sales by manufacturing price."

Upon receiving the NL request 915(2) "sales by price," the disambiguation engine 1230 retrieves a most recent version of the disambiguation model 991(2) from the knowledge database 870. The disambiguation engine 1230 then generates the disambiguation recommendation 1240(2) "unit sales by manufacturing price" based on the NL request 915(2) and the disambiguation model 991(2). Accordingly, the disambiguation engine 1230 generates the inquiry 1030 (2) "unit sales by manufacturing price?" and presents the inquiry 1030(2) to the user.

Upon receiving the response 1040(2) "yes," the disambiguation engine 1230 modifies the NL request 915(2) to "unit sales by manufacturing price." The NL application 840 then applies the NL request 915(2) to the associated domain-specific data source 820. Finally, the disambiguation engine 1230 transmits the user interaction data 1280(2) to the knowledge application 860 for storage as part of the inter-action history database 986. As a result, the information in the interaction history database 986 is updated to reflect the success of the disambiguation recommendation 1240(2) "unit sales by manufacturing price."

FIG. 13 is a flow diagram of method steps for disambiguating and executing an NL request, in accordance with example embodiments. Although the method steps are described with reference to the systems of FIGS. 8, 9, 12A, and 12B, persons skilled in the art will understand that any system configured to implement the method steps, in any order, falls within the scope of the present invention.

As shown, a method 1300 begins at step 1302, where the request processing engine 920 receives an ambiguous NL request 915 from a user. At step 1304, the disambiguation engine 1230 retrieves a most recent version of the disambiguation model 991 from the knowledge database 870. At step 1306, the disambiguation engine 1230 generates the disambiguation recommendation 1240 based on the NL request 915 and the disambiguation model 991.

At step 1308, the disambiguation engine 1230 provides the disambiguation recommendation 1240 to the user. At step 1310, the disambiguation engine 1230 interacts with the user to determine optimal disambiguation(s) for the NL request 915. The disambiguation engine 1230 may interact with the user in any technically feasible fashion. For example, the disambiguation engine 1230 could receive a confirmation from the user that a single disambiguating phrase included in the disambiguation recommendation 1240 is acceptable. In another example, the disambiguation engine 1230 could receive a single disambiguating phrase from the user, where the single disambiguating phrase is not included in the disambiguation recommendation 1240.

At step 1312, the NL application 840 applies the disambiguated NL request 915 to the associated domain-specific data source 820. At step 1314, the disambiguation engine 1230 provides the user interaction data 1280 associated with the disambiguation operations to the knowledge application 860 for inclusion in the knowledge database 870, and the method 1300 terminates. The request processing engine 920 may transmit the user interaction data 1280 in any technically feasible fashion.

For example, the request processing engine 920 could transmit the NL request 915, the disambiguation recommendation 1240, and a clickstream to the knowledge application 860. Subsequently, the disambiguation model generator 891 generates a new disambiguation model 991 based on the knowledge database 870. As a result, the new disambiguation model 991 reflects the user interaction data 1280.

Figures 14A, 14B:
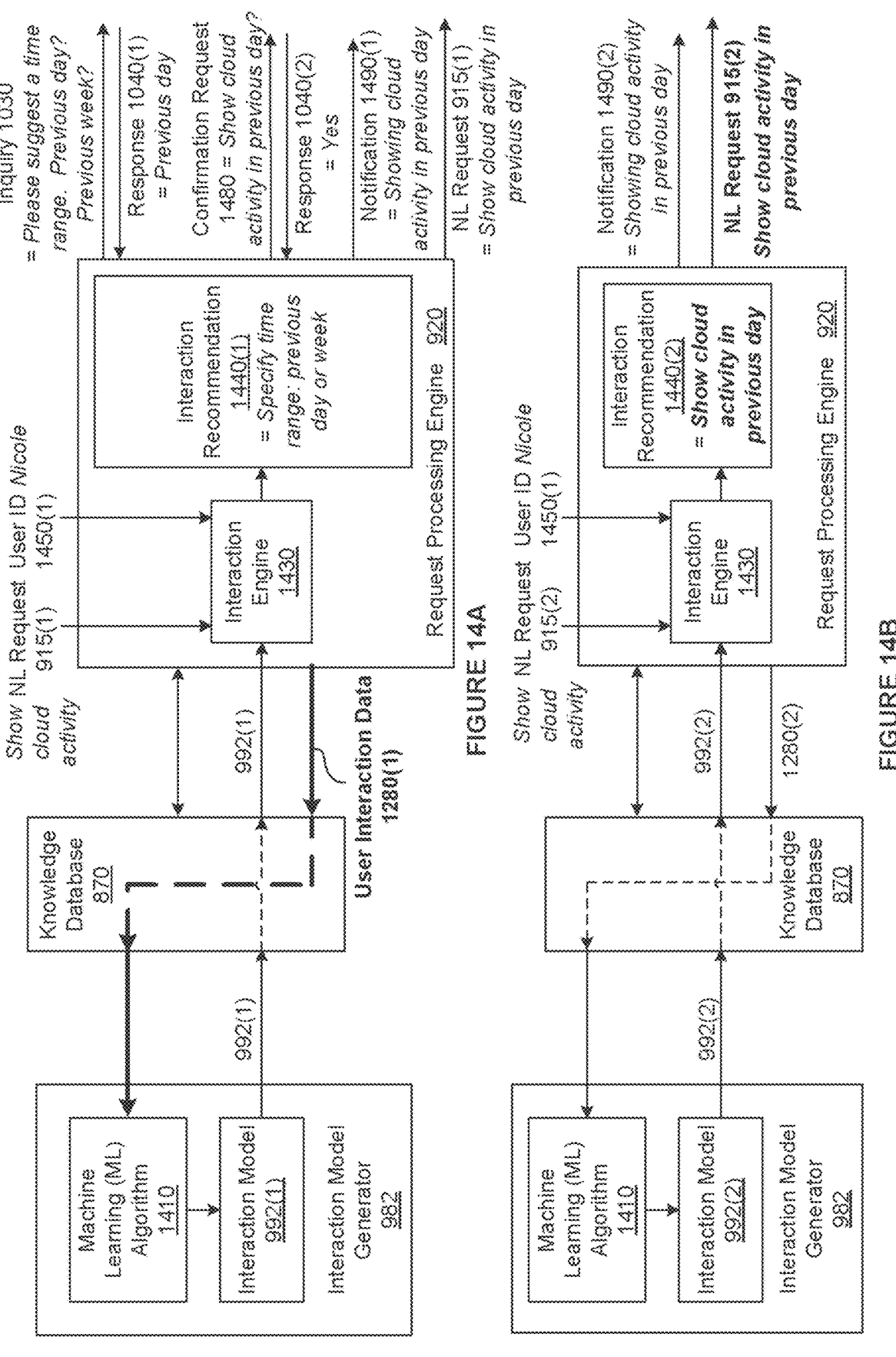
FIGS. 14A and 14B illustrate examples of how the request processing engine of FIG. 9 disambiguates and executes an NL request based on a user identification at two different points in time, in accordance with example embodiments.

FIGS. 14A and 14B illustrate examples of how the request processing engine 920 of FIG. 9 disambiguates and executes the NL request 915 based on a user identification (ID) 1450 at two different points in time, in accordance with example embodiments. The user identification (ID) 1450 identifies the user that issued the NL request 915. As shown in both FIGS. 14A and 14B, the request processing engine 920 includes, without limitation an interaction engine 1430.

To disambiguate the NL request 915, the interaction engine 1430 retrieves a most recent version of the interaction model 992 from the knowledge database 870. The interaction engine 1430 then generates an interaction recommendation 1440 based on the NL request 915, the user ID 1450, and the interaction model 992. Subsequently, the interaction engine 1430 interacts with the user based on the interaction recommendation 1440. As part of interacting with the user, the interaction engine 1430 disambiguate the ambiguous NL request 915. The NL application 840 then applies the resulting disambiguated NL request 915 to the corresponding domain-specific data source 820.

Finally, the interaction engine 1430 transmits the user interaction data 1280 to the knowledge application 860 for storage as part of the interaction history database 986. The user interaction data 1280 may include any amount of information associated with presenting and/or receiving data from the user. For example, the user interaction data 1280 could include the ambiguous NL request 915, the disambiguated NL request 915, the user ID 1450, the interaction recommendation 1440, and a clickstream. In this fashion, the information in the interaction history database 986 reflects the effectiveness of the interaction recommendation 1440.

In general, the interaction model 992 associates the NL request 915 and the user ID 1450 with the interaction recommendation 1440. In alternate embodiments, the interaction model 992 may associate the NL request 915, the user ID 1450, and any number of additional parameters with the interaction recommendation 1440. For instance, in some embodiments, the interaction model 992 may associate the NL request 915, the user ID 1450, and a time with the interaction recommendation 1440.

The interaction recommendation 1440 may include any amount and type of information in any technically feasible format. For instance, in some embodiments, the interaction recommendation 1440 may specify to act on a disambiguated NL request 915, confirm a disambiguated request 915, or question the user to determine a disambiguated NL request 915 based on a list of disambiguating phrases. The interaction engine 1430 determines an interaction strategy based on the interaction recommendation 1440. The interaction strategy is one of act, confirm, or question. In alternate embodiments, the interaction strategy may be one of any number of different strategies, where each strategy guides the interaction engine 1430 to perform any number and type of operations. The interaction engine 1430 then interacts with the user based on the interaction strategy.

If the interaction strategy is to act, then the interaction engine 1430 disambiguates the ambiguous NL request 915 based on the interaction recommendation 1420, generates a notification 1490 that specifies the disambiguated NL request 915, and presents the notification 1490 to the user. If, however, the interaction strategy is to confirm, then the interaction engine 1430 disambiguates the NL request 915 based on the interaction recommendation 1420 and generates a confirmation request 1480 that specifies the disambiguated NL request 915. After presenting the confirmation request 1480 and receiving the response 1040(2), the interaction engine 1430 generates a notification 1490 that specifies the disambiguated NL request 915 and presents the notification 1490 to the user.

If the interaction strategy is to question the user, then the interaction engine 1430 generates the inquiry 1030 based on the interaction recommendation 1440. After transmitting the inquiry 1030 and receiving the response 1040, the interaction 1430 engine 1430 disambiguate the NL request 915 based on the response 1040 and generates a confirmation request 1480 that specifies the disambiguated NL request 915. After transmitting the confirmation request 1480 and receiving the response 1040(2), the interaction engine 1430 generates a notification 1490 that specifies the disambiguated NL request 915.

In general, as part questioning, confirming, and notifying, the interaction engine 1430 may interact with the user in any technically feasible fashion that is consistent with the communication techniques associated with the user. For example, if the request processing engine 920 receives the NL request 915 as a text message, then the interaction engine 1430 could interact with the user via text messages.

As shown in both FIGS. 14A and 14B, the interaction model generator 982 generates the interaction model 992 and stores the interaction model 992 in the knowledge database 870. The interaction model generator 982, includes, without limitation, a machine learning (ML) algorithm 1410. The ML algorithm 1410 trains the interaction model 992 to associate the NL request 915 and the user ID 1450 with the interaction recommendation 1440 based on information included in the knowledge database 870.

The ML algorithm 1410 may include any number and type of technically feasible ML operations, and the interaction model 992 may comprise any type of machine learning model. For instance, in some embodiments, the ML algorithm 1410 includes multidimensional scaling (MS) operations. In the same or other embodiments, the ML algorithm 1410 includes support vector machine (SVM) training operations. In various embodiments, the interaction model 992 comprises a neural network model. In some embodiments, the interaction model 992 comprises a deep learning model. Further the ML algorithm 1410 may train the interaction model 992 based on any amount and type of information included in the knowledge database 870. In particular, the ML algorithm 1410 trains the interaction model 992 based on the interaction history database 986 that reflects the effectiveness of any previous interaction recommendations 1440.

Because the knowledge database 870 evolves over time, the interaction model generator 982 periodically generates a new version of the interaction model 992 and stores the new version of the interaction model 992 in the knowledge database 870. In this fashion, the effectiveness of the interaction recommendations 1440 generated by the interaction model generator 982 increase over time. Advantageously, as a particular user interacts with NL application 840, the interaction model 992 "learns" the preferences of the user. Consequently, the interaction recommendations 1440 generated by the interaction model 992 corresponding to the user ID 1450 of the user are less likely to specify to a questioning strategy, and the efficiency of the NL application 840 increases.

To illustrate the evolution of the interaction recommendations 1440 over time, and for explanatory purposes only, FIG. 14A and FIG. 14B depict how the request processing engine 920 disambiguates the NL request 915 "show cloud activity" associated with the user ID 1450 "Mary" at two different times. FIG. 14A depicts how the request processing engine 920 disambiguates the NL request 915(1) "show cloud activity" received from Mary at a time when the interaction history database 986 includes a relatively small amount of information relevant to disambiguating "show cloud activity" received from Mary.

Upon receiving the NL request 915(1) "show cloud activity," the interaction engine 1430 retrieves a most recent version of the interaction model 992(1) from the knowledge database 870. The interaction engine 1430 then generates the interaction recommendation 1440(1) "specify time range: previous day or week" based on the NL request 915(1), the user ID 1450, and the interaction model 992(1). Accordingly, the interaction engine 1430 determines that the interaction strategy is to question Mary.

The interaction engine 1430 generates the inquiry 1030 "Please suggest a time range. Previous day? Previous week?" and presents the inquiry 1030 to Mary. Upon receiving the response 1040(1) "previous day," the interaction engine 1430 modifies the NL request 915(1) to "show cloud activity in previous day." The interaction engine 1430 then generates the confirmation request 1480 "show cloud activity in previous day?" and presents the confirmation request 1480 to Mary. Upon receiving the response 1040(2) "yes," the interaction engine 1430 generates the notification 1490 (1) "showing cloud activity in previous day" and presents the notification 1490(1) to Mary.

The NL application 840 then applies the NL request 915(1) "show cloud activity in previous day" to the associated domain-specific data source 820. Finally, the interaction engine 1430 transmits the user interaction data 1280(1) to the knowledge application 860 for storage as part of the interaction history database 986. As a result, the information in the interaction history database 986 is updated to reflect that Mary clarified the time range as the previous day for "show cloud activity."

By contrast, FIG. 14B depicts how the request processing engine 920 disambiguates the NL request 915(2) "show cloud activity" received from Mary at a time when the interaction history database 986 includes a relatively large amount of information relevant to disambiguating "show cloud activity" received from Mary. Notably, the interaction history database 986 includes information indicating that Mary clarified the time range as the previous day for "show cloud activity."

Upon receiving the NL request 915(2) "show cloud activity," the interaction engine 1430 retrieves a most recent version of the interaction model 992(2) from the knowledge database 870. The interaction engine 1430 then generates the interaction recommendation 1440(2) "show cloud activity in the previous day" based on the NL request 915(2), the user ID 1450, and the interaction model 992(2). Accordingly, the interaction engine 1430 determines that the interaction strategy is to act. The NL application 840 then applies the NL request 915(2) "show cloud activity in previous day" to the associated domain-specific data source 820. Finally, the interaction engine 1430 transmits the user interaction data 1280(2) to the knowledge application 860 for storage as part of the interaction history database 986.

Figure 15:
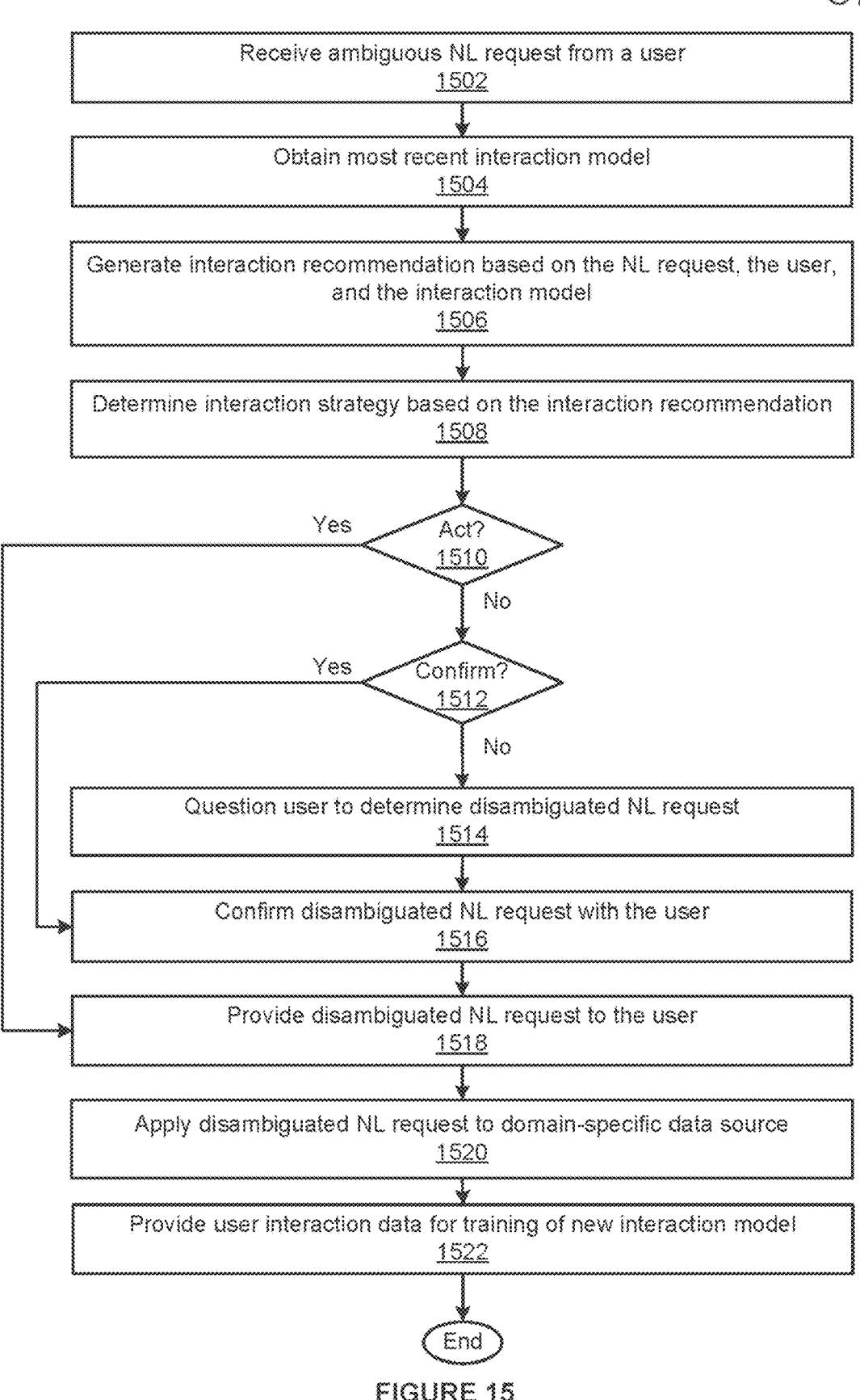
FIG. 15 is a flow diagram of method steps for disambiguating and executing an NL request based on a user identification, in accordance with example embodiments.

FIG. 15 is a flow diagram of method steps for disambiguating and executing an NL request based on a user identification, in accordance with example embodiments. Although the method steps are described with reference to the systems of FIGS. 8, 9, 14A, and 14B, persons skilled in the art will understand that any system configured to implement the method steps, in any order, falls within the scope of the present invention.

As shown, a method 1500 begins at step 1502, where the request processing engine 920 receives an ambiguous NL request 915 from a user. At step 1504, the interaction engine 1430 retrieves a most recent version of the interaction model 992 from the knowledge database 870. At step 1506, the interaction engine 1430 generates the interaction recommendation 1440 based on the NL request 915, the user ID 1450 associated with the user, and the interaction model 992.

At step 1508, the interaction engine 1430 determines an interaction strategy based on the interaction recommendation 1440. The interaction strategy is one of act, confirm, or question. In alternate embodiments, the interaction strategy may be one of any number of different strategies, where each strategy guides the request processing engine 920 to perform any number and type of operations. At step 1510, the interaction engine 1430 determines whether the interaction strategy is to act on an disambiguated NL request 915 included in the interaction recommendation 1440. If, at step 1510, the interaction engine 1430 determines that the interaction strategy is not to act, then the method 1500 proceeds to step 1512.

At step 1512, the interaction engine 1430 determines whether the interaction strategy is to confirm an disambiguated NL request 915 included in the interaction recommendation 1440. If, at step 1512, the interaction engine 1430 determines that the interaction strategy is not to confirm, then the method 1500 proceeds to step 1514. At step 1514, the interaction engine 1430 interacts with the user to determine an disambiguated NL request 915 that accurately represents the meaning of the ambiguous NL request 915.

As part of step 1514, the interaction engine 1430 may perform any amount and type of disambiguation operations in any technically feasible fashion. For instance, in some embodiments, the interaction engine 1430 may suggest one or more disambiguating phrases based on the interaction recommendation 1440. In other embodiments, the interaction engine 1430 may execute the method 1300 described above in conjunction with FIG. 13 any number of times to determine an disambiguated NL request 915.

If, however, at step 1512, the interaction engine 1430 determines that the interaction strategy is to confirm, then the method 1500 proceeds directly to step 1516. At step 1516, the interaction engine 1430 confirms the disambiguated NL request 915 with the user. If, however, at step 1510, the interaction engine 1430 determines that the interaction strategy is to act, then the method 1500 proceeds directly to step 1518. At step 1518, the interaction engine 1430 presents the disambiguated NL request 915 to the user.

At step 1520, the NL application 840 applies the disambiguated NL request 915 to the corresponding domain-specific data source 820. More specifically, the request processing engine 920 causes other components in the NL application 840 to translate the disambiguated NL request 915 to the DSL request 945 and apply the DSL request 945 to the corresponding domain-specific data source 820. At step 1522, the interaction engine 1430 provides the user interaction data 1280 associated with the interaction recommendation 1440 to the knowledge application 860 for incorporation into the knowledge database 870, and the method 1500 terminates.

The request processing engine 920 may transmit the user interaction data 1280 in any technically feasible fashion. For example, the request processing engine 920 could transmit the NL request 915, the interaction recommendation 1440, and a clickstream to the knowledge application 860. Subsequently, the interaction model generator 892 generates a new interaction model 992 based on the knowledge database 870. As a result, the new interaction model 992 reflects the user interaction data 1280.

Generating Follow-Up NL Requests

Figures 16A, 16B:
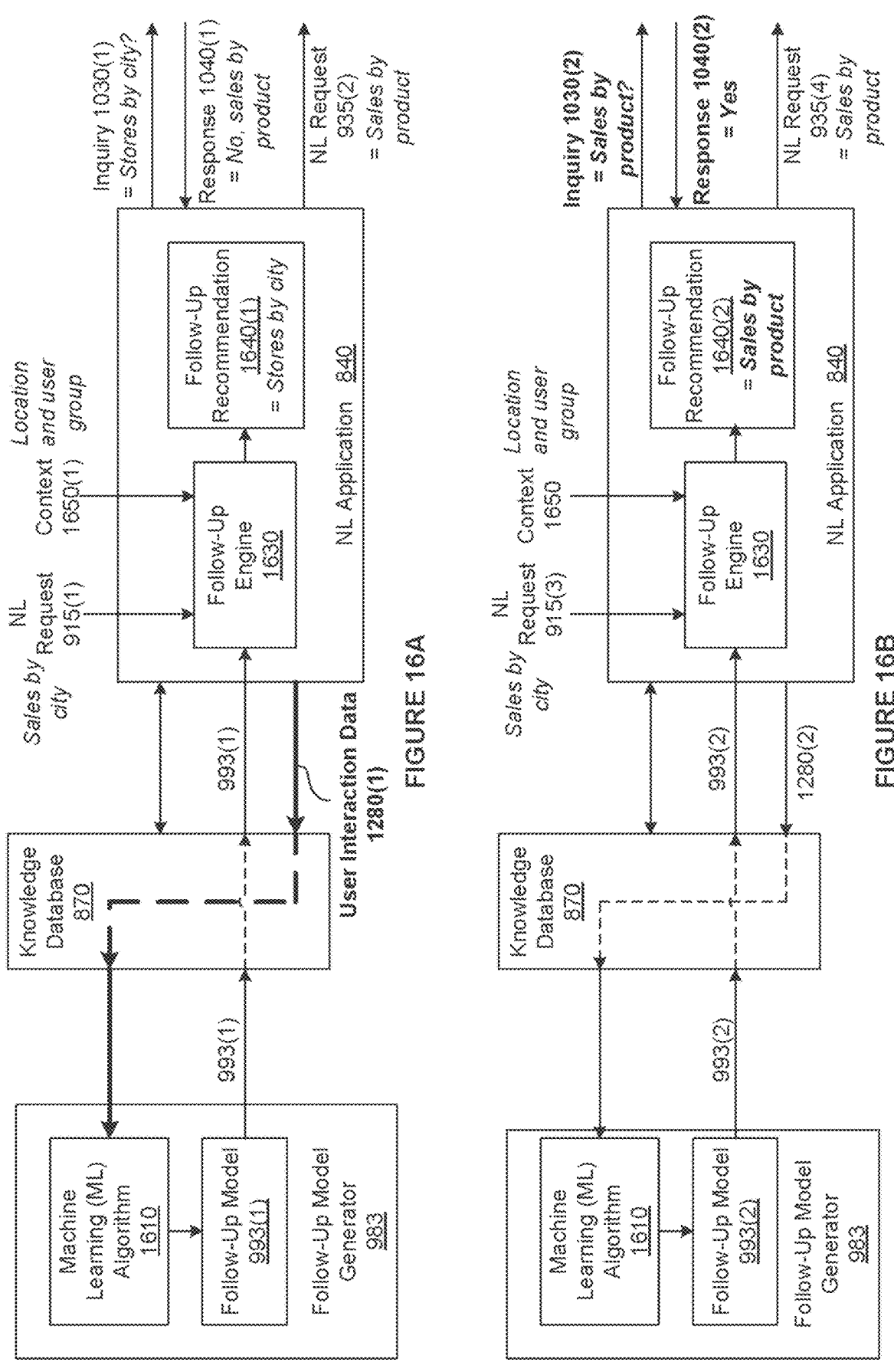
FIGS. 16A and 16B illustrate examples of how the NL application of FIG. 9 generates and executes a follow-up NL request based on an initial NL request at two different points in time, in accordance with example embodiments.

FIGS. 16A and 16B illustrate examples of how the NL application 840 of FIG. 9 generates and executes a follow-up NL request 915(*x*+1) based on an initial NL request 915(*x*)

at two different points in time, in accordance with example embodiments. As shown in both FIGS. 16A and 16B, the request NL application 840 includes, without limitation a follow-up engine 1630.

To generate the follow-up NL request 951 (x+1), the follow-up engine 1630 retrieves a most recent version of the follow-up model 993 from the knowledge database 870. The follow-up engine 1630 then generates a follow-up recommendation 1640 based on the NL request 915(*x*), a context 1650, and the follow-up model 993. The follow-up engine 1630 generates the inquiry 1030 based on the follow-up recommendation 1640 and presents the inquiry 1030 to the user.

Upon receiving the response 1040 to the inquiry 1030, the follow-up engine 1630 determines whether the response 1040 indicates that the follow-up engine 1630 is to generate a follow-up to the NL request 915(*x*). If the follow-up engine 1630 determines that the response 1040 does not indicate that the follow-up engine 1630 is to generate a follow-up to the NL request 915(*x*), then the follow-up engine 1630 does not generate the NL request 915(*x*+1). If, however, the follow-up engine 1630 determines that the response 1040 indicates that the follow-up engine 1630 is to generate a follow-up to the NL request 915(*x*), then the follow-up engine 1630 generates the NL request 915(*x*+1) based on the response 1040.

The NL application 840 then applies the NL request 915(*x*+1) to the associated domain-specific data source 820. Finally, the NL application 840 transmits the user interaction data 1280 to the knowledge application 860 for storage as part of the interaction history database 986. As a result, the information in the interaction history database 986 reflects the effectiveness of the follow-up recommendation 1640.

The context 1650 may include any amount and type of data associated with the NL request 915 and/or the user that issued the NL request 915. Notably, the context 1650 may include contextual data relating to situational awareness. As referred to herein, "situational awareness" is the perception of environmental elements and events with respect to contextual data, the comprehension of the meaning and significance of the situation, and the projection of future states and events. Examples of contextual data include, without limitation, a time associated with the NL request 915, a device with which the user specified the NL request 915, a job function of the user, a location of the user, the time of day, a user situation, a user context, and a user preference.

In general, the follow-up model 993 associates the NL request 915 and the context 1650 with the follow-up recommendation 1640. In alternate embodiments, the follow-up model 993 may associate the NL request 915 and any number (including zero) of additional parameters with the follow-up recommendation 1640. For instance, in some embodiments, the disambiguation model 991 may associate the NL request 915 with the follow-up recommendation 1640 irrespective of the context 1650.

The follow-up recommendation 1640 may include any amount and type of information that provides suggestions relevant to generating the follow-up request 915(*x*+1) based on the NL request 915(*x*). For instance, in some embodiments, the follow-up recommendation 1640 may be a list of search queries that is ordered based on estimated interest to the user. In other embodiments, the follow-up recommendation 1640 may be a single search query.

The follow-up engine 1630 may include any portion (including all) of the follow-up recommendation 1640 in the inquiry 1030. Further, the follow-up engine 1630 may present the inquiry 1030 to the user in any technically feasible fashion that is consistent with the communication techniques associated with the user. For example, if the follow-up engine 1630 receives the NL request 915 verbally, then the follow-up engine 1630 could verbalize the follow-up recommendation 1640. The follow-up engine 1630 may cause the user interaction data 1280 to be incorporated into the interaction history database 986 in any technically feasible fashion. For example, the request processing engine 920 could transmit the NL request 915, the context 1650, the follow-up recommendation 1640, and a clickstream to the knowledge application 860.

As shown in both FIGS. 16A and 16B, the follow-up model generator 983 generates the follow-up model 993 and stores the follow-up model 993 in the knowledge database 870. The follow-up model generator 983, includes, without limitation, a machine learning (ML) algorithm 1610. The ML algorithm 1610 trains the follow-up model 993 to associate the NL request 915 with the follow-up recommendation 1640 based on information included in the knowledge database 870.

The ML algorithm 1610 may include any number and type of technically feasible ML operations, and the follow-up model 993 may comprise any type of machine learning model. For instance, in some embodiments, the ML algorithm 1610 includes multidimensional scaling (MS) operations. In the same or other embodiments, the ML algorithm 1610 includes support vector machine (SVM) training operations. In various embodiments, the follow-up model 993 comprises a neural network model. In some embodiments, the follow-up model 993 comprises a deep learning model. Further the ML algorithm 1610 may train the follow-up model 993 based on any amount and type of information included in the knowledge database 870. In particular, the ML algorithm 160 trains the follow-up model 993 based on the interaction history database 986 that reflects the effectiveness of any previous follow-up recommendations 1640.

Because the knowledge database 870 evolves over time, the follow-up model generator 983 periodically generates a new version of the follow-up model 993 and stores the new version of the follow-up model 993 in the knowledge database 870. In this fashion, the effectiveness of the follow-up recommendations 1640 generated by the follow-up model 993 increase over time.

To illustrate the evolution of the follow-up recommendations 1640 over time, and for explanatory purposes only, FIG. 16A and FIG. 16B depict how the NL application 840 generates the follow-up NL request 915($x$+1) based on the NL request 915($x$) "sales by city" at two different times. FIG. 16A depicts how the NL application 840 generates the NL request 915(2) based on the NL request 915(1) "sales by city" at a time when the interaction history database 986 includes a relatively small amount of information relevant to generating the NL request 915(2) based on the NL request 915(1).

Upon receiving the NL request 915(1) "sales by city," the follow-up engine 1630 retrieves a most recent version of the follow-up model 993(1) from the knowledge database 870. The follow-up engine 1630 then generates the follow-up recommendation 1640(1) "stores by city" based on the NL request 915(1), the context 1650(1) "location and user group," and the follow-up model 993(1). Accordingly, the follow-up engine 1630 generates the inquiry 1030(1) "stores by city?" and presents the inquiry 1030(1) to the user.

Upon receiving the response 1040(1) "no, sales by product," the follow-up engine 1630 generates the NL request 915(2) "sales by product." The NL application 840 then applies the NL request 915(2) to be the associated domain-specific data source 820. Finally, the NL application 840 transmits the user interaction data 1280(1) to the knowledge application 860 for storage as part of the interaction history database 986. As a result, the information in the interaction history database 986 is updated to reflect the rejection of the follow-up recommendation 1640(1) in favor of "sales by product."

By contrast, FIG. 16B depicts how the NL application 840 generates the NL request 915(4) based on the NL request 915(3) "sales by city" at a time when the interaction history database 986 includes a relatively large amount of information relevant to generating the NL request 915(4) based on the NL request 915(3). Notably, the interaction history database 986 includes information indicating that the user rejected the follow-up recommendation 1640(1) of "stores by city" and requested "sales by product."

Upon receiving the NL request 915(3) "sales by city," the follow-up engine 1630 retrieves a most recent version of the follow-up model 993(2) from the knowledge database 870. The follow-up engine 1630 then generates the follow-up recommendation 1640(2) "sales by product" based on the NL request 915(3), the context 1650(2), and the follow-up model 993(2). For explanatory purposes only, the context 1650(2) matches the context 1650(1). Accordingly, the follow-up engine 1630 generates the inquiry 1030(2) "sales by product?" and presents the inquiry 1030(2) to the user.

Upon receiving the response 1040(2) "yes," the follow-up engine 1630 generates the NL request 915(4) "sales by product." The NL application 840 then applies the NL request 915(4) to the associated domain-specific data source 820. Finally, the NL application 840 transmits the user interaction data 1280(2) to the knowledge application 860 for storage as part of the interaction history database 986. As a result, the information in the interaction history database 986 is updated to reflect the success of the follow-up recommendation 1640(2) "sales by product."

FIG. 17 is a flow diagram of method steps for generating and executing a follow-up NL request based on an initial NL request, in accordance with example embodiments. Although the method steps are described with reference to the systems of FIGS. 8, 9, 16A, and 16B, persons skilled in the art will understand that any system configured to implement the method steps, in any order, falls within the scope of the present invention.

As shown, a method 1700 begins at step 1704, where the NL application 820 receives the NL request 915($x$) from a user. At step 1706, the NL application 820 applies the NL request 915($x$) to the associated domain-specific data source 820. At step 1708, the follow-up engine 1630 retrieves a most recent version of the follow-up model 993 from the knowledge database 870. At step 1710, the follow-up engine 1630 generates the follow-up recommendation 1640 based on the NL request 915($x$), the context 1650, and the follow-up model 993. At step 1712, the follow-up engine 1630 generates the inquiry 1030 based on the follow-up recommendation 1640, and presents the inquiry 1030 to the user.

At step 1716, the follow-up engine 1630 determines whether the response 1040 indicates that the follow-up engine 1630 is to generate a follow-up to the NL request 915($x$). If, at step 716, the follow-up engine 1630 determines that the response 1040 indicates that the follow-up engine 1630 is to generate a follow-up to the NL request 915($x$), then the follow-up engine 1630 proceeds to step 718. At step 1718, the follow-up engine 1630 generates the NL request 915($x$+1) based on the response 1040. At step 1720, the NL application 840 applies the NL request 915($x$+1) to the associated domain-specific data source 820.

If, however, at step 1716, the follow-up engine 1630 determines that the response 1040 does not indicate that the follow-up engine 1630 is to generate a follow-up to the NL request 915, then the method 1700 proceeds directly to step 1722. At step 1722, the NL application 840 transmits the user interaction data 1280 to the knowledge application 860 for storage as part of the interaction history database 986. As a result, the information in the interaction history database 986 reflects the effectiveness of the follow-up recommendation 1640. The method 1700 then terminates.

Presenting Search Results

Figures 18A, 18B:
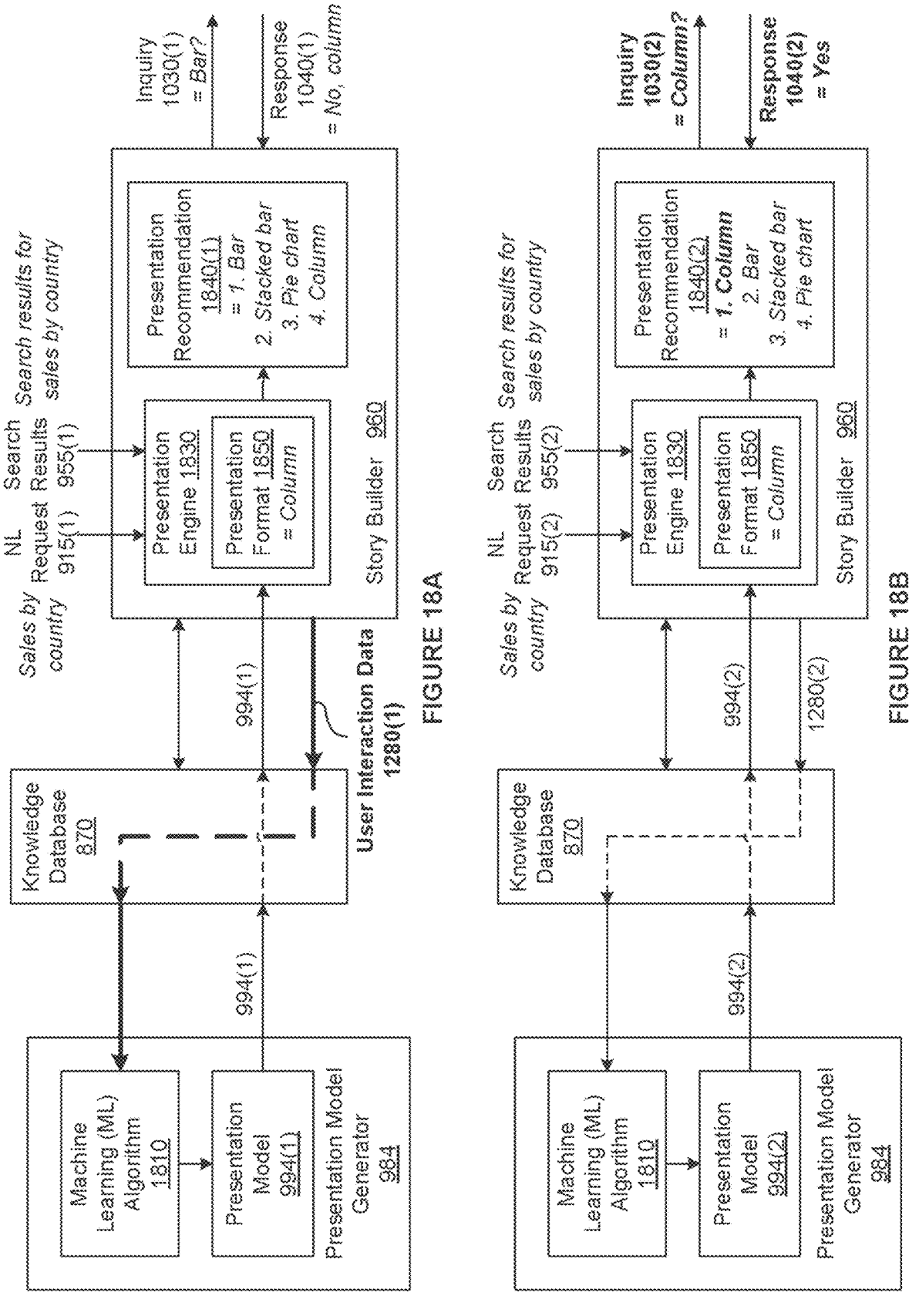
FIGS. 18A and 18B illustrate examples of how the story builder of FIG. 9 determines a presentation format for search results and then presents the search results at two different points in time, in accordance with example embodiments.

FIGS. 18A and 18B illustrate examples of how the story builder 960 of FIG. 9 determines a presentation format 1850 for the search results 955 and then presents the search results 955 at two different points in time, in accordance with example embodiments. As shown in both FIGS. 18A and 18B, the story builder 960 includes, without limitation a presentation engine 1830.

In operation, upon receiving the NL request 915 and the corresponding search results 955, the presentation engine 1830 retrieves a most recent version of the presentation model 994 from the knowledge database 870. The presentation engine 1830 then generates a presentation recommendation 1840 based on the NL request 915, the search results 995, and the presentation model 994. The presentation engine 1830 generates the inquiry 1030 that presents the presentation recommendation 1840 to the user and requests feedback. Upon receiving the response 1040 to the inquiry 1030, the presentation engine 1830 determines the presentation format 1850 based on the response 1040. The story builder 960 then presents the search results 955 based on the presentation format 1850.

Finally, the story builder 960 transmits the user interaction data 1280 to the knowledge application 860 for storage as part of the interaction history database 986. The user interaction data 1280 may include any amount of information associated with presenting and/or receiving data from the user. For example, the user interaction data 1280 could include the NL request 915, the search results 955, the presentation recommendation 1840, and a clickstream. In this fashion, the information in the interaction history database 986 reflects the effectiveness of the presentation recommendation 1840.

In general, the presentation model 994 associates the NL request 915 and the search results 955 with the presentation recommendation 1840. In alternate embodiments, the presentation model 994 may associate the NL request 915, the search results 955, and any number of additional parameters with the presentation recommendation 1840. For instance, in some embodiments, the presentation model 994 may associate the NL request 915, the search results 955, and a device type (e.g., a mobile device or voice enabled assistant) with the presentation recommendation 1840.

The presentation recommendation 1840 may include any amount and type of information that provides suggestions relevant to presenting the search results 955. For instance, in some embodiments, the presentation recommendation 1840 may be a list of plots that is ordered based on estimated desirability for displaying the search results 955. In other embodiments, the presentation recommendation 1840 may be a single plot. In yet other embodiments, the presentation recommendation 1840 may be a single verbalization option or a list of verbalization options that is ordered based on estimated desirability.

The presentation engine 1830 may include any portion (including all) of the presentation recommendation 1840 in the inquiry 1030. Further, the presentation engine 1830 may present the inquiry 1030 to the user in any technically feasible fashion that is consistent with the communication techniques associated with the user. For example, if the presentation engine 1830 receives the NL request 915 verbally, then the presentation engine 1830 could verbalize the presentation recommendation 1840. The presentation engine 1830 may cause the user interaction data 1280 to be incorporated into the interaction history database 986 in any technically feasible fashion. For example, the request processing engine 920 could transmit the NL request 915, the search results 955, the presentation recommendation 1840, and a clickstream to the knowledge application 860.

As shown in both FIGS. 18A and 18B, the presentation model generator 984 generates the presentation model 994 and stores the presentation model 994 in the knowledge database 870. The presentation model generator 984 includes, without limitation, a machine learning (ML) algorithm 1810. The ML algorithm 1810 trains the presentation model 994 to associate the NL request 915 and the search results 995 with the presentation recommendation 1840 based on information included in the knowledge database 870.

The ML algorithm 1810 may include any number and type of technically feasible ML operations, and the presentation model 994 may comprise any type of machine learning model. For instance, in some embodiments, the ML algorithm 1810 includes multidimensional scaling (MS) operations. In the same or other embodiments, the ML algorithm 1810 includes support vector machine (SVM) training operations. In various embodiments, the presentation model 994 comprises a neural network model. In some embodiments, the presentation model 994 comprises a deep learning model. Further the ML algorithm 1810 may train the presentation model 994 based on any amount and type of information included in the knowledge database 870. In particular, the ML algorithm 1810 trains the presentation model 994 based on the interaction history database 986 that reflects the effectiveness of any previous presentation recommendations 1840.

Because the knowledge database 870 evolves over time, the presentation model generator 984 periodically generates a new version of the presentation model 994 and stores the new version of the presentation model 994 in the knowledge database 870. In this fashion, the effectiveness of the presentation recommendations 1840 generated by the presentation model 994 increase over time.

To illustrate the evolution of the presentation recommendations 1840 over time, and for explanatory purposes only, FIG. 18A and FIG. 18B depict how the presentation engine 1830 determines the presentation format 1850 for the search results 955 corresponding to "sales by country" at two different times. FIG. 18A depicts how the presentation engine 1830 determines the presentation format 1850 at a time when the interaction history database 986 includes a relatively small amount of information relevant to optimizing the presentation format 1850.

Upon receiving the NL request 915(1) "sales by country" and the corresponding search results 955(1), the presentation engine 1830 retrieves a most recent version of the presentation model 994(1) from the knowledge database 870. The presentation engine 1830 then generates the presentation recommendation 1840(1) "1 bar, 2 stacked chart, 3 pie chart, 4 column" based on the NL request 915(1), the search results 955(1), and the presentation model 994(1). Subsequently, the presentation engine 1830 generates the inquiry 1030(1) "bar?" and presents the inquiry 1030(1) to the user.

Upon receiving the response 1040(1) "no, column" from a user, the presentation engine 1830 sets the presentation format 1850 equal to column. The story builder 960 then presents the search results 955(1) based on the presentation format 1850. Finally, the presentation engine 1830 transmits the user interaction data 1280(1) to the knowledge application 860 for storage as part of the interaction history database 986. As a result, the information in the interaction history database 986 is updated to reflect the rejection of the bar chart in favor of the column chart for the search results 955(1) corresponding to the NL request 915(1) "sales by country" for the user.

FIG. 18B depicts how the presentation engine 1830 determines the presentation format 1850 for the search results 955(2) corresponding the the NL request 915(2) "sales by country." However, FIG. 18B depicts how the presentation engine 1830 determines the presentation format 1850 at a time when the interaction history database 986 includes a relatively large amount of information relevant to optimizing the presentation format 1850. In particular, the interaction history database 986 includes information indicating that a user rejected the bar chart in favor of the column chart for the search results 955(1) corresponding to the NL request 915(1) "sales by country."

Upon receiving the NL request 915(2) "sales by country" and the corresponding search results 955(2), the presentation engine 1830 retrieves a most recent version of the presentation model 994(2) from the knowledge database 870. The presentation engine 1830 then generates the presentation recommendation 1840(2) "1 column, 2 bar, 3 stacked chart, 4 pie chart" based on the NL request 915(2), the search results 955(2), and the presentation model 994(2). Subsequently, the presentation engine 1830 generates the inquiry 1030(2) "column?" and presents the inquiry 1030(1) to the user.

Upon receiving the response 1040(1) "yes," the presentation engine 1830 sets the presentation format 1850 equal to column. The story builder 960 then presents the search results 955(2) based on the presentation format 1850. Finally, the presentation engine 1830 transmits the user interaction data 1280(2) to the knowledge application 860 for storage as part of the interaction history database 986. As a result, the information in the interaction history database 986 is updated to reflect the success of the presentation recommendation 1840(2).

As a general matter, the techniques described herein are illustrative rather than restrictive, and may be altered without departing from the broader spirit and scope of the invention. Many modifications and variations on the functionality provided by any units included in the NL system 800 will be apparent to those of ordinary skill in the art without departing from the scope and spirit of the described embodiments. For instance, in alternate embodiments, the presentation engine 1830 may receive the intent 935 and/or the DSL request 945 instead of or in addition to the NL request 915. In such embodiments, the functionality of any number of the presentation model generator 984, the presentation recommendation model 994, and the presentation engine 1830 may be modified accordingly.

FIG. 19 is a flow diagram of method steps for presenting search results, in accordance with example embodiments. Although the method steps are described with reference to the systems of FIGS. 8, 9, 18A, and 18B, persons skilled in the art will understand that any system configured to implement the method steps, in any order, falls within the scope of the present invention.

As shown, a method 1900 begins at step 1902, where the presentation engine 1830 receives the NL request 915 and the corresponding search results 955. At step 1904, the presentation engine 1830 retrieves a most recent version of the presentation model 994 from the knowledge database 870. At step 1906, the presentation engine 1830 generates the presentation recommendation 1840 based on the NL request 915, the search results 995, and the presentation model 994.

At step 1908, the presentation engine 1830 generates the inquiry 1030 based on the presentation recommendation 1840 and presents the inquiry 1030 to the user. At step 1910, the presentation engine 1830 receives the response 1040 from the user. At step 1912, the presentation engine 1830 determines the presentation format 1850 based on the response 1040. At step 1914, the story builder 960 presents the search results 955 based on the presentation format 1850.

At step 1916, the presentation engine 1830 transmits the user interaction data 1280 to the knowledge application 860 for storage as part of the interaction history database 986. In this fashion, the information in the interaction history database 986 reflects the effectiveness of the presentation recommendation 1840. The method 1900 then terminates.

Expanding a Set of Search Results

Figures 20A, 20B:
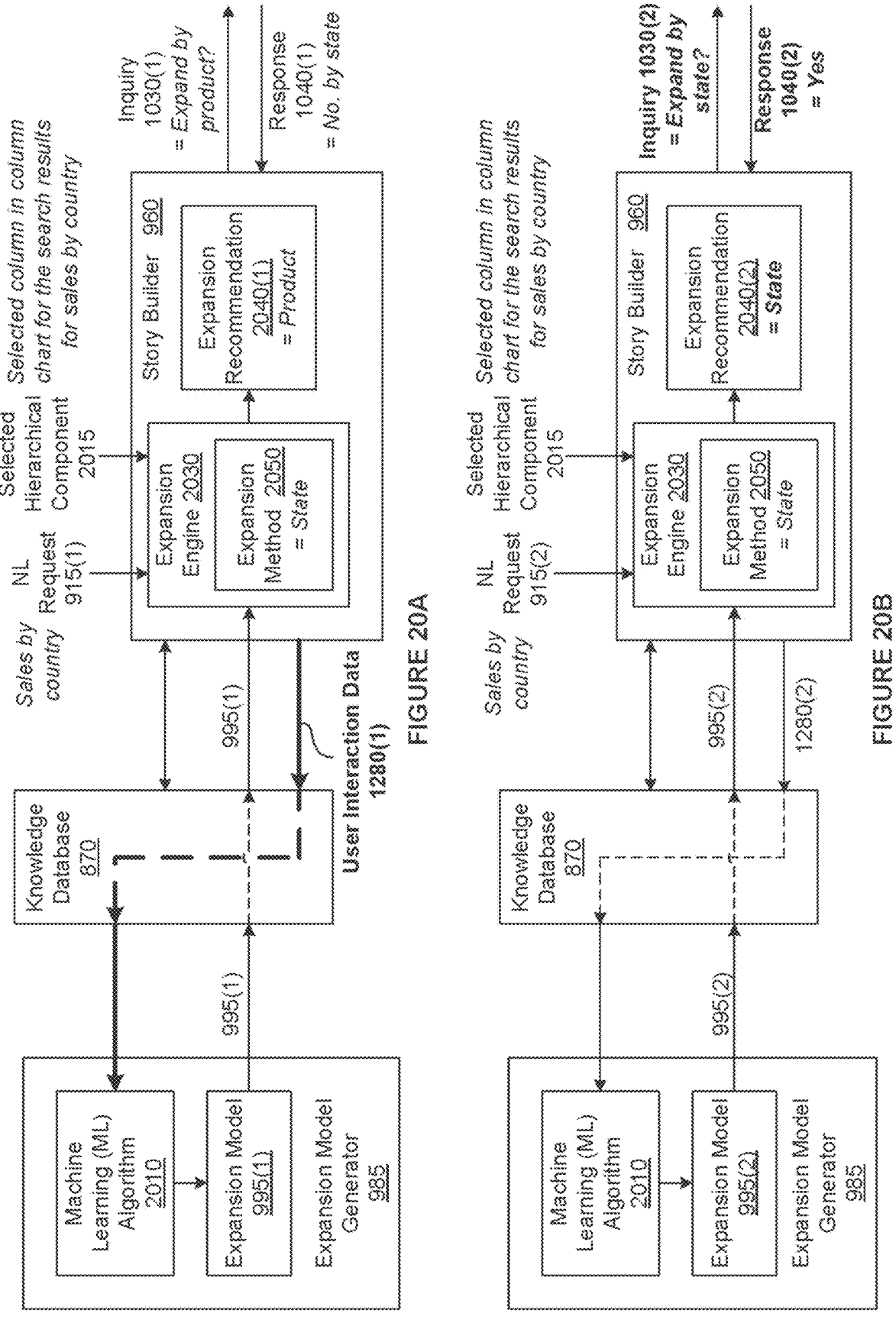
FIGS. 20A and 20B illustrate examples of how the story builder of FIG. 9 determines how to expand a set of search results and then expands the search results at two different points in time, in accordance with example embodiments.

FIGS. 20A and 20B illustrate examples of how the story builder 960 of FIG. 9 determines how to expand a set of search results 955 and then expands the search results at two different points in time. The set of search results 955 is defined by a selected hierarchical component 2015 (to drill down on a visual). The selected hierarchical component 2015 may be any type of component included in a presentation of the search results 955. For example, the selected hierarchical component 2015 could be a bar included in a bar chart, a sector included in a pie chart, or a similar visual representation of information in graphical form. The expansion method 2050 specifies how the hierarchical component 2015 is to be expanded. For example, the user may select a bar corresponding to "California" and the expansion method 2050 "city" to expand California by city.

As shown in both FIGS. 20A and 20B, the story builder 960 includes, without limitation a expansion engine 2030. In operation, upon receiving the NL request 915 and the selected hierarchical component 2015, the expansion engine 2030 retrieves a most recent version of the expansion model 995 from the knowledge database 870. The expansion engine 2030 then generates a expansion recommendation 2040 based on the NL request 915, the selected hierarchical component 2015, and the expansion model 995. The expansion engine 2030 generates the inquiry 1030 that presents the expansion recommendation 2040 to the user and requests feedback. Upon receiving the response 1040 to the inquiry 1030, the expansion engine 2030 determines the expansion method 2050 based on the response 1040. The story builder 960 then expands the search results 955 associated with the selected hierarchical component 2015 based on the expansion method 2050.

Finally, the story builder 960 transmits the user interaction data 1280 to the knowledge application 860 for storage as part of the interaction history database 986. The user interaction data 1280 may include any amount of information associated with presenting and/or receiving data from the user. For example, the user interaction data 1280 could include the NL request 915, the selected hierarchical component 2015, the expansion recommendation 2040, and a clickstream. In this fashion, the information in the interaction history database 986 reflects the effectiveness of the expansion recommendation 2040.

In general, the expansion model 995 associates the NL request 915 and the selected hierarchical component 2015 with the expansion recommendation 2040. In alternate embodiments, the expansion model 995 may associate the NL request 915, the selected hierarchical component 2015, and any number of additional parameters with the expansion recommendation 2040. For instance, in some embodiments, the expansion model 995 may associate the NL request 915, the search results 955, the selected hierarchical component 2015, and a device type with the expansion recommendation 2040.

The expansion recommendation 2040 may include any amount and type of information that provides suggestions relevant to expanding the selected hierarchical component 2015. For instance, in some embodiments, the expansion recommendation 2040 may be a list of expansion strategies 2050. In other embodiments, the expansion recommendation 2040 may be a single expansion method 2050.

The expansion engine 2030 may include any portion (including all) of the expansion recommendation 2040 in the inquiry 1030. Further, the expansion engine 2030 may present the inquiry 1030 to the user in any technically feasible fashion that is consistent with the communication techniques associated with the user. For example, if the expansion engine 2030 receives the NL request 915 verbally, then the expansion engine 2030 could verbalize the expansion recommendation 2040. The expansion engine 2030 may cause the user interaction data 1280 to be included in the interaction history database 986 in any technically feasible fashion. For example, the request processing engine 920 could transmit the NL request 915, the search results 955, the expansion recommendation 2040, and a clickstream to the knowledge application 860.

As shown in both FIGS. 20A and 20B, the expansion model generator 985 generates the expansion model 995 and stores the expansion model 995 in the knowledge database 870. The expansion model generator 985 includes, without limitation, a machine learning (ML) algorithm 2010. The ML algorithm 2010 trains the expansion model 995 to associate the NL request 915 and the selected hierarchical component 2015 with the expansion recommendation 2040 based on information included in the knowledge database 870.

The ML algorithm 2010 may include any number and type of technically feasible ML operations, and the expansion model 995 may comprise any type of machine learning model. For instance, in some embodiments, the ML algorithm 2010 includes multidimensional scaling (MS) operations. In the same or other embodiments, the ML algorithm 2010 includes support vector machine (SVM) training operations. In various embodiments, the expansion model 995 comprises a neural network model. In some embodiments, the expansion model 995 comprises a deep learning model. Further the ML algorithm 2010 may train the expansion model 995 based on any amount and type of information included in the knowledge database 870. In particular, the ML algorithm 2010 trains the expansion model 995 based on the interaction history database 986 that reflects the effectiveness of any previous expansion recommendations 2040.

Because the knowledge database 870 evolves over time, the expansion model generator 985 periodically generates a new version of the expansion model 995 and stores the new version of the expansion model 995 in the knowledge database 870. In this fashion, the effectiveness of the expansion recommendations 2040 generated by the expansion model 995 increase over time.

To illustrate the evolution of the expansion recommendations 2040 over time, and for explanatory purposes only, FIG. 20A and FIG. 20B depict how the expansion engine 2030 determines the expansion method 2050 for the same selected hierarchical component 2015 at two different times. The selected hierarchical component 2015 is a selected column in a column chart for the search results 955 corresponding to the NL request 915 "sales by country" at two different times. FIG. 20A depicts how the expansion engine 2030 determines the expansion method 2050 at a time when the interaction history database 986 includes a relatively small amount of information relevant to determining the expansion method 2050.

Upon receiving a selection of the selected hierarchical component 2015, the expansion engine 2030 retrieves a most recent version of the expansion model 995(1) from the knowledge database 870. The expansion engine 2030 then generates the expansion recommendation 2040(1) "product" based on the NL request 915(1), the selected hierarchical component 2015, and the expansion model 995(1). Subsequently, the expansion engine 2030 generates the inquiry 1030(1) "expand by product?" and presents the inquiry 1030(1) to the user.

Upon receiving the response 1040(1) "no, by state," the expansion engine 2030 sets the expansion method 2050 equal to state. The story builder 960 then expands the search results 955 associated with the selected hierarchical component 2015 based on the expansion method 2050. Finally, the expansion engine 2030 transmits the user interaction data 1280(1) to the knowledge application 860 for storage as part of the interaction history database 986. As a result, the information in the interaction history database 986 is updated to reflect the rejection of expanding by product in favor of expanding by state for the selected hierarchical component 2015.

FIG. 20B depicts how the expansion engine 2030 determines the expansion method 2050 for the selected hierarchical component 2015. However, FIG. 20B depicts how the expansion engine 2030 determines the expansion method 2050 at a time when the interaction history database 986 includes a relatively large amount of information relevant to determining the expansion method 2050. In particular, the interaction history database 986 includes information indicating that a user rejected expanding by product in favor of the expanding by state for the selected hierarchical component 2015.

Upon receiving a selection of the selected hierarchical component 2015, the expansion engine 2030 retrieves a most recent version of the expansion model 995(2) from the knowledge database 870. The expansion engine 2030 then generates the expansion recommendation 2040(2) "state" based on the NL request 915(2), the selected hierarchical component 2015, and the expansion model 995(2). Subsequently, the expansion engine 2030 generates the inquiry 1030(2) "expand by state?" and presents the inquiry 1030(2) to the user.

Upon receiving the response 1040(2) "yes," the expansion engine 2030 sets the expansion method 2050 equal to state. The story builder 960 then expands the search results 955 associated with the selected hierarchical component 2015 based on the expansion method 2050. Finally, the expansion engine 2030 transmits the user interaction data 1280(2) to the knowledge application 860 for storage as part of the interaction history database 986. As a result, the information in the interaction history database 986 is updated to reflect the success of the expansion recommendation 2040(2).

FIG. 21 is a flow diagram of method steps for expanding a set of search results, in accordance with example embodiments. Although the method steps are described with reference to the systems of FIGS. 8, 9, 20A, and 20B, persons skilled in the art will understand that any system configured to implement the method steps, in any order, falls within the scope of the present invention.

As shown, a method 2100 begins at step 2102, where the expansion engine 2030 receives the hierarchical component selection 2050 that defines the set of search results. At step 2104, the expansion engine 2030 retrieves a most recent version of the expansion model 994 from the knowledge database 870. At step 2106, the expansion engine 2030 generates the expansion recommendation 2040 based on the NL request 915, the hierarchical component selection 2050, and the expansion model 994.

At step 2108, the expansion engine 2030 generates the inquiry 1030 based on the expansion recommendation 2040 and presents the inquiry 1030 to the user. At step 2110, the expansion engine 2030 receives the response 1040 from the user. At step 2112, the expansion engine 2030 determines the expansion method 2050 based on the response 1040. At step 2114, the story builder 960 expands the search results 955 associated with the selected hierarchical component 2015 based on the expansion method 2050.

At step 2116, the expansion engine 2030 transmits the user interaction data 1280 to the knowledge application 860 for storage as part of the interaction history database 986. In this fashion, the information in the interaction history database 986 reflects the effectiveness of the expansion recommendation 2040. The method 2100 then terminates.

In sum, the disclosed techniques may be implemented to continually increase the efficiency and accuracy of retrieving and analyzing data stored in data sources. A natural language (NL) system includes, without limitation, any number of domain-specific data sources, a knowledge database, an NL application, and any number of model generators. The knowledge database includes a variety of information that enables the NL application to execute NL requests involving the domain-specific data sources. Over time, the information included in the knowledge database evolves.

In particular, the knowledge database includes an intent database, DSL templates, machine learning models, and histories of user interactions with the NL application. The intent database and DSL templates provide a flexible framework that enables the NL application to map NL requests to user intents and, subsequently, to DSL requests for any number of DSLs. Each of the machine learning models associates the NL request and any number (including zero) of additional parameters with a recommendation that guides operations performed by the NL application. Periodically, the model generators retrain the machine learning models based on information included in the knowledge database, including portions of the histories that indicate the effectiveness of previous recommendations.

Advantageously, as the intent database, DSL templates, and machine-learning models are updated, the amount of time and user effort associated with processing NL requests decreases and the overall accuracy of NL application implementations increases. For example, suppose that the histories of user interactions initially include no information regarding Nicole. A machine-learning interaction model trained based on the histories would associate the NL request "show cloud activity" and Nicole with a recommendation to disambiguate the time range. After a week, suppose that the histories were to include information that Nicole issued the NL request "show cloud activity" one hundred times, and each time Nicole clarified that the meaning of the NL request was "show cloud activity in the previous day." An updated interaction model trained based on the histories would associate the NL request "show cloud activity" and Nicole to a recommendation to apply "show cloud activity in the previous day" to the appropriate data source without any additional input from Nicole.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in conjunction with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
receiving a request in a human-readable, natural language format;
performing, by a request processing engine executed by a processor, semantic similarity operations on words of the request in view of a set of predefined intents that correspond to meanings of requests in natural language format, wherein the semantic similarity operations performed by the request processing engine result in mapping of the request to a first intent of the set of predefined intents and wherein the set of predefined intents are stored in a knowledge database accessible by the request processing engine;
mapping, by a request generator communicatively coupled to the request processing engine and executable by the processor, the request to a first domain-specific language in view of the first intent, wherein the first intent is associated with a plurality of domain-specific languages including the first domain-specific language;
generating an auto-generated search query including operations of mapping the first intent to a domain-specific language template based on the first domain-specific language and populating a domain-specific language property of the domain-specific language template with a subset of the words of the request, wherein the first intent is associated with a plurality of domain-specific language templates, stored in the knowledge database, that correspond to the plurality of domain-specific languages;
executing, by the processor, the auto-generated search query on a data source; and
generating a result presentation including search results of the execution of the auto-generated search query.

2. The computer-implemented method of claim 1, wherein receiving the request is performed by a first machine learning (ML) model.

3. The computer-implemented method of claim 2 wherein performing one or more of the semantic similarity operations, mapping the request to the first domain-specific language, generating the auto-generated search query, executing the auto-generated search query, or generating the result presentation is done by at least a second ML model different than the first ML model.

4. The computer-implemented method of claim 3, wherein the second ML model is a deep learning model.

5. The computer-implemented method of claim 1, wherein generating the auto-generated search query includes selecting a domain-specific language template that is associated with both of the first intent and the first domain-specific language.

6. The computer-implemented method of claim 1, further comprising:
performing disambiguation operations resulting in a disambiguation of one or more words of the request through analysis of past user interactions.

7. The computer-implemented method of claim 6, wherein
receiving the request is performed by a first machine learning (ML) model and the disambiguation operations are performed by a second ML model.

8. A computing device, comprising:
a processor; and
a non-transitory computer-readable medium having stored thereon instructions that, when executed by the processor, cause the processor to perform operations including:
receiving a request in a human-readable, natural language format;
performing, by a request processing engine executed by a processor, semantic similarity operations on words of the request in view of a set of predefined intents that correspond to meanings of requests in natural language format, wherein the semantic similarity operations performed by the request processing engine result in mapping of the request to a first intent of the set of predefined intents and wherein the set of predefined intents are stored in a knowledge database accessible by the request processing engine;
mapping, by a request generator communicatively coupled to the request processing engine and executable by the processor, the request to a first domain-specific language in view of the first intent, wherein the first intent is associated with a plurality of domain-specific languages including the first domain-specific language;
generating an auto-generated search query including operations of mapping the first intent to a domain-specific language template based on the first domain-specific language and populating a domain-specific language property of the domain-specific language template with a subset of the words of the request, wherein the first intent is associated with a plurality of domain-specific language templates, stored in the knowledge database, that correspond to the plurality of domain-specific languages;
executing, by the processor, the auto-generated search query on a data source; and
generating a result presentation including search results of the execution of the auto-generated search query.

9. The computing device of claim 8, wherein receiving the request is performed by a first machine learning (ML) model.

10. The computing device of claim 9, wherein performing one or more of the semantic similarity operations, mapping the request to the first domain-specific language, generating the auto-generated search query, executing the auto-generated search query, or generating the result presentation is done by at least a second ML model different than the first ML model.

11. The computing device of claim 10, wherein the second ML model is a deep learning model.

12. The computing device of claim 8, wherein generating the auto-generated search query includes selecting a domain-specific language template that is associated with both of the first intent and the first domain-specific language.

13. The computing device of claim 8, wherein the operations further comprise:

performing disambiguation operations resulting in a disambiguation of one or more words of the request through analysis of past user interactions.

14. The computing device of claim 13, wherein receiving the request is performed by a first machine learning (ML) model and the disambiguation operations are performed by a second ML model.

15. A non-transitory computer-readable medium having stored thereon instructions that, when executed by one or more processors, cause the one or more processors to perform operations including:

receiving a request in a human-readable, natural language format;

performing, by a request processing engine executed by a processor, semantic similarity operations on words of the request in view of a set of predefined intents that correspond to meanings of requests in natural language format, wherein the semantic similarity operations performed by the request processing engine result in mapping of the request to a first intent of the set of predefined intents and wherein the set of predefined intents are stored in a knowledge database accessible by the request processing engine;

mapping, by a request generator communicatively coupled to the request processing engine and executable by the processor, the request to a first domain-specific language in view of the first intent, wherein the first intent is associated with a plurality of domain-specific languages including the first domain-specific language;

generating an auto-generated search query including operations of mapping the first intent to a domain-specific language template based on the first domain-specific language and populating a domain-specific language property of the domain-specific language template with a subset of the words of the request, wherein the first intent is associated with a plurality of domain-specific language templates, stored in the knowledge database, that correspond to the plurality of domain-specific languages;

executing, by the processor, the auto-generated search query on a data source; and generating a result presentation including search results of the execution of the auto-generated search query.

16. The non-transitory computer-readable medium of claim 15, wherein receiving the request is performed by a first machine learning (ML) model.

17. The non-transitory computer-readable medium of claim 16, wherein performing one or more of the semantic similarity operations, mapping the request to the first domain-specific language, generating the auto-generated search query, executing the auto-generated search query, or generating the result presentation is done by at least a second ML model different than the first ML model.

18. The non-transitory computer-readable medium of claim 17, wherein the second ML model is a deep learning model.

19. The non-transitory computer-readable medium of claim 15, wherein generating the auto-generated search query includes selecting a domain-specific language template that is associated with both of the first intent and the first domain-specific language.

20. The non-transitory computer-readable medium of claim 15, wherein the operations further comprise:

performing disambiguation operations resulting in a disambiguation of one or more words of the request through analysis of past user interaction, and wherein receiving the request is performed by a first machine learning (ML) model and the disambiguation operations are performed by a second ML model.

* * * * *